United States Patent
Yerramalli et al.

(10) Patent No.: US 10,531,459 B2
(45) Date of Patent: Jan. 7, 2020

(54) METHODS AND APPARATUS FOR IOT OPERATION IN UNLICENSED SPECTRUM

(71) Applicant: QUALCOMM Incorporated, San Diego, CA (US)

(72) Inventors: Srinivas Yerramalli, San Diego, CA (US); Alberto Rico Alvarino, San Diego, CA (US); Hao Xu, San Diego, CA (US); Wanshi Chen, San Diego, CA (US); Juan Montojo, San Diego, CA (US); Yongbin Wei, La Jolla, CA (US); Peter Gaal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 74 days.

(21) Appl. No.: 15/610,817

(22) Filed: Jun. 1, 2017

(65) Prior Publication Data
US 2018/0020452 A1    Jan. 18, 2018

Related U.S. Application Data

(60) Provisional application No. 62/363,128, filed on Jul. 15, 2016.

(51) Int. Cl.
*H04W 72/04* (2009.01)
*H04W 76/28* (2018.01)
(Continued)

(52) U.S. Cl.
CPC ........ *H04W 72/0453* (2013.01); *H04B 1/713* (2013.01); *H04B 1/7156* (2013.01);
(Continued)

(58) Field of Classification Search
CPC ........... H04W 72/0453; H04W 72/042; H04W 72/0473; H04W 88/08; H04W 74/006;
(Continued)

(56) References Cited

U.S. PATENT DOCUMENTS

| 4,752,939 A | 6/1988 | Amoroso et al. |
| 6,240,125 B1 | 5/2001 | Andersson et al. |

(Continued)

FOREIGN PATENT DOCUMENTS

| CN | 102036401 A | 4/2011 |
| EP | 2385653 A2 | 11/2011 |

(Continued)

OTHER PUBLICATIONS

"3rd Generation Partnership Project; Technical Specification Group Radio Access Network; Evolved Universal Terrestrial Radio Access (EUTRA) and Evolved Universal Terrestrial Radio Access Network (EUTRAN); Overall description; Stage 2 (Release 13)", 3GPP Standard; 3GPP TS 36.300, vol. RAN WG2, No. V13.4.0, Jul. 17, 2016.

(Continued)

*Primary Examiner* — Rownak Islam
(74) *Attorney, Agent, or Firm* — Arent Fox LLP

(57) ABSTRACT

Various aspects of utilizing narrowband internet of things (NB IOT) communication are still under development. According to an aspect of the disclosure, the apparatus may be a user equipment (UE) using digital modulation for wireless communication via NB IOT communication in an unlicensed spectrum. The UE utilizes a plurality of downlink carriers in the unlicensed spectrum occupying at least a first minimum bandwidth by the plurality of downlink carriers and a plurality of uplink carriers in the unlicensed spectrum occupying at least a second minimum bandwidth with the plurality of uplink carriers. The UE performs communication using one or more of the plurality of downlink carriers and the plurality of uplink carriers.

71 Claims, 29 Drawing Sheets

(51) Int. Cl.

| | | |
|---|---|---|
| *H04L 5/00* | (2006.01) | |
| *H04W 52/14* | (2009.01) | |
| *H04W 52/34* | (2009.01) | |
| *H04W 56/00* | (2009.01) | |
| *H04W 74/08* | (2009.01) | |
| *H04B 1/713* | (2011.01) | |
| *H04W 16/14* | (2009.01) | |
| *H04L 27/00* | (2006.01) | |
| *H04L 27/26* | (2006.01) | |
| *H04B 1/7156* | (2011.01) | |
| H04L 29/08 | (2006.01) | |
| H04W 88/08 | (2009.01) | |
| H04B 1/7143 | (2011.01) | |
| H04B 1/7183 | (2011.01) | |
| H04W 74/00 | (2009.01) | |
| H04W 76/27 | (2018.01) | |

(52) U.S. Cl.
CPC ............ H04L 5/001 (2013.01); H04L 5/0012 (2013.01); H04L 5/0048 (2013.01); H04L 5/0098 (2013.01); H04L 27/0006 (2013.01); H04L 27/2634 (2013.01); H04W 16/14 (2013.01); H04W 52/143 (2013.01); H04W 52/146 (2013.01); H04W 52/346 (2013.01); H04W 56/0005 (2013.01); H04W 56/0015 (2013.01); H04W 72/042 (2013.01); H04W 72/0473 (2013.01); H04W 74/085 (2013.01); H04W 76/28 (2018.02); *H04B 1/7143* (2013.01); *H04B 1/7183* (2013.01); *H04B 2001/71563* (2013.01); *H04L 27/2655* (2013.01); *H04L 67/12* (2013.01); *H04W 56/00* (2013.01); *H04W 74/006* (2013.01); *H04W 76/27* (2018.02); *H04W 88/08* (2013.01)

(58) Field of Classification Search
CPC ..... H04W 76/27; H04W 76/28; H04W 16/14; H04W 16/52; H04W 16/143; H04W 52/146; H04W 52/346; H04W 56/0005; H04W 56/0015; H04W 74/085; H04W 52/143; H04L 27/0006; H04L 27/2655; H04L 27/2634; H04L 5/0098; H04L 5/0048; H04L 5/0012; H04L 5/001; H04L 67/12; H04B 1/713; H04B 1/7156; H04B 1/7143; H04B 1/7183; H04B 2001/71563
USPC ......................................................... 370/329
See application file for complete search history.

(56) References Cited

U.S. PATENT DOCUMENTS

| | | | |
|---|---|---|---|
| 6,549,784 | B1 | 4/2003 | Kostic et al. |
| 8,649,418 | B1* | 2/2014 | Negus ................... H04B 7/0486 375/211 |
| 8,675,605 | B2 | 3/2014 | Charbit et al. |
| 2004/0214579 | A1* | 10/2004 | Mattila ................. H04W 16/32 455/449 |
| 2005/0143123 | A1 | 6/2005 | Black et al. |
| 2009/0052499 | A1 | 2/2009 | Hekmann et al. |
| 2011/0075742 | A1* | 3/2011 | Zhang ................... H04L 1/0002 375/259 |
| 2013/0143502 | A1 | 6/2013 | Kazmi et al. |
| 2013/0250773 | A1* | 9/2013 | Ohta ...................... H04B 7/155 370/241 |
| 2015/0049712 | A1 | 2/2015 | Chen et al. |
| 2015/0181533 | A1* | 6/2015 | Chen ................... H04W 52/146 455/522 |
| 2016/0007350 | A1 | 1/2016 | Xiong et al. |
| 2016/0249222 | A1 | 8/2016 | Li et al. |
| 2017/0187563 | A1* | 6/2017 | Shin .................... H04L 27/2675 |
| 2017/0273079 | A1* | 9/2017 | Park .................... H04W 72/042 |
| 2017/0289853 | A1* | 10/2017 | Ahn ...................... H04W 28/26 |
| 2017/0346685 | A1* | 11/2017 | Wang .................... H04L 5/001 |
| 2018/0020241 | A1 | 1/2018 | Yerramalli et al. |
| 2018/0146498 | A1 | 5/2018 | Sahlin et al. |
| 2018/0287846 | A1 | 10/2018 | Kim et al. |
| 2018/0317180 | A1* | 11/2018 | Li ......................... H04W 52/146 |

FOREIGN PATENT DOCUMENTS

| | | | | |
|---|---|---|---|---|
| WO | 2012109576 | A1 | 8/2012 | |
| WO | WO-2017119429 | A1 * | 7/2017 | .............. H04J 11/00 |

OTHER PUBLICATIONS

Ericsson et al., "Multi-PRB support for NB-IoT", 3GPP Draft; R2-161878 Multi-PRB Support for NB-IOT, 3rd Generation Partnership Project (3GPP), Mobile Competence Centre; 650, Route Des Luciloes, F-06921 Sophia-Antipolis Cedex ; France, vol. RAN WG2, No. St. Julian, Malta; Feb. 15, 2016-Feb. 19, 2016, Feb. 19, 2016 (Feb. 19, 2016), pp. 1-5, XP051066194, Retrieved from the Internet: URL: http://www.3gpp.org/ftp/tsg_ranjWG2_RL2/TSGR2_93/Docs/[retrieved on Feb. 19, 2016].

Intel Corporation: "On System Operation and Common Control Messages for NB-IoT", 3GPP Draft; R1-160134—Intel NB-IOT, 3rd Generation Partnership Project (3GPP), Mobile Competence Centre, 650, Route Des Lucioles, F-06921 Sophia-Antipolis Cede, France, vol. RAN WG1, No. Budapest, HU, Jan. 18, 2016-Jan. 20, 2016, Jan. 17, 2016 (Jan. 17, 2016), 4 Pages, XP051053453, Retrieved from the Internet: URL: http://www.3gpp.org/ftp/Meetings_3GPP_SYNC/RAN1/Docs/ [retrieved on Jan. 17, 2016].

Partial International Search Report—PCT/US2017/035772—ISA/EPO—dated Aug. 28, 2017.

Qualcomm: "MulteFire Technology Progress and Benefits, and How It Enables a New Breed of Neutral Hosts", May 24, 2016, XP055378284, Retrieved from the Internet: URL:https://www.qualcomm.com/documents/multefire-technology [retrieved on Jun. 2, 2017], 26 pages.

Sharp: "On Non-Anchor PRBs for NB-IoT Multi-Carrier Operation", 3GPP Draft; R1-162835, 3rd Generation Partnership Project (3GPP), Mobile Competence Centre, 650, Route Des Lucioles; F-06921 Sophia-Antipolis Cedex, France, vol. RAN WG1, No. Busan, Korea; Apr. 11, 2016-Apr. 15, 2016, Apr. 6, 2016 (Apr. 6, 2016), pp. 1-5, XP051080727, Retrieved from the Internet: URL: http://www.3gpp.org/ftp/tsg_ran/WG1_RL1/TSGR1_84b/Docs/ [retrieved on Apr. 6, 2016].

Wang Y.P.E., et al., "A Primer on 3GPP Narrowband Internet of Things (NB-IoT)", Jun. 2016, pp. 1-8.

WI Rapporteur (Ericsson): "RAN1 agreements for Rel-13 NB-IoT", 3GPP TSG-RAN WG1 Meeting #84bis, R1-163943, Apr. 27, 2016, XP051090321, Retrieved from the Internet: URL:http://www.3gpp.org/ftp/tsg_ran/WG1_RL1/TSGR1_84b/Docs/ [retrieved on Apr. 27, 2016], 28 Pages.

ZTE: "Discussion on further enhancement of LAA for LTE", 3GPP Draft; RP-160926 Discussion on Further Enhancement of LAA for L TE, val. TSG RAN, No. Susan, Korea; Jun. 12, 2016. Retrieved from the Internet: URL: http://www.3gpp.org/ftp/Meetings_3GPP SYNC/RAN/Docs/ [retrieved on Jun. 12, 2016].

Huawei et al., "Multiple NB-IoT Carrier Deployment", 3GPP Draft; R1-156923, 3rd Generation Partnership Project (3GPP), Mobile Competence Centre; 650, Route Des Luciolos; F-06921 Sophia-Anti Polls Cedex; France, vol. RAN WG1, No. Anaheim, USA; Nov. 15, 2015, XP051039951, Retrieved from the Internet: URL:http://www.3gpp.org/ftp/Meetings_3GPP_SYNC/RAN1/Docs/ [retrieved on Nov. 15, 2015], 4 pages.

International Search Report and Written Opinion—PCT/US2017/035772—ISA/EPO—dated Dec. 14, 2017.

Wang H., et al., "Performance of Uplink Carrier Aggregation in LTE-Advanced Systems", IEEE 72nd, Vehicular Technology Con-

(56) References Cited

OTHER PUBLICATIONS ference Fall (VTC 2010—Fall), Sep. 6, 2010, pp. 1-5, XP031770490, ISBN: 978-1-4244-3573-9.

* cited by examiner

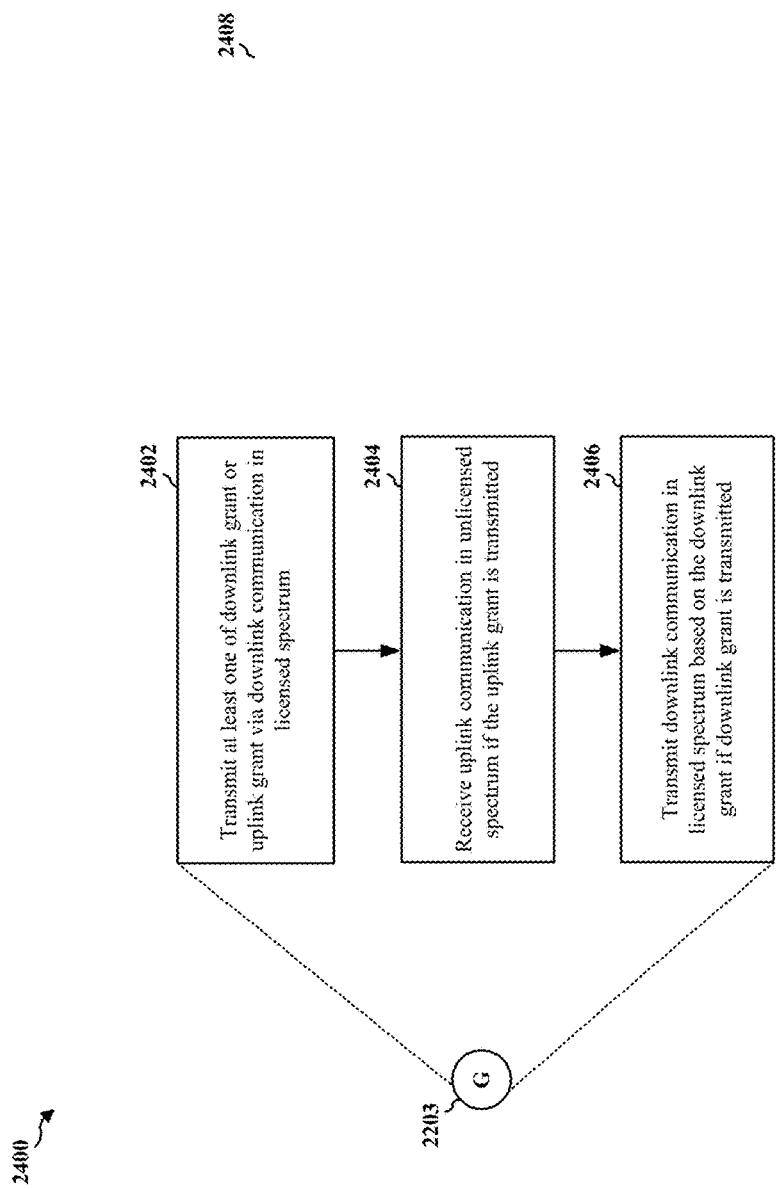

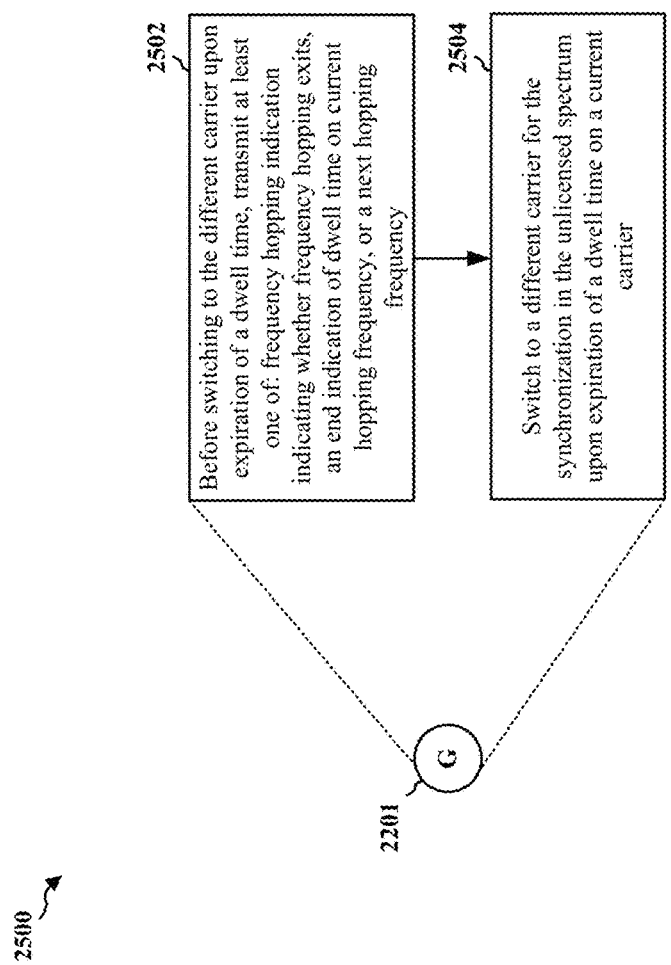

METHODS AND APPARATUS FOR IOT OPERATION IN UNLICENSED SPECTRUM

CROSS-REFERENCE TO RELATED APPLICATION(S)

This application claims the benefit of U.S. Provisional Application Ser. No. 62/363,128, entitled "DESIGN CONSIDERATIONS FOR IOT OPERATION IN UNLICENSED SPECTRUM" and filed on Jul. 15, 2016, which is expressly incorporated by reference herein in its entirety.

BACKGROUND

Field

The present disclosure relates generally to communication systems, and more particularly, to an internet-of-things operation.

Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is Long Term Evolution (LTE). LTE is a set of enhancements to the Universal Mobile Telecommunications System (UMTS) mobile standard promulgated by Third Generation Partnership Project (3GPP). LTE is designed to support mobile broadband access through improved spectral efficiency, lowered costs, and improved services using OFDMA on the downlink, SC-FDMA on the uplink, and multiple-input multiple-output (MIMO) antenna technology.

However, as the demand for mobile broadband access continues to increase, there exists a need for further improvements in LTE technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

The internet of things (IOT) is a network of devices that are capable of collecting and exchanging data among the devices in the network. As IOT is being actively studied, narrowband IOT is under development (e.g., for low energy, low cost operations).

In an aspect of the disclosure, a method, a computer-readable medium, and an apparatus are provided. The apparatus may be a user equipment (UE) for wireless communication via narrowband IOT (NB IOT) communication in an unlicensed spectrum using digital modulation. The UE utilizes a plurality of downlink carriers in the unlicensed spectrum occupying at least a first minimum bandwidth by the plurality of downlink carriers and a plurality of uplink carriers in the unlicensed spectrum occupying at least a second minimum bandwidth with the plurality of uplink carriers. The UE performs communication using one or more of the plurality of downlink carriers and the plurality of uplink carriers.

In an aspect, the apparatus may be a UE for wireless communication via NB IOT communication in an unlicensed spectrum using digital modulation. The UE may include means for utilizing a plurality of downlink carriers in the unlicensed spectrum occupying at least a first minimum bandwidth by the plurality of downlink carriers and a plurality of uplink carriers in the unlicensed spectrum occupying at least a second minimum bandwidth with the plurality of uplink carriers. The UE may include means for performing communication using one or more of the plurality of downlink carriers and the plurality of uplink carriers.

In an aspect, the apparatus may be a UE for wireless communication via NB IOT in an unlicensed spectrum using digital modulation, including a memory and at least one processor coupled to the memory. The at least one processor is configured to: utilize a plurality of downlink carriers in the unlicensed spectrum occupying at least a first minimum bandwidth by the plurality of downlink carriers and a plurality of uplink carriers in the unlicensed spectrum occupying at least a second minimum bandwidth with the plurality of uplink carriers, and perform communication using one or more of the plurality of downlink carriers and the plurality of uplink carriers.

In an aspect, a computer-readable medium storing computer executable code, for a UE for wireless communication via NB IOT communication in an unlicensed spectrum using digital modulation includes code to: utilize a plurality of downlink carriers in the unlicensed spectrum occupying at least a first minimum bandwidth by the plurality of downlink carriers and a plurality of uplink carriers in the unlicensed spectrum occupying at least a second minimum bandwidth with the plurality of uplink carriers, and perform communication using one or more of the plurality of downlink carriers and the plurality of uplink carriers.

In an aspect of the disclosure, a method, a computer-readable medium, and an apparatus are provided. The apparatus may be a base station for wireless communication via NB IOT communication in an unlicensed spectrum using digital modulation. The base station configures a plurality of downlink carriers in the unlicensed spectrum to occupy at least a first minimum bandwidth by the plurality of downlink carriers and a plurality of uplink carriers in the unlicensed spectrum to occupy at least a second minimum bandwidth with the plurality of uplink carriers. The base station performs communication using one or more of the plurality of downlink carriers and the plurality of uplink carriers.

In an aspect, the apparatus may be a base station for wireless communication via NB IOT communication in an unlicensed spectrum using digital modulation. The base station may include means for configuring a plurality of downlink carriers in the unlicensed spectrum to occupy at least a first minimum bandwidth by the plurality of downlink carriers and a plurality of uplink carriers in the unlicensed spectrum to occupy at least a second minimum bandwidth with the plurality of uplink carriers. The base station may include means for performing communication using one or more of the plurality of downlink carriers and the plurality of uplink carriers.

In an aspect, the apparatus may be a base station for wireless communication via NB IOT communication in an unlicensed spectrum using digital modulation, including a memory and at least one processor coupled to the memory. The at least one processor is configured to: configure a plurality of downlink carriers in the unlicensed spectrum to occupy at least a first minimum bandwidth by the plurality of downlink carriers and a plurality of uplink carriers in the unlicensed spectrum to occupy at least a second minimum bandwidth with the plurality of uplink carriers, and perform communication using one or more of the plurality of downlink carriers and the plurality of uplink carriers.

In an aspect, a computer-readable medium storing computer executable code, for a base station for wireless communication via NB IOT communication in an unlicensed spectrum using digital modulation includes code to: configure a plurality of downlink carriers in the unlicensed spectrum to occupy at least a first minimum bandwidth by the plurality of downlink carriers and a plurality of uplink carriers in the unlicensed spectrum to occupy at least a second minimum bandwidth with the plurality of uplink carriers, and perform communication using one or more of the plurality of downlink carriers and the plurality of uplink carriers.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 24 is a flowchart of a method of wireless communication, expanding from the flowchart of FIG. 22.

FIG. 25 is a flowchart of a method of wireless communication, expanding from the flowchart of FIG. 22.

DETAILED DESCRIPTION

Figure 1:
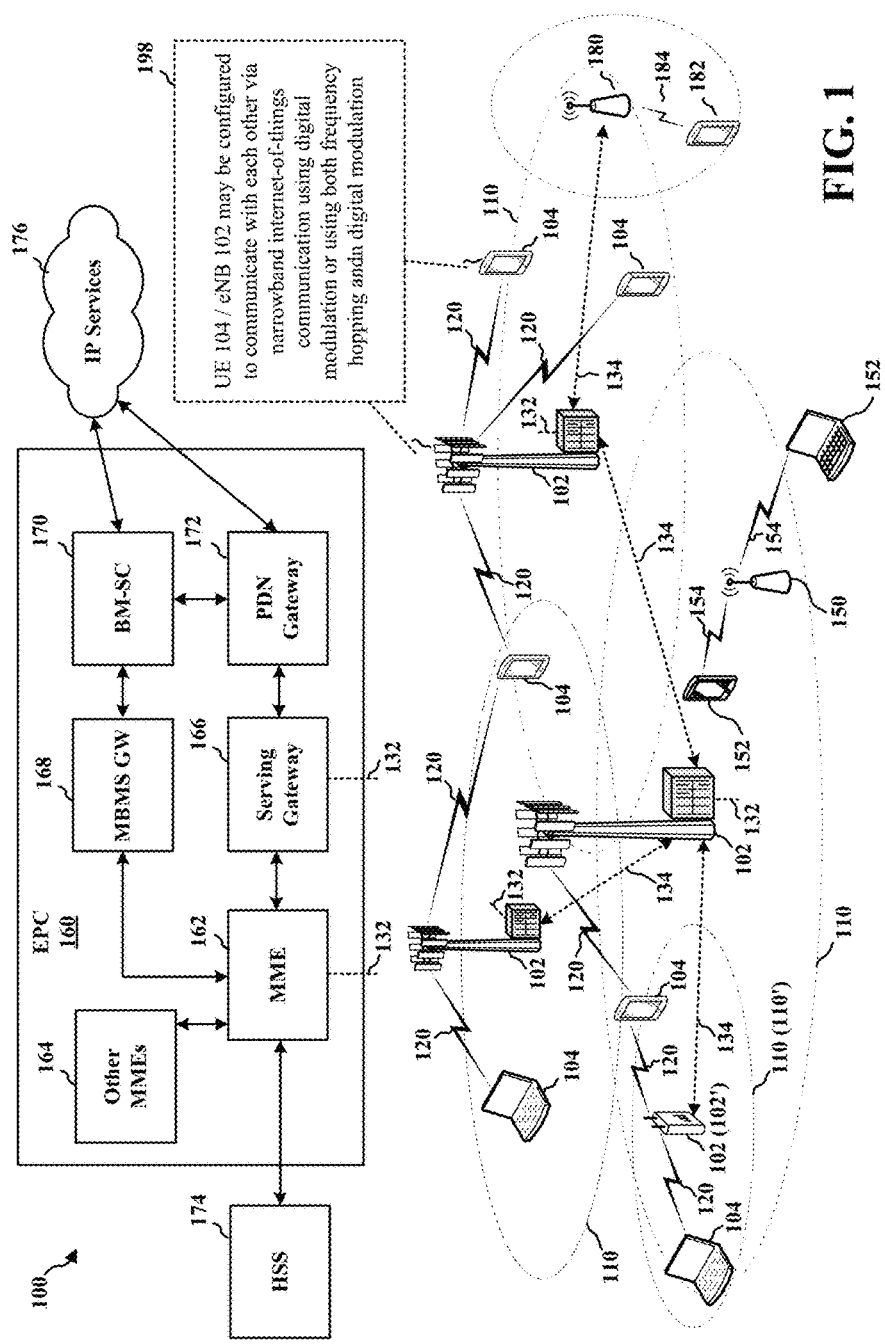
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, and an Evolved Packet Core (EPC) 160. The base stations 102 may include macro cells (high power cellular base station) and/or small cells (low power cellular base station). The macro cells include eNBs. The small cells include femtocells, picocells, and microcells.

The base stations 102 (collectively referred to as Evolved Universal Mobile Telecommunications System (UMTS) Terrestrial Radio Access Network (E-UTRAN)) interface with the EPC 160 through backhaul links 132 (e.g., S1 interface). In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use MIMO antenna technology, including spatial multiplexing, beamforming, and/or transmit diversity. The communication links may be through one or more carriers. The base stations 102 / UEs 104 may use spectrum up to Y MHz (e.g., 5, 10, 15, 20 MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ LTE and use the same 5 GHz unlicensed frequency spectrum as used by the Wi-Fi AP 150. The small cell 102', employing LTE in an unlicensed frequency spectrum, may boost coverage to and/or increase capacity of the access network. LTE in an unlicensed spectrum may be referred to as LTE-unlicensed (LTE-U), licensed assisted access (LAA), or MuLTEfire.

The millimeter wave (mmW) base station 180 may operate in mmW frequencies and/or near mmW frequencies in communication with the UE 182. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band has extremely high path loss and a short range. The mmW base station 180 may utilize beamforming 184 with the UE 182 to compensate for the extremely high path loss and short range of mmW communication.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service (PSS), and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The base station may also be referred to as a Node B, evolved Node B (eNB), an access point, a base transceiver station, a radio base station, a radio transceiver, a transceiver function, a basic service set (BSS), an extended service set (ESS), or some other suitable terminology. The base station 102 provides an access point to the EPC 160 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, or any other similar functioning device. The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the UE 104/eNB 102 may be configured to communicate with each other via narrowband internet-of-things communication using digital modulation or using both frequency hopping and digital modulation (198).

Figure 2:
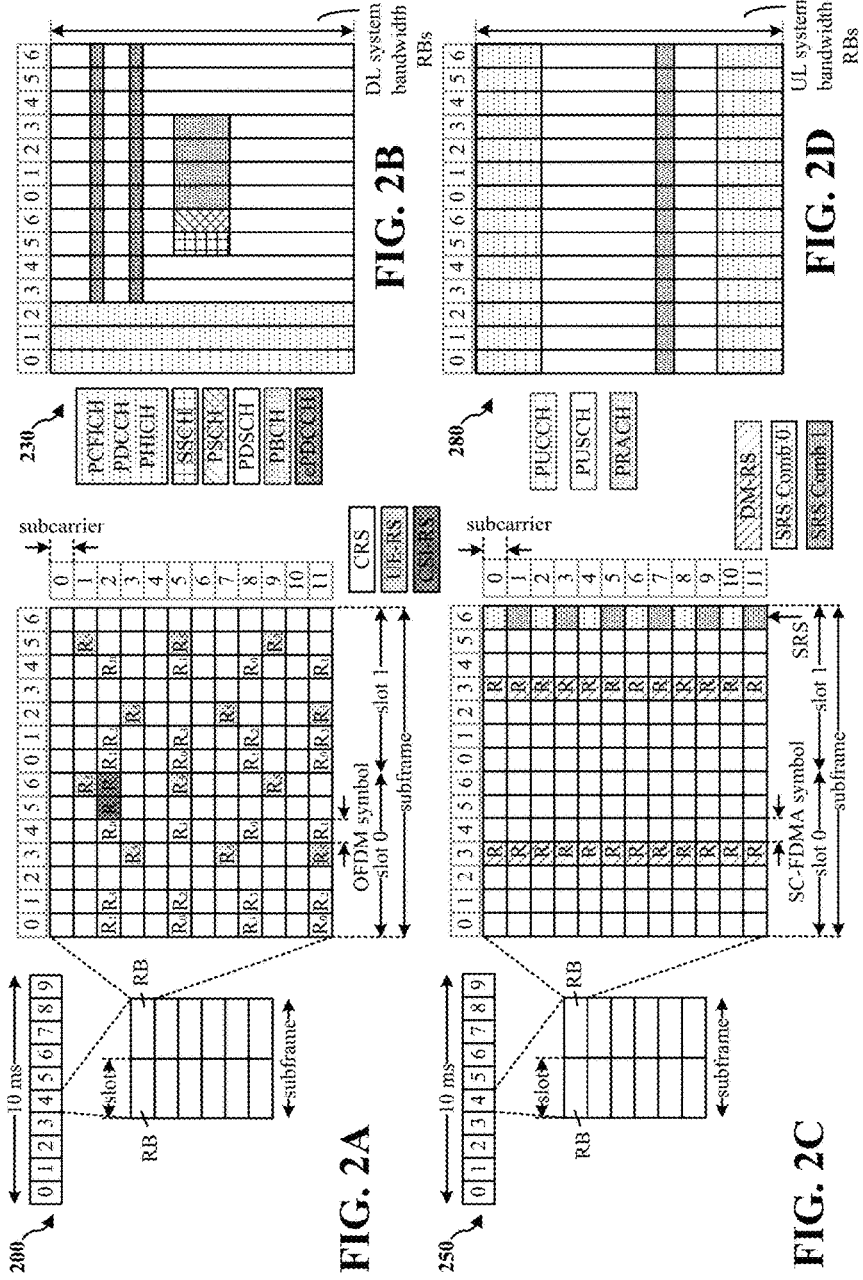
FIGS. 2A, 2B, 2C, and 2D are diagrams illustrating LTE examples of a DL frame structure, DL channels within the DL frame structure, an UL frame structure, and UL channels within the UL frame structure, respectively.

FIG. 2A is a diagram 200 illustrating an example of a DL frame structure in LTE. FIG. 2B is a diagram 230 illustrating an example of channels within the DL frame structure in LTE. FIG. 2C is a diagram 250 illustrating an example of an UL frame structure in LTE. FIG. 2D is a diagram 280 illustrating an example of channels within the UL frame structure in LTE. Other wireless communication technologies may have a different frame structure and/or different channels. In LTE, a frame (10 ms) may be divided into 10 equally sized subframes. Each subframe may include two consecutive time slots. A resource grid may be used to represent the two time slots, each time slot including one or more time concurrent resource blocks (RBs) (also referred to as physical RBs (PRBs)). The resource grid is divided into multiple resource elements (REs). In LTE, for a normal cyclic prefix, an RB contains 12 consecutive subcarriers in the frequency domain and 7 consecutive symbols (for DL, OFDM symbols; for UL, SC-FDMA symbols) in the time domain, for a total of 84 REs. For an extended cyclic prefix, an RB contains 12 consecutive subcarriers in the frequency domain and 6 consecutive symbols in the time domain, for a total of 72 REs. The number of bits carried by each RE depends on the modulation scheme.

As illustrated in FIG. 2A, some of the REs carry DL reference (pilot) signals (DL-RS) for channel estimation at the UE. The DL-RS may include cell-specific reference signals (CRS) (also sometimes called common RS), UE-specific reference signals (UE-RS), and channel state information reference signals (CSI-RS). FIG. 2A illustrates CRS for antenna ports 0, 1, 2, and 3 (indicated as $R_0$, $R_1$, $R_2$, and $R_3$, respectively), UE-RS for antenna port 5 (indicated as $R_5$), and CSI-RS for antenna port 15 (indicated as R). FIG. 2B illustrates an example of various channels within a DL subframe of a frame. The physical control format indicator channel (PCFICH) is within symbol 0 of slot 0, and carries a control format indicator (CFI) that indicates whether the physical downlink control channel (PDCCH) occupies 1, 2, or 3 symbols (FIG. 2B illustrates a PDCCH that occupies 3 symbols). The PDCCH carries downlink control information (DCI) within one or more control channel elements (CCEs), each CCE including nine RE groups (REGs), each REG including four consecutive REs in an OFDM symbol. A UE may be configured with a UE-specific enhanced PDCCH (ePDCCH) that also carries DCI. The ePDCCH may have 2, 4, or 8 RB pairs (FIG. 2B shows two RB pairs, each subset including one RB pair). The physical hybrid automatic repeat request (ARQ) (HARQ) indicator channel (PHICH) is also within symbol 0 of slot 0 and carries the HARQ indicator (HI) that indicates HARQ acknowledgement (ACK)/negative ACK (NACK) feedback based on the physical uplink shared channel (PUSCH). The primary synchronization channel (PSCH) is within symbol 6 of slot 0 within subframes 0 and 5 of a frame, and carries a primary synchronization signal (PSS) that is used by a UE to determine subframe timing and a physical layer identity. The secondary synchronization channel (SSCH) is within symbol 5 of slot 0 within subframes 0 and 5 of a frame, and carries a secondary synchronization signal (SSS) that is used by a UE to determine a physical layer cell identity group number. Based on the physical layer identity and the physical layer cell identity group number, the UE can determine a physical cell identifier (PCI). Based on the PCI, the UE can determine the locations of the aforementioned DL-RS. The physical broadcast channel (PBCH) is within symbols 0, 1, 2, 3 of slot 1 of subframe 0 of a frame, and carries a master information block (MIB). The MIB provides a number of RBs in the DL system bandwidth, a PHICH configuration, and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry demodulation reference signals (DM-RS) for channel estimation at the eNB. The UE may additionally transmit sounding reference signals (SRS) in the last symbol of a subframe. The SRS may have a comb structure, and a UE may transmit SRS on one of the combs. The SRS may be used by an eNB for channel quality estimation to enable frequency-dependent scheduling on the UL. FIG. 2D illustrates an example of various channels within an UL subframe of a frame. A physical random access channel (PRACH) may be within one or more subframes within a frame based on the PRACH configuration. The PRACH may include six consecutive RB pairs within a subframe. The PRACH allows the UE to perform initial system access and achieve UL synchronization. A physical uplink control channel (PUCCH) may be located on edges of the UL system bandwidth. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
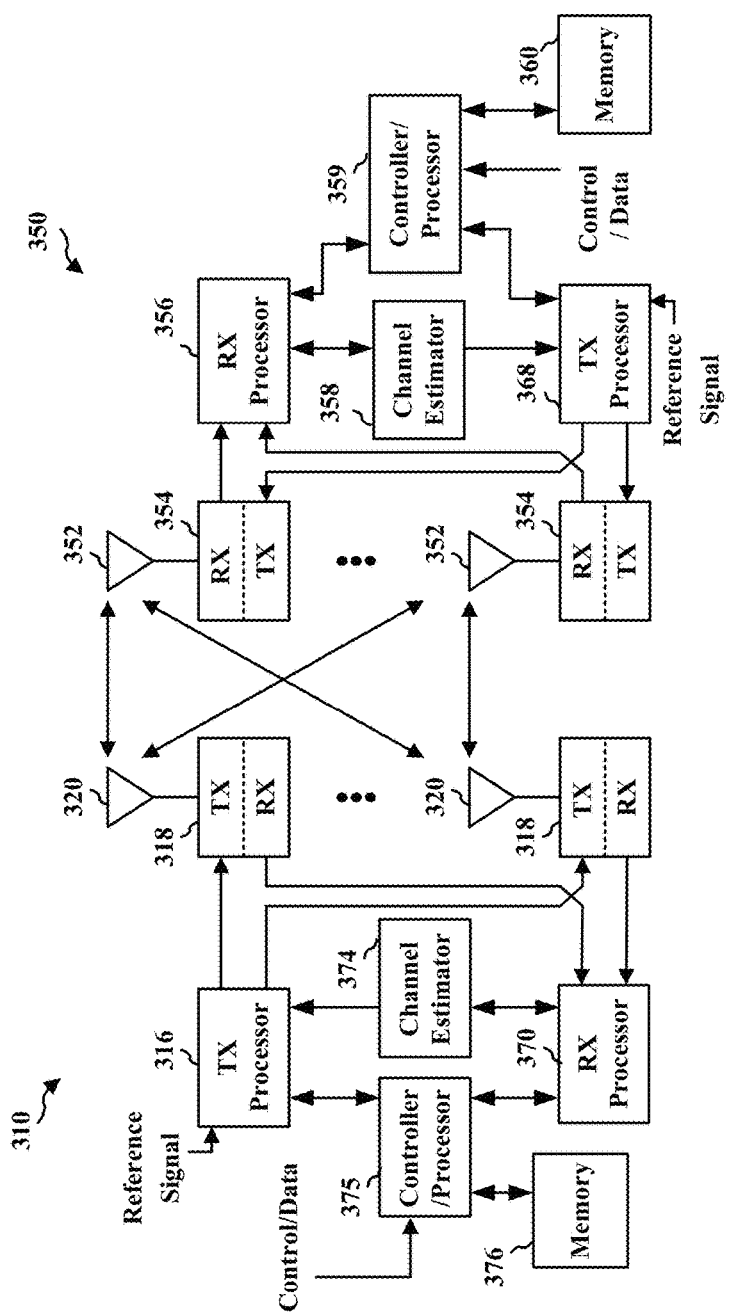
FIG. 3 is a diagram illustrating an example of an evolved Node B (eNB) and user equipment (UE) in an access network.

FIG. 3 is a block diagram of an eNB 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the eNB 310. These soft decisions may be based on channel estimates computed by the channel estimator 358. The soft decisions are then decoded and deinterleaved to recover the data and control signals that were originally transmitted by the eNB 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the eNB 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the eNB 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the eNB 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

Figure 4:
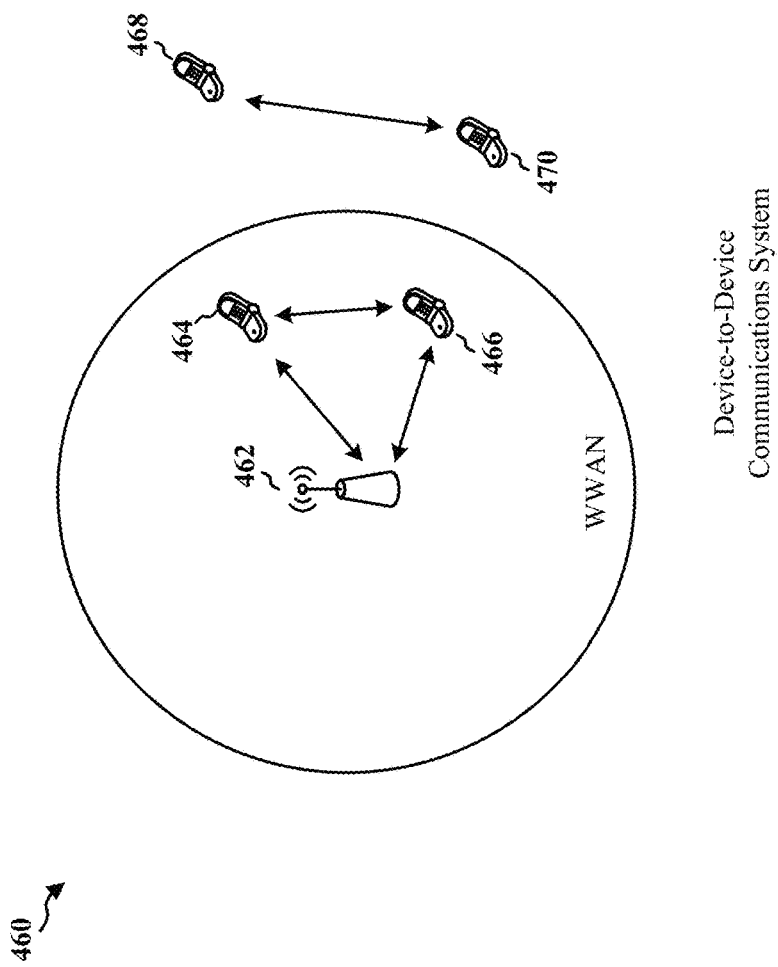
FIG. 4 is a diagram of a device-to-device communications system.

FIG. 4 is a diagram of a device-to-device (D2D) communications system 460. The D2D communications system 460 includes a plurality of UEs 464, 466, 468, 470. The D2D communications system 460 may overlap with a cellular communications system, such as for example, a WWAN. Some of the UEs 464, 466, 468, 470 may communicate together in D2D communication using the DL/UL WWAN spectrum, some may communicate with the base station 462, and some may do both. For example, as shown in FIG. 4, the UEs 468, 470 are in D2D communication and the UEs 464, 466 are in D2D communication. The UEs 464, 466 are also communicating with the base station 462. The D2D communication may be through one or more sidelink channels, such as a physical sidelink broadcast channel (PSBCH), a physical sidelink discovery channel (PSDCH), a physical sidelink shared channel (PSSCH), and a physical sidelink control channel (PSCCH).

The exemplary methods and apparatuses discussed infra are applicable to any of a variety of wireless D2D communications systems, such as for example, a wireless device-to-device communication system based on FlashLinQ, WiMedia, Bluetooth, ZigBee, or Wi-Fi based on the IEEE 802.11 standard. To simplify the discussion, the exemplary methods and apparatus are discussed within the context of LTE. However, one of ordinary skill in the art would understand that the exemplary methods and apparatuses are applicable more generally to a variety of other wireless device-to-device communication systems.

The internet of things (IOT) is a network of devices that are capable of collecting and exchanging data among the devices in the network. In an aspect, IOT devices may communicate with each other to transmit information and to gather information from each other. In an aspect, IOT devices may communicate information to a network, such that a central system in the network may gather information from various IOT devices and provide the IOT devices with useful information based on the gathered information.

Figure 5:
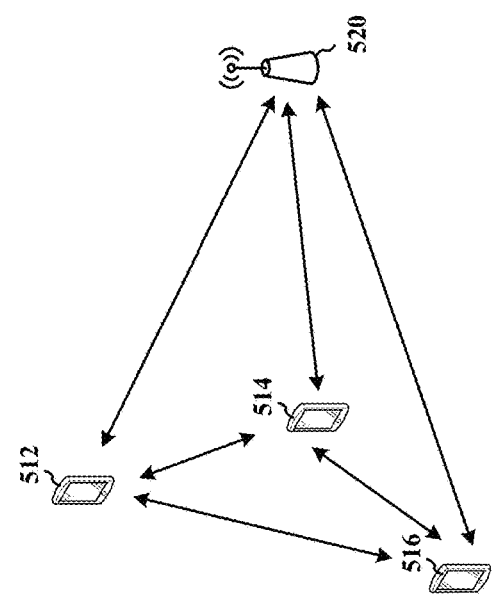
FIG. 5 is an example diagram illustrating communication by narrowband internet-of-things devices.

Among various IOT approaches, a narrowband (NB) IOT has been under development. FIG. 5 is an example diagram 500 illustrating communication by narrowband internet-of-things devices. As shown in FIG. 5, the NB IOT devices 512, 514, and 516 may communicate with a base station 520 and may also communicate with one another. The NB IOT may be utilized in a licensed frequency spectrum band. The NB IOT may provide half-duplex frequency division duplex (FDD) to allow separate transmission and reception, without allowing simultaneous transmission and reception. The NB IOT may operate at a system bandwidth of 180 KHz (e.g., for both UL and DL). The NB IOT may provide three different modes of operation, including an in-band mode, a guard band mode, and a standalone mode. In the in-band mode, one or more RBs in the existing LTE carriers may be allocated for NB IOT. In the guard-band mode, one or more bands (e.g., guard-bands) existing between LTE carriers may be allocated for NB IOT. In the standalone mode, a band that is completely independent from the LTE carriers may be used for NB IOT. In the NB IOT, channels may be repeated in the time domain to obtain extended coverage (e.g., for a certain coupling loss (MCL), e.g., 160 dB). The NB IOT may provide multi-carrier operation to support RRC-idle mode camping on one carrier and RRC-connected mode camping on another carrier. For the NB IOT, one or more of a power saving mode (PSM), a connected-mode discontinuous reception (C-DRX) mode, an extended idle discontinuous reception (I-DRX) mode, and a no-handover mode may be supported during connected mode operation for power saving.

Certain regulations (e.g., Regulation 15-247 in the U.S.) may apply to the frequency bands 902-928 MHz, 2400-2483.5 MHz, and 5725-5850 MHz. Three different systems are available for deployment in the NB IOT, including a non-frequency hopping system, a frequency hopping system, and a hybrid system. Each system may include an NB IOT device and/or a base station.

For a non-frequency hopping system, a 6 dB bandwidth may be at least 500 KHz. The non-frequency hopping system may be a digital modulation system that utilizes quadrature phase shift keying (QPSK). The non-frequency hopping systems may operate in the frequency band 902-928 MHz with a 6 dB minimum frequency bandwidth of at least 500 KHz.

A frequency hopping system may have hopping channel carrier frequencies separated by at least 25 kHz or a 20 dB bandwidth of the hopping frequency, whichever is greater. The frequency hopping system hops between hopping frequencies selected from a pseudo-randomly ordered list of hopping frequencies. Each hopping frequency may be used equally, on average, by each transmitter. The receivers for the frequency hopping system may have input bandwidths that match the hopping frequency bandwidths of the transmitters corresponding to the receivers. Each receiver for the frequency hopping system may shift frequencies in synchronization with the signals transmitted from the corresponding transmitter. For a frequency hopping system operating in the 902-928 MHz band, if the 20 dB bandwidth of the hopping frequency is less than 250 kHz, the system may use at least 50 hopping frequencies and the average time of occupancy on any of the hopping frequencies may be less than or equal to 0.4 seconds within a 20 second period. Thus, in such a case, the frequency hopping system may not occupy any hopping frequency for more than 0.4 seconds in every 20 second period. For a frequency hopping system operating in the 902-928 MHz band, if the 20 dB bandwidth of the hopping frequency is 250 kHz or greater, the frequency hopping system may use at least 25 hopping frequencies and the average time of occupancy on any of the hopping frequencies may not be greater than 0.4 seconds within a 10 second period. In such a case, the maximum allowed 20 dB bandwidth of a hopping frequency may be 500 kHz.

Transmit power constraints may exist for the non-frequency hopping (digital modulation) system and for the frequency hopping system. For a digital modulation system, the transmit power of 1 Watt (W) may be used (e.g., based on a max 6 dBi antenna gain). Further, for a digital modulation system, the power spectral density (PSD) radiated from an intentional radiator to an antenna may not be greater than 8 dBm in any 3 kHz frequency band during any time interval of a continuous transmission. For a frequency hopping system operating in the 902-928 MHz band, a transmit power of 1 Watt may be used when at least 50 hopping frequencies are deployed, and the transmit power of 0.25 Watts may be used when less than 50 hopping frequencies, but at least 25 hopping frequencies are deployed.

A hybrid system is a system that employs a combination of both frequency hopping and digital modulation features. The frequency hopping operation of the hybrid system, with the direct sequence or digital modulation operation turned off, may have an average time of occupancy on any frequency that does not exceed 0.4 seconds within a time period equal to the number of hopping frequencies employed multiplied by 0.4 seconds. For example, if there are 20 hopping frequencies, the average time of occupancy on a hopping frequency may not exceed 0.4 seconds within an 8 second time period (20×0.4 seconds=8 seconds). Unlike the frequency hopping system, the hybrid system may have no restriction on a number of frequencies on which the hybrid system may operate. The PSD radiated from an intentional radiator to an antenna due to the digital modulation operation of the hybrid system (with the frequency hopping operation deactivated) may not be greater than 8 dBm in any 3 kHz band during any time interval of a continuous transmission. In the hybrid system, an intelligent feature within a frequency hopping spread spectrum may permit the system to recognize other devices within the spectrum band so that the hybrid system may individually and independently choose and adapt the frequency hopping sets to avoid hopping on occupied frequencies (e.g. frequencies occupied by device(s)). Coordination of frequency hopping systems in any other manner for the sole purpose of avoiding the simultaneous occupancy of individual hopping frequencies by multiple transmitters may not be permitted.

During an NB IOT communication, synchronization signals such as a narrowband primary synchronization signal (NPSS), a narrowband secondary synchronization signal (NSSS), and a narrowband physical broadcast channel (NPBCH) may be utilized. In the DL, 1 RB may be used to transmit the NPSS and the NSSS. The NPSS may be transmitted once every 10 msec and the NSSS may be transmitted once every 20 msec. The NPSS may be transmitted in 11 symbols. Thus, 11 symbols out of 14 total symbols may be occupied by the NPSS. For example, among symbols #0 to #13, symbols #3 to #13 may be occupied by the NPSS. Similarly, the NSSS may be transmitted in 11 symbols. For example, among symbols #0 to #13, symbols #3 to #13 may be occupied by the NSSS. The NPSS may be transmitted in multiple symbols within 1 RB, to provide a sufficient coverage gain. The NPSS may carry information for cellular discovery and coarse time/frequency synchronization. The NPSS may not carry cell ID information. The NSSS may carry other information such as cell ID information. The NPBCH may carry information indicating at least one mode of different modes (e.g., in-band, guard-band, standalone) and may also provide timing information. Deployment of a PDCCH and a PDSCH in NB IOT may be similar to LTE deployment, except that in NB IOT, a PDSCH may be received two or three subframes after the subframe in which a PDCCH is received. In NB IOT, a PUSCH may be transmitted using multi-tones (e.g., multiple tones), at a tone spacing of 3.75 KHz and/or 15 KHz, whereas a PRACH may be transmitted using a single tone.

According to an aspect of the disclosure, two NB IOT configurations with various features may be utilized. In a first configuration, a digital modulation system may be utilized for NB IOT communication. In an aspect, according to the first configuration, an eNB may deploy NB IOT with multiple NB IOT UL carriers (e.g., UL carriers) and multiple NB IOT DL carriers (e.g., DL carriers), to provide at least a first minimum bandwidth (e.g., at least a first 6 dB bandwidth) of the system on the UL and at least a second minimum bandwidth (e.g., at least a second 6 dB bandwidth) of the system on the DL. Thus, an NB IOT device may be configured to utilize multiple NB IOT UL carriers (e.g., UL carriers) and multiple NB IOT DL carriers (e.g., DL carriers). The eNB may convey carrier information to the NB IOT device such that the NB IOT device may be configured to utilize multiple NB IOT UL carriers and multiple NB IOT DL carriers based on the carrier information, where the carrier information may indicate available DL carriers and UL carriers. The eNB may convey the carrier information to the NB IOT device via a SIB (e.g., SIB1 and/or SIB2) and/or an RRC message to the NB IOT device. The NB IOT device may be configured to utilize multiple NB IOT UL carriers and multiple NB IOT DL carriers further based on the capability of the NB IOT device (e.g., capability to utilize a certain number of DL carriers and a certain number of UL carriers). In an aspect, a total bandwidth occupied by the multiple NB IOT UL carriers should be greater than or equal to a minimum bandwidth of the system for UL. In an aspect, a total bandwidth occupied by the multiple NB IOT DL carriers should be greater than or equal to a minimum bandwidth of the system for DL. The NB IOT device and the base station may communicate with each other using the multiple NB IOT UL carriers and the multiple NB IOT DL carriers. In an aspect, the number of the multiple NB IOT UL carriers may be at least three, and the number of the multiple NB IOT DL carriers may be at least three. The digital modulation system according to an aspect of the disclosure may have the following specifications. The total bandwidth available may be 26 MHz (e.g., 902 MHz to 928 MHz). A minimum bandwidth of the system may be 500 KHz with a PSD restriction of 8 dBm per any 3 KHz band. The system may have a total transmit power of 1 W (30 dBm). The minimum bandwidth requirement of 500 KHz may be applicable to the system, instead of being applicable to each individual transmission, to be able to more reliably perform UL transmission. Thus, for example, when the digital modulation system is deployed in the 902 MHz-928 MHz band, an eNB may deploy NB IOT in a stand-alone configuration with a minimum of three in-band contiguous NB IOT UL carriers and a minimum of three in-band contiguous NB IOT DL carriers, to provide at least 500 KHz bandwidth (e.g., the minimum bandwidth) on the UL and at least 500 KHz bandwidth (e.g., minimum bandwidth) on the DL. The number of DL carriers and UL carriers may be different.

In an aspect, the digital modulation system may be based on FDD. Although the eNB may have an FDD capability, an NB IOT device may have a half-duplex FDD capability. If the eNB has a full-duplex FDD capability, the minimum frequency separation between the DL frequency band and the UL frequency band may impact a maximum number of NB IOT carriers deployed next to each other. A half-duplex FDD system may be made to operate like a TDD system by using the same carrier for DL and UL.

Figure 6:
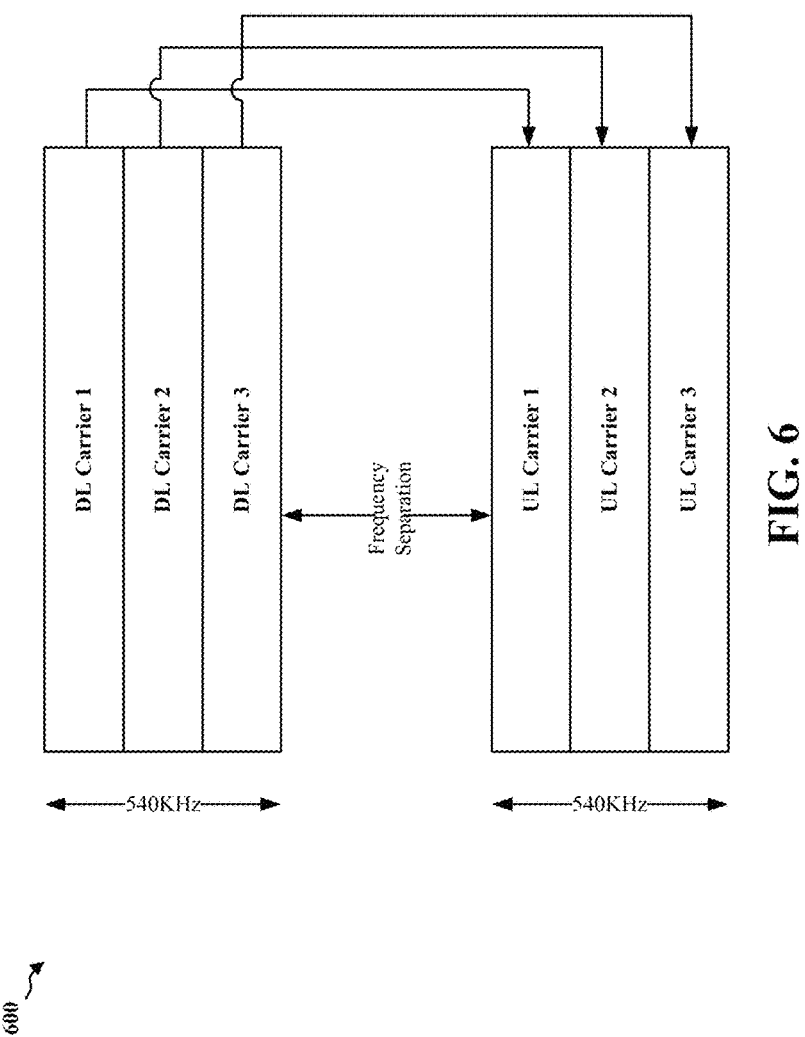
FIG. 6 is an example diagram illustrating downlink carriers and uplink carriers.

In an aspect of the digital modulation system, the eNB may configure an NB IOT device with multiple DL carriers (e.g., at least 3 DL carriers) in a first frequency band of the unlicensed spectrum and multiple UL carriers (e.g., at least 3 UL carriers) in a second frequency band of the unlicensed spectrum. Thus, the NB IOT device may be configured to utilize multiple UL carriers and multiple DL carriers in the unlicensed spectrum. The NB IOT device utilizing the unlicensed spectrum may be operating in a standalone mode. In an aspect, the NB IOT device may receive a synchronization signal such as an NPSS and an NSSS on a carrier aligned with a raster. In the standalone mode for NB IOT, a center frequency of a carrier for the NPSS/NSSS may be aligned with a raster (e.g., 100 KHz raster) or within a few KHz of the raster frequency (e.g., the center frequency of the carrier a few KHz less than 100 KHz). For example, the carrier frequency for the NPSS/NSSS may be a multiple of the raster frequency. In an aspect, a center of the anchor carrier(s) (e.g., among the 3 or more carriers) for each of the DL frequency band and the UL frequency band may be a multiple of 100 KHz., where the anchor carrier(s) may be carriers used to receive synchronization signals such as the NPSS and the NSSS. For example, a center frequency of a DL anchor carrier may be aligned at 100 KHz, and a center frequency of an UL anchor carrier may be aligned at 1400 KHz. FIG. 6 is an example diagram 600 illustrating downlink carriers and uplink carriers. Each of the carriers occupies 180 KHz. Thus, the DL carriers (e.g., DL Carriers 1-3) may occupy a bandwidth of 540 KHz and the UL carriers (e.g., UL Carriers 1-3) may occupy a bandwidth of 540 KHz. In the example diagram 500, DL Carrier 1 may be a DL anchor carrier, and UL Carrier 1 may be an UL anchor carrier. DL Carriers 1-3 may correspond with UL Carriers 1-3. For simultaneous transmission and reception by an eNB, a frequency separation may be needed between the DL Carriers 1-3 and the UL Carriers 1-3.

Deploying three or more carriers in the DL frequency band or the UL frequency band may make carrier discovery difficult when the carriers are adjacent to each other with a 100 KHz raster and the carriers are spaced apart by 180 KHz. Thus, the following options may be utilized for NB IOT communication to make carrier discovery less difficult. According to a first option, the raster may be set to a frequency less than 100 KHz (e.g., 15 KHz or 30 KHz). According to a second option, the offset(s) from the raster may be provided to the NB IOT device such that the NB IOT device can search appropriate frequencies for the carriers during communication acquisition (e.g., by searching in a frequency range defined by the raster and the offset(s) from the raster). In particular, the offset for the raster may be specified within the NB IOT device, such that the NB IOT device may determine specific frequencies to search for the carriers. For example, the offset for the raster may be specified in a removable memory (e.g., SIM card) or programmed in the NB IOT device. For example, if the raster is 100 KHz and an offset of 7.5 KHz is utilized, then the NB IOT device may search for the carriers in a range of −7.5 KHz to +7.5 KHz at every 100 KHz. In one example, the second option may be utilized if the first option is not feasible.

In an aspect, a total power (e.g., 1 W) may be shared among all the NB IOT carriers deployed by an eNB, when multiple DL carriers (e.g., at least 3 DL carriers) and multiple UL carriers (e.g., at least 3 UL carriers) are deployed. In particular, a total DL power (e.g., 1 W) may be shared (e.g., by the eNB) among all DL carriers such that DL carriers are allocated with DL powers for DL communication, each DL carrier being allocated with a respective DL power. Thus, for example, a power allocated to an NB-RS may change over time based on the total DL power allocated to the DL carriers. A total UL power (e.g., 1 W) may be shared (e.g., by the NB IOT device) among all UL carriers such that UL carriers are allocated with UL powers for UL communication, each UL carrier being allocated with a respective UL power. In an aspect, the total UL power and the total DL power may be the same. In one aspect, a static power split between multiple carriers may be implemented for the NB IOT communication, where each of the carriers may be provided with different power levels. For example, a static DL power split between multiple DL carriers may be implemented by the eNB. For example, a static UL power split between multiple UL carriers may be implemented by the NB IOT device. For purposes of illustration, assuming that there are three DL carriers and three UL carriers, a total power of 1 W may be shared among the DL carriers and the total power of 1 W may be shared among UL carriers. In one aspect, to share 1 W among three DL carriers, 0.5 Watts may be allocated to a first DL carrier, 0.2 Watts may be allocated to a second DL carrier, and 0.3 Watts may be allocated to a third DL carrier (e.g., by the eNB). In one aspect, to share 1 W among 3 UL carriers, 0.5 Watts may be allocated to a first UL carrier, 0.2 Watts may be allocated to a second UL carrier, and 0.3 Watts may be allocated to a third UL carrier (e.g., by the NB IOT device). In another aspect, a dynamic power split may be implemented, where the way the total power is allocated to different carriers changes over time, for the NB IOT communication. For example, a dynamic DL power split between multiple DL carriers may be implemented by the eNB. For example, a dynamic UL power split between multiple UL carriers may be implemented by the NB IOT device. In one example, the power allocation may be based on an amount of coverage and/or a number of transmission repetitions for a particular carrier. For example, more power may be allocated to a carrier that requires a larger coverage area, and more power may be allocated to a carrier with a higher number of transmission repetition.

In an aspect, power constraints may exist for DL communication and/or for UL communication. For DL communication, the following power constraints may exist. For the digital modulation system, the PSD radiated from an intentional radiator to an antenna should not be greater than 8 dBm/KHz in any 3 KHz band during any time interval of a continuous transmission. The PSD may be higher for an increased frequency bandwidth (e.g., a frequency band with a bandwidth greater than 3 KHz). For example, the PSD may be 8 dBm/KHz for a 3 KHz frequency bandwidth, 25.78 dBm/KHz for a 180 KHz frequency bandwidth, and 30.21/30.55 dBm/KHz for a 500/540 KHz frequency bandwidth. In an aspect, for NB IOT, an equal amount of power may be shared by each deployed carrier. For example, for NB IOT, assuming 30 dBm total power available, power allocated per DL carrier may be limited by the total power available (e.g., 30 dBm or 1 W), and may not be limited by the PSD restriction. For example, a DL power of 25.22 dBm may be allocated per DL carrier when 3 carriers are deployed, a DL power of 23.97 dBm may be allocated per DL carrier when 4 carriers are deployed, and a DL power of 23.01 dBm may be allocated per carrier when 5 carriers are deployed. In addition, power boosting for an NPSS transmission as compared to an NSSS transmission (e.g., a ratio of 12/11=0.38 dB) may not be possible due to PSD constraints (e.g., because the PSD constraints may impose a fixed limit on the amount of power). Power boosting for a narrow band reference signal (NB-RS) as compared to other DL channel transmissions also may not be possible due to PSD constraints.

UL communication in NB IOT communication may experience power constraints due to a PSD limitation, where UL communication may not be transmitted at a maximum available power especially when using a few tones (e.g., 1, 2 or 3 tones) that occupy a smaller bandwidth (e.g., assuming a maximum available power of 23 dBm). The NB IOT device may transmit UL communication using multi-tones, e.g., at a 15 KHz tone spacing or using a single tone at a 3.75 KHz tone spacing. For example, for UL communication with a 15 KHz tone spacing, the UL communication may be performed using 1 tone with a total transmit power of 14.98 dBm, or using 3 tones with a total transmit power of 19.76 dBm, or using 6 tones with a total transmit power of 22.77 dBm, or using 12 tones with a transmit power of 25.78 dBm (e.g., to meet the PSD constraint). For UL communication (e.g., PRACH/PUSCH transmission) with a 3.75 KHz tone spacing, the UL communication may be performed using 1 tone with a transmit power of 8.96 dBm (e.g., to meet the PSD constraint). To work around the UL power constraint, the following approaches may be used per 3 KHz bandwidth. In an aspect, according to one approach, the NB IOT device may configure a higher repetition level for PRACH/PUSCH transmission for all UL channels, where the PRACH/PUSCH transmission may be performed using one or more of the UL carriers. Further, in an aspect, according to one approach, the NB IOT device may be configured to perform multi-tone transmissions for all UL channels including transmission of a PUSCH Format 2 for ACK/NACK reporting and/or a PRACH transmission. In an aspect, a PUSCH format 1 may be configured for multi-tone transmission, but a PUSCH format 2 and a PRACH may also be configured for multi-tone transmission.

Communication gaps may be utilized for coexistence with other networks or may not be utilized to provide a continuous transmission without interruption. In NB IOT communication according to an aspect of the disclosure, NB IOT devices may refrain from transmitting during the communication gaps. Thus, communication gaps may allow for coexistence of NB IOT with other networks operating in the same frequency spectrum. The eNB may configure the communication gaps and advertise the existence of the communication gaps to NB IOT devices (e.g., by transmitting a communication gap indication), such that the NB IOT devices do not perform communication during the communication gaps. In an aspect, devices that are not associated with the NB IOT may transmit during the communication gaps, and thus coexistence of the NB IOT devices and other types of devices can be achieved by utilizing the communication gaps. The communication gaps may also be used if an eNB detects primary user interference (e.g., interference by a user device with the highest priority) in the system. The following options may be utilized to create communication gaps. In one aspect, for long communication gaps during which an eNB may stop transmission, the eNB may configure discontinuous transmission (DTX) periods as the transmission gaps and advertise the DTX periods (e.g., as the communication gap indication) so that no NB IOT device is allowed to transmit during the DTX periods. In one aspect, the eNB may configure discontinuous reception (DRX) periods to create reception gaps, and advertise the DRX periods to NB IOT devices such that the NB IOT devices may not perform UL transmission (e.g., PRACH transmission) and may not monitor DL channels (e.g., for updating time-frequency synchronization) during the DRX periods. During the DRX periods, the NB IOT device may power down to a low power state and turn off a receiver of the NB IOT device, and thus may not receive communication during the DRX periods. In one aspect, communication gaps may be indicated by a duty cycle. For example, a duty cycle of 10% may indicate that communication gaps occur 90% of the time. The duty cycle may be followed by the eNB and/or the UE, to indicate communication gaps in the eNB and/or the UE. The eNB may set the duty cycle and may signal the duty cycle to the UE.

According to a second configuration, a hybrid system with frequency hopping may be utilized for NB IOT, according to certain aspects of the disclosure. In particular, an NB IOT device may perform communication in an unlicensed spectrum and/or in a licensed spectrum using a hybrid system with a combination of digital modulation and frequency hopping. The hybrid system may have a maximum 20 dB bandwidth of 500 KHz per hopping frequency, and a maximum dwell time of 0.4 seconds per hopping frequency. The dwell time is a time period during which a device may camp on a particular frequency. Thus, the hybrid system may not stay on the same channel for more than the maximum dwell time. The hybrid system may have a maximum PSD of 8 dB in any 3 KHz frequency band. A maximum transmit power may be 30 dB per channel and a number of hopping frequencies may be set to be at least 50, assuming each channel bandwidth is 180 KHz. The NB IOT device and the eNB may perform synchronization, and may communicate with each other based on synchronization between the NB IOT device and the eNB. Several modes of synchronization may be defined for the hybrid system, including a mode with licensed assisted synchronization with DL and UL data transmission in an unlicensed frequency spectrum, a mode with licensed DL transmission (DL transmission in a licensed spectrum) and unlicensed UL transmission (UL transmission in an unlicensed spectrum), and a mode with full transmission/synchronization in an unlicensed frequency spectrum.

According to the licensed assisted synchronization mode, data is communicated in the unlicensed frequency spectrum and may not be communicated in the licensed frequency spectrum, while the synchronization may be performed in the licensed frequency spectrum. For example, the NB IOT device and the eNB may utilize the licensed carrier for connection setup and synchronization, and may utilize the unlicensed carrier for other communication (e.g., data communication). In the licensed assisted synchronization mode of operation, the NB IOT device may camp on a cell employed in a licensed spectrum (a licensed cell), e.g., in an RRC connected mode. For example, the NB IOT device may receive an NPSS and an NSSS on a carrier in the licensed spectrum, read the NPSS, the NSSS, the narrowband PRACH (NPRACH) and may perform connection setup to obtain an RRC connection (in an RRC connected state), and camp on the licensed cell. Subsequently, based on an anchor carrier, the eNB operating in the licensed spectrum then configures the NB IOT device to move to a different NB IOT carrier which operates in the unlicensed spectrum for data communication. In such a case, the unlicensed carrier may be carrier aggregation (CA) synchronized to the licensed carrier. If the unlicensed carrier is not CA synchronized with the licensed carrier, the eNB may specify an amount of an timing offset to move from the licensed carrier to the unlicensed carrier. The amount of the offset may be specified in a SIB (e.g., SIB1 and/or SIB2) or may be signaled to each NB IOT device in an RRC message. By using the unlicensed spectrum for data communications and using the licensed spectrum for other types of communication (e.g., synchronization), overhead in the unlicensed spectrum may be reduced.

In an aspect, an NB IOT device may be configured (e.g., by the eNB) with a hopping pattern of the unlicensed carrier to which the NB IOT device may tune. For example, the NB IOT device may be provided (e.g., by the eNB) with the following hopping pattern information, such as a number of hopping carriers, information for generating a hopping pattern, subframe number to start hopping, dwell time information per channel/frequency, power constraints on the unlicensed carrier, etc. The NB IOT device may receive the number of hopping carriers (e.g., in case the number of hopping carriers is different in various regions due to availability of different amounts of unlicensed spectrum in the various regions). The NB IOT device may receive (e.g., from an eNB) information for generating the hopping pattern and a subframe number on which to start hopping. The NB IOT device may receive information on the dwell time per channel/frequency, which may be different from one region to another region. The NB IOT device may be informed of any regulatory constraints applicable to the unlicensed operating channel such as power, PSD limits, etc. Thus, the NB IOT device (and the eNB) may tune to an unlicensed carrier in the unlicensed spectrum based on the hopping pattern information, to communicate data. In an aspect, the eNB may signal the NB IOT device to tune to an unlicensed carrier in the unlicensed spectrum, to communicate data. After communicating data in the unlicensed spectrum, the NB IOT device (and the eNB) may retune to the licensed carrier to perform another synchronization (e.g. obtain synchronization, system information (SI), etc.) (e.g., in case the NB IOT device needs to receive updated information). After performing another synchronization, the NB IOT device may tune to an unlicensed carrier to communicate data.

According to a mode with a licensed DL frequency band and an unlicensed UL frequency band, an NB IOT device receives (e.g., from the eNB) DL communication in the licensed spectrum and transmits (e.g., to the eNB) the UL communication in the unlicensed spectrum. For example, IOT traffic may be UL communication heavy with minimal DL communication such that the IOT traffic may be handled in the unlicensed spectrum. For NB IOT, the total UL transmission time may be relatively small for each device compared to the DL communication, and thus the eNB may be active for most of the UL transmission time of a NB IOT device to schedule and receive UL communication (e.g., a PRACH, ACK/NACK, etc.) from the NB IOT device. To satisfy the duty cycle restrictions and to limit the duty cycle in unlicensed spectrum, the NB IOT device may be configured to receive DL communication in the licensed spectrum and transmit UL communication in the unlicensed spectrum. For example, the NB IOT device may receive a UL grant in the licensed spectrum (e.g., using a licensed carrier) to perform UL communication, and based on the UL grant, transmit the UL communication in the unlicensed spectrum (using an unlicensed carrier). For example, the NB IOT device may receive a DL grant in the licensed spectrum (e.g., using a licensed carrier) and, based on the DL grant to perform DL communication, may receive DL communication in the licensed spectrum (e.g., using a licensed carrier). In one example, the NB IOT device may receive DL communication using a licensed carrier, and may switch to an unlicensed carrier to transmit UL communication. Thus, in one example, the NB IOT device may receive a UL grant using a licensed carrier, and then may switch to an unlicensed carrier to transmit UL communication based on the UL grant. Similarly, in one example, the NB IOT device may transmit UL communication using an unlicensed carrier, and may switch to a licensed carrier to receive DL communication.

According to a mode with synchronization in the unlicensed spectrum, the synchronization takes place in the unlicensed spectrum and may not take place in the licensed spectrum. Thus, according to the mode with synchronization in the unlicensed spectrum, the NB IOT device may perform synchronization (e.g., with the eNB) on a carrier/hopping frequency in the unlicensed spectrum. The eNB may stay on the current carrier for the duration of a dwell time and switch to a different carrier after expiration of the dwell time on the current carrier. Thus, the NB IOT device may also switch to the different carrier after expiration of the dwell time on the current carrier. For example, the dwell time may be 0.4 seconds (e.g., 0.4 seconds for every 20 seconds). Multiple NB IOT carriers may be present with different hopping patterns. For example, there may be one NB IOT carrier with 50 hopping frequencies and another NB IOT carrier with 30 hopping frequencies. Thus, the NB IOT device should check whether multiple hopping carriers are deployed. In an aspect, the NPSS may be the same for all NB IOT carriers.

The NB IOT device may be configured to perform synchronization (e.g., with the eNB) on carriers/hopping frequencies that are aligned with a channel raster, which may impose constraints on data acquisition. Thus, the following adjustments may be made to work around the constraints on data acquisition. According to one adjustment, the channel raster may be changed to a smaller number (e.g., smaller than 100 KHz). For example, the channel raster of 100 KHz may be good for a broadband communication system such as an LTE system but may not be good for a narrowband system. Thus, a channel raster of 15 KHz or 30 KHz or some smaller value may be used for NB IOT devices. According to another adjustment, a hopping bandwidth for frequency hopping may be indicated by the eNB (e.g., via a hopping bandwidth indication) as a part of a system configuration process (e.g., via an MIB, a PBCH, and/or a SIB).

The NB IOT device should obtain (e.g., from the eNB) at least the following information before the eNB (and the NB IOT device) switches to a different carrier. The NB IOT device should obtain information about whether a carrier is hopping or not, and should also determine the next hopping frequency. The NB IOT device should determine an end of a dwell time on the current hopping frequency (e.g., by measuring time spent on the current hopping frequency against the dwell time). The NB IOT device may need such information so that the NPSS/NSSS/NPBCH associated with the current carrier (e.g., in the current dwell time) is not combined with NPSS/NSSS/NPBCH from a different carrier in the next dwell duration. The NB IOT device may also determine the next hopping frequency (e.g., as discussed below). Additionally, the NB IOT device may determine a hopping pattern (e.g., as discussed below). Further, the NB IOT device may obtain information (e.g., from the eNB) to distinguish between NB IOT carriers that utilize hopping and NB IOT carriers that do not utilize hopping. The NB IOT device may determine a dwell time on each hopping frequency based on the dwell time information per channel/frequency provided by the eNB.

For initial acquisition/cell search, the NB IOT device may search through all the carriers by searching through frequencies associated with the carriers in the unlicensed spectrum based on the raster, to select the best carrier (e.g., a carrier with the highest signal strength), and may perform synchronization via the selected carrier in the unlicensed spectrum. If the NB IOT device detects the same carrier at a different frequency/multiple frequencies as the current carrier, then a de-duplication mechanism may be employed to eliminate at least one of the frequencies as a frequency corresponding to the carrier. The NB IOT device may detect the same carrier on different frequencies due to frequency hopping by the carrier. If the NB IOT device detects the same carrier on multiple frequencies, the NB IOT device may not utilize at least one of the multiple frequencies as a frequency for a carrier used for communication. In one example, the de-duplication may be based on cell IDs. For example, if the NB IOT device detect two cell IDs within a bandwidth utilized by a carrier for frequency hopping, the NB IOT may assume that the cell IDs represent the same cell and may eliminate one of the cell IDs. A hopping pattern that indicates a pattern in which frequency hopping is performed may change. For non-initial cell search, if the eNB determines that a hopping pattern is expected to change over time (e.g., every x msec), the eNB may convey the information about the expected change in the hopping pattern to the NB IOT device (e.g., via a SIB, e.g., SIB 2, transmitted to the NB IOT device). Then, the NB IOT device may acquire (e.g., from the eNB) hopping information including a new hopping pattern.

If the hopping information is provided to the NB IOT device via an NPSS, an NSSS, and/or a NPBCH, then the NB IOT device needs to acquire the NPSS, the NSSS, and the NPBCH within a dwell time, which may require a short acquisition time. If the hopping information is provided to the NB IOT device via SIB1 and/or SIB2, then the NB IOT device needs to acquire SIB1 and/or SIB2 within a dwell time. Similarly, if an RRC signaling provides the hopping information to the NB IOT device, then the NB IOT device should perform RRC connection setup/re-establishment within a dwell time. The NB IOT device should not wait until RRC signaling to get the hopping information because SIB1 and SIB2 should be read and a RACH procedure should be complete before actual RRC connection establishment.

Figure 7:
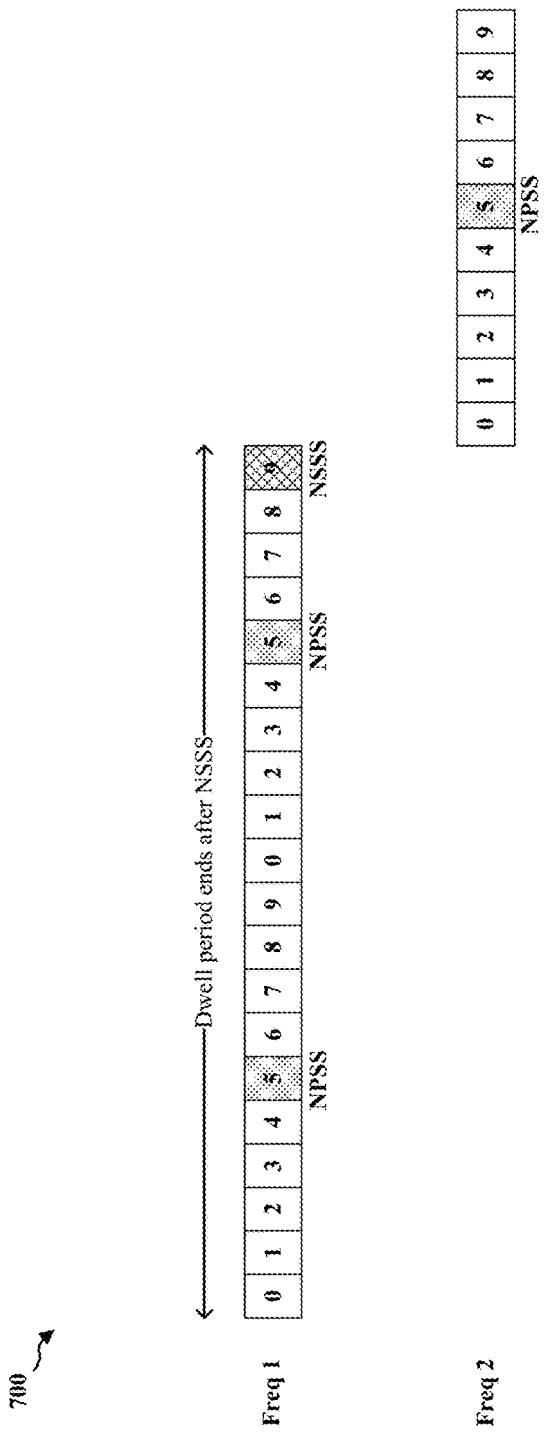
FIG. 7 is an example diagram illustrating moving to another frequency after a dwell time expires, e.g., after NSSS is transmitted.

FIG. 7 is an example diagram 700 illustrating moving to another frequency after a dwell time on a current carrier expires, e.g., after NSSS is transmitted. The location of the NPSS transmission may be in subframe #5. When the dwell period ends after the transmission of the NSSS, the transmission moves from Frequency 1 to Frequency 2. The NPSS and/or the NSSS may carry information indicating the end of transmission on the current frequency and/or information about a next frequency to move to.

Figure 8:
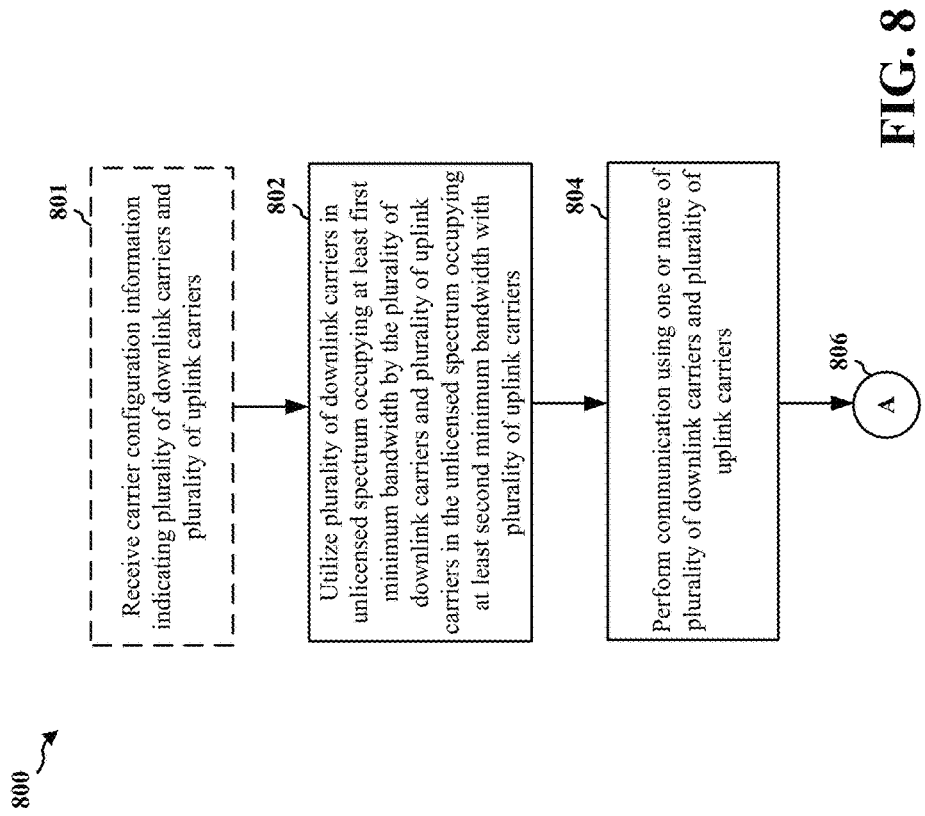
FIG. 8 is a flowchart of a method of wireless communication.

The NB IOT device should be able to determine when a dwell time on the current frequency ends so that the NB IOT device may suspend any cell search in progress on the current frequency. The end of a dwell time on a frequency may be indicated to the NB IOT device (e.g., by the eNB) using at least one of the following options. According to the first option, the first 3 OFDM symbols in the subframe carrying a NPSS may be re-used to indicate that the NPSS transmission in the subframe is the last NPSS transmission before the eNB moves to a next frequency. For example, because a NPSS occupies 11 symbols out of 14 symbols and the first 3 symbols are generally left empty, the eNB may use the first three symbols to indicate the last NPSS transmission before moving to a next frequency. For example, the UE may determine a subframe boundary on which the NPSS transmission ends based on the subframe in which the first 3 OFDM symbols indicating the last NPSS transmission is received, and may set the end of the dwell time according to the determined subframe boundary. According to a second option, the first 3 OFDM symbols in the subframe carrying an NSSS may be reused (e.g., by the eNB) to indicate that the NPSS transmission in the subframe is the last NSSS transmission before the eNB moves to a next frequency. The first option and/or the second options can also be used to predict and/or indicate a next frequency to which the eNB may hop. For example, hopping may be performed based on a cell ID. In addition, frequency hopping may be performed non-uniformly on different frequencies (e.g., such that some hopping frequencies are used more often than other hopping frequencies). In one example, during hopping, anchor carriers/frequencies may be visited more frequently and other frequencies may be visited less frequently. In one example, a hopping pattern may also be biased to remove and/or reduce use of some frequencies for increased interference mitigation with other systems FIG. 8 is a flowchart 800 of a method of wireless communication. The method may be performed by a UE using digital modulation for wireless communication via NB IOT in an unlicensed spectrum (e.g., the NB IOT device 512, the apparatus 1802/1802'). At 801, the UE may receive carrier configuration information indicating the plurality of downlink carriers and the plurality of uplink carriers. At 802, the UE utilizes a plurality of downlink carriers in the unlicensed spectrum occupying at least a first minimum bandwidth by the plurality of downlink carriers and a plurality of uplink carriers in the unlicensed spectrum occupying at least a second minimum bandwidth with the plurality of uplink carriers. In an aspect, the UE may utilize the plurality of downlink carriers and the plurality of uplink carriers based on the carrier configuration information. For example, as discussed supra, an NB IOT device may be configured to utilize multiple NB IOT UL carriers (e.g., UL carriers) and multiple NB IOT DL carriers (e.g., DL carriers). For example, as discussed supra, a total bandwidth occupied by the multiple NB IOT UL carriers may be greater than or equal to a minimum system bandwidth, and a total bandwidth occupied by the multiple NB IOT DL carriers may be greater than or equal to the minimum system bandwidth. At 804, the UE performs communication using one or more of the plurality of downlink carriers and the plurality of uplink carriers. For example, as discussed supra, the NB IOT device and the base station may communicate with each other using the multiple NB IOT UL carriers and the multiple NB IOT DL carriers. In an aspect, the plurality of downlink carriers may include at least three downlink carriers and the plurality of uplink carriers may include at least three uplink carriers. For example, as discussed supra, the number of the multiple NB IOT UL carriers may be at least three, and the number of the multiple NB IOT DL carriers may be at least three. At 806, the UE may perform additional features as discussed supra.

In an aspect, the at least one of the plurality of downlink carriers may be aligned with a raster to receive one or more synchronization signals. In an aspect, the one or more synchronization signals may include at least one of an NPSS or an NSSS. For example, as discussed supra, the NB IOT device may receive a synchronization signal such as an NPSS and an NSSS on a carrier aligned with a raster. For example, as discussed supra, in the standalone mode for NB IOT, a center frequency of a carrier for the NPSS/NSSS may be aligned with a raster (e.g., 100 KHz raster) or within a few KHz of the raster frequency (e.g., a few KHz less than 100 KHz). In an aspect, the raster may be less than 100 KHz. The raster may be set to a frequency smaller than 100 KHz (e.g., 15 KHz or 30 KHz). In an aspect, a search frequency for one or more downlink synchronization signals may be based on the raster and offset information. For example, as discussed supra, the offset(s) from the raster may be provided to the NB IOT device such that the NB IOT device may search appropriate frequencies for the carriers during communication acquisition (e.g., by searching in a frequency range defined by the raster and the offset(s) from the raster. In such an aspect, the offset information may be specified in a removable card or in a storage device of the UE. For example, as discussed supra, the offset for the raster may be specified in a removable memory (e.g., SIM card) or programmed in the NB IOT device.

In an aspect, a total uplink power may be shared among the plurality of uplink carriers as a plurality of uplink powers allocated to the plurality of uplink carriers respectively, and the communication may be performed via at least one of the plurality of uplink carriers using a respective allocated uplink power of the plurality of uplink powers. For example, as discussed supra, a total UL power (e.g., 1 W) may be shared (e.g., by the NB IOT device) among all UL carriers such that UL carriers are allocated with UL powers for UL communication, each UL carrier being allocated with a respective UL power. In such an aspect, the total uplink power may be shared based on uplink power split information, the uplink power split information being static or dynamic. For example, as discussed supra, a static power split between multiple carriers may be implemented for the NB IOT (e.g., by an eNB), where each of the carriers may be provided with a different static power level, or a dynamic power split may be implemented, where the power allocated to each of the carriers changes over time.

In an aspect, the UE may perform the communication by: performing multi-tone transmissions to transmit at least one of a PRACH or a PUSCH. For example, as discussed supra, the NB IOT device may transmit an UL communication using multi-tones, e.g., at a 15 KHz tone spacing or using a single tone at a 3.75 KHz tone spacing, where the UL communication may be a PRACH/PUSCH transmission.

Figure 9:
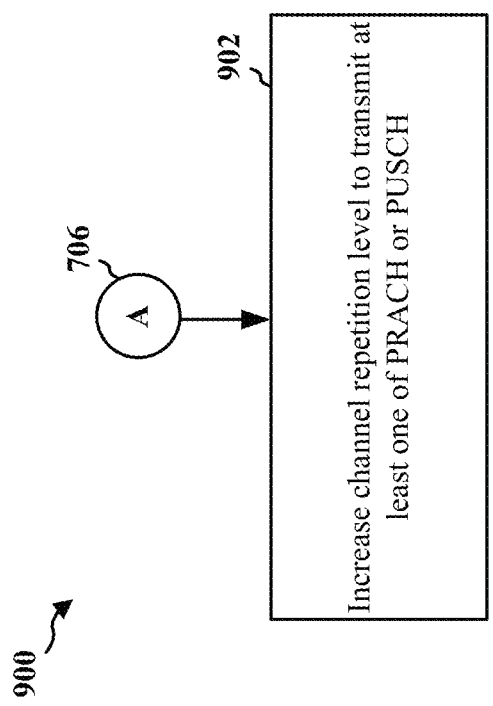
FIG. 9 is a flowchart of a method of wireless communication, expanding from the flowchart of FIG. 8.

FIG. 9 is a flowchart 900 of a method of wireless communication, expanding from the flowchart 800 of FIG. 8. The method may be performed by a UE using digital modulation for wireless communication via NB IOT in an unlicensed spectrum (e.g., the NB IOT device 512, the apparatus 1802/1802'). At 806, the UE continues from the flowchart 800 of FIG. 8. At 902, the UE increases a channel repetition level to transmit at least one of a PRACH or a PUSCH, where the channel repetition level is increased for the unlicensed spectrum. For example, as discussed supra, the NB IOT device may configure higher repetition levels for a PRACH/PUSCH transmission for all UL channels, where the PRACH/PUSCH transmission may be performed using one or more of the UL carriers.

Figure 10:
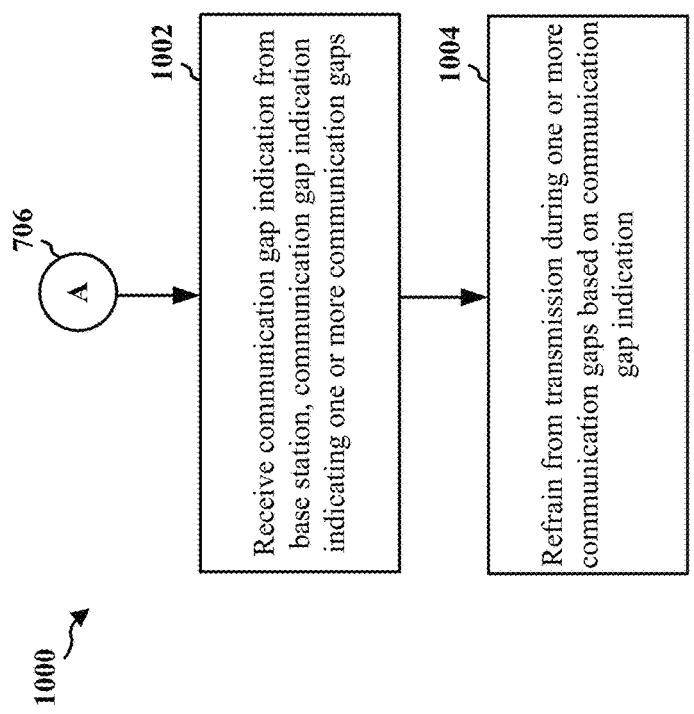
FIG. 10 is a flowchart of a method of wireless communication, expanding from the flowchart 800 of FIG. 8.

FIG. 10 is a flowchart 1000 of a method of wireless communication, expanding from the flowchart 800 of FIG. 8. The method may be performed by a UE using digital modulation for wireless communication via NB IOT in an unlicensed spectrum (e.g., the NB IOT device 512, the apparatus 1802/1802'). At 806, the UE continues from the flowchart 800 of FIG. 8. At 1002, the UE receives a communication gap indication from the base station, the communication gap indication indicating one or more communication gaps. At 1004, the UE refrains from communication during the one or more communication gaps based on the communication gap indication. For example, as discussed supra, the eNB may configure the communication gaps and advertise the existence of the communication gaps to NB IOT devices (e.g., by transmitting a communication gap indication), such that the NB IOT devices do not communicate during the communication gaps. In an aspect, the communication gap indication may include at least one of DTX period information, DRX period information, or a duty cycle, and the UE may refrain from the communication by performing at least one of: refraining from the communication during one or more DTX periods indicated in the DTX period information, refraining from the communication during one or more DRX periods indicated in the DRX period information, or refraining from the communication based on the duty cycle. For example, as discussed supra, for long communication gaps during which an eNB may stop transmission, the eNB may configure the transmission gaps as DTX periods and advertise the DTX periods (e.g., as the communication gap indication) so that no NB IOT device transmits during the DTX periods. For example, as discussed supra, the eNB may configure the transmission gaps as DRX periods to create reception gaps, and advertise the DRX periods to NB IOT devices such that the NB IOT devices perform UL transmission and may not monitor DL channels (e.g., for updating time-frequency synchronization) during the DRX periods. For example, as discussed supra, during the DRX periods, the NB IOT device may power down to a low power state and turn off a receiver of the NB IOT device, and thus may not receive communications during the DRX periods.

Figure 11:
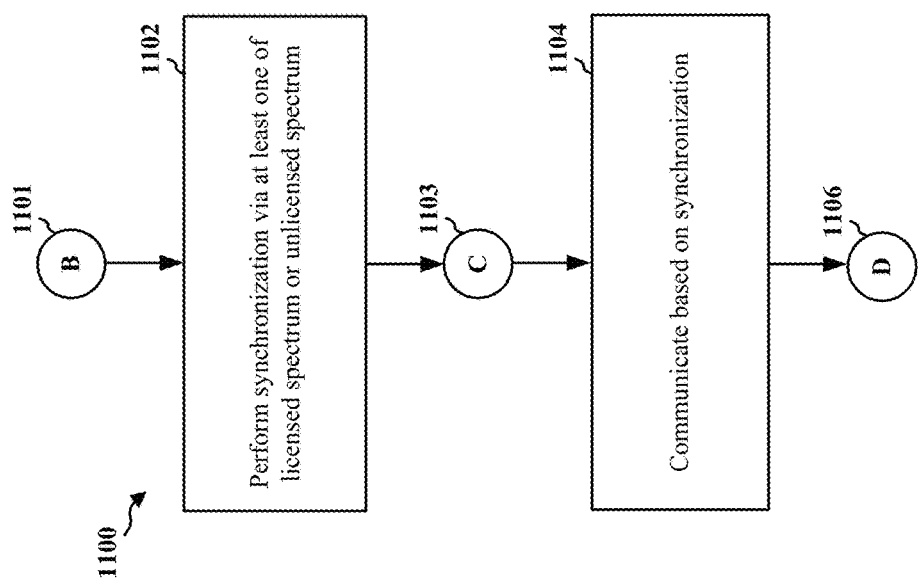
FIG. 11 is a flowchart of a method of wireless communication.

FIG. 11 is a flowchart 1100 of a method of wireless communication. The method may be performed by a UE using frequency hopping and digital modulation for wireless communication via NB IOT in an unlicensed spectrum (e.g., the NB IOT device 512, the apparatus 1802/1802'). For example, as discussed supra, an NB IOT device may perform communication in the unlicensed spectrum and/or in the licensed spectrum using a hybrid system with a combination of digital modulation and frequency hopping. At 1101, the UE may perform features discussed infra. At 1102, the UE performs a synchronization with a base station via at least one of a licensed spectrum or the unlicensed spectrum. At 1103, the UE may perform additional features discussed infra. At 1104, the UE communicates with the base station based on the synchronization. For example, as discussed supra, the NB IOT device may perform synchronization with a base station, and may communicate with the base station based on synchronization between the NB IOT device and the base station. At 1106, the UE may perform additional features, as discussed infra.

Figure 12:
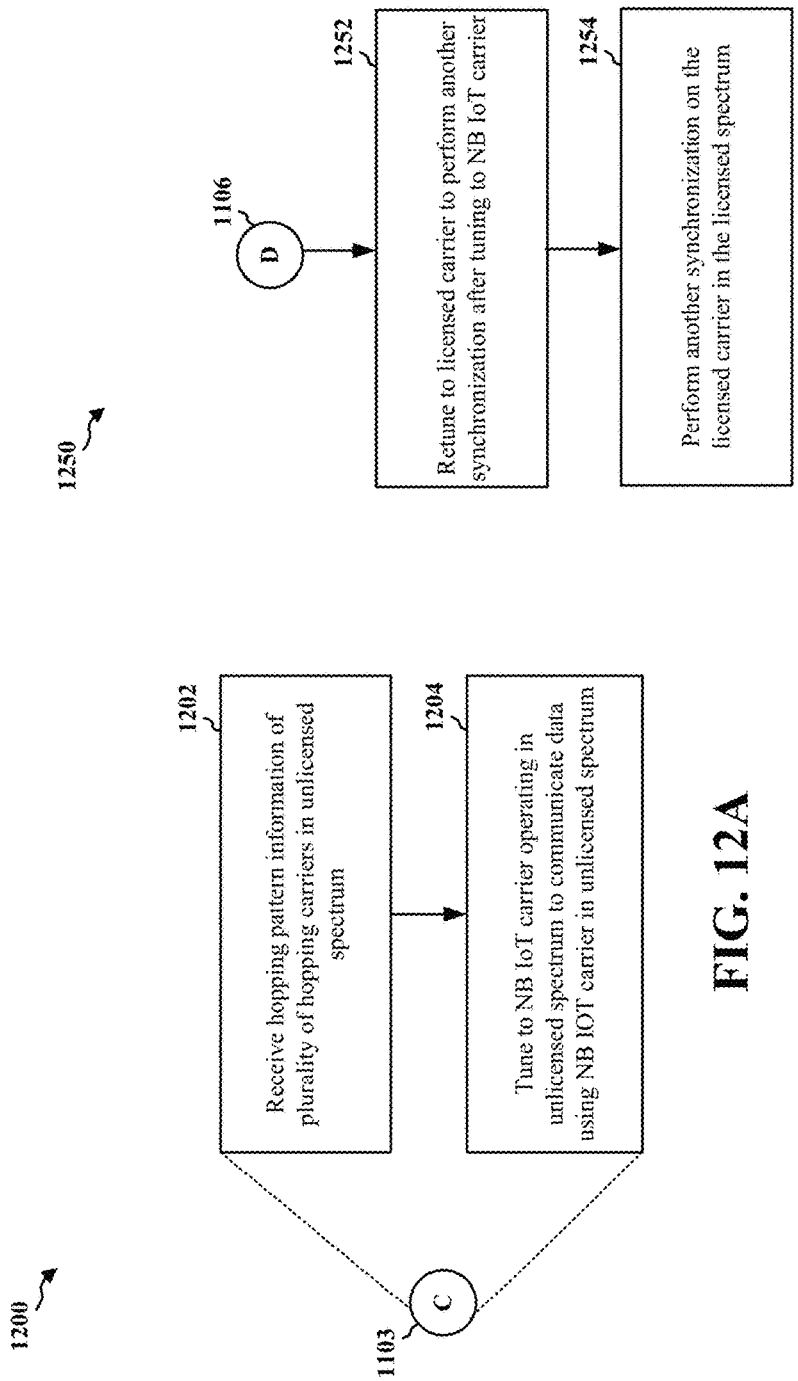
FIG. 12A is a flowchart of a method of wireless communication, expanding from the flowchart of FIG. 11.
FIG. 12B is a flowchart of a method of wireless communication, expanding from the flowchart of FIG. 11.

FIG. 12A is a flowchart 1200 of a method of wireless communication, expanding from the flowchart 1100 of FIG. 11. The method may be performed by a UE using frequency hopping and digital modulation for wireless communication via NB IOT in an unlicensed spectrum (e.g., the NB IOT device 512, the apparatus 1802/1802'). At 1103, the UE may perform the features described in the flowchart 1200 of FIG. 12, and may then continue to 1104 of the flowchart 1100 of FIG. 11. In an aspect, the UE may perform the synchronization (e.g., at 1102) by camping on the licensed carrier in a licensed spectrum in an RRC connected mode, and performing the synchronization on the licensed carrier in the licensed spectrum. For example, as discussed supra, according to the licensed assisted synchronization mode, data is communicated in the unlicensed frequency spectrum and may not be communicated in the licensed frequency spectrum, while the synchronization may be performed in the licensed frequency spectrum. For example, as discussed supra, in this mode of operation, the NB IOT device may camp on a cell in a licensed spectrum, e.g., in an RRC connected mode. At 1202, the UE may receive hopping pattern information of a plurality of hopping carriers in the unlicensed spectrum, where the hopping pattern information includes at least one of: a number of the plurality of hopping carriers, information for generating a hopping pattern, subframe number to start hopping, dwell time information per channel, or power restraints on the unlicensed carrier. At 1204, the UE tunes to an NB IOT carrier operating in the unlicensed spectrum to communicate data using the NB IOT carrier in the unlicensed spectrum. In an aspect, the UE may tune to the NB IOT carrier based on the hopping patterns information. For example, as discussed supra, an NB IOT device may be configured (e.g., by the eNB) with a hopping pattern of the unlicensed carrier to which the NB IOT device may tune. For example, as discussed supra, the NB IOT device may be provided (e.g., by the eNB) with the following hopping pattern information, such as a number of hopping carriers, information for generating a hopping pattern, subframe number to start hopping, dwell time information per channel, power restraints on the unlicensed carrier, etc. For example, as discussed supra, the NB IOT device (and the eNB) may tune to an unlicensed carrier in the unlicensed spectrum based on the hopping pattern information, to communicate data. In an aspect, the NB IOT carrier in the unlicensed spectrum may be carrier-aggregation synchronized to a licensed carrier in the licensed spectrum. For example, as discussed supra, the unlicensed carrier may be CA synchronized to the licensed carrier FIG. 12B is a flowchart 1250 of a method of wireless communication, expanding from the flowchart 1100 of FIG. 11 and the flowchart 1200 of FIG. 12A. The method may be performed by a UE using frequency hopping and digital modulation for wireless communication via NB IOT in an unlicensed spectrum (e.g., the NB IOT device 512, the apparatus 1802/1802'). At 1106, the UE may continue from the flowchart 1100 of FIG. 11, after performing the features described in the flowchart 1200 of FIG. 12A. At 1252, the UE may retune to the licensed carrier after communicating the data via the NB IOT carrier in the unlicensed spectrum. At 1254, the UE may perform another synchronization on the licensed carrier in the licensed spectrum with the base station. For example, as discussed supra, after communicating data in the unlicensed spectrum, the NB IOT device (and the base station) may retune to the licensed carrier to perform another synchronization (e.g. obtain synchronization, system information (SI), etc.) (e.g., in case the NB IOT device needs to receive updated information.

Figure 13:
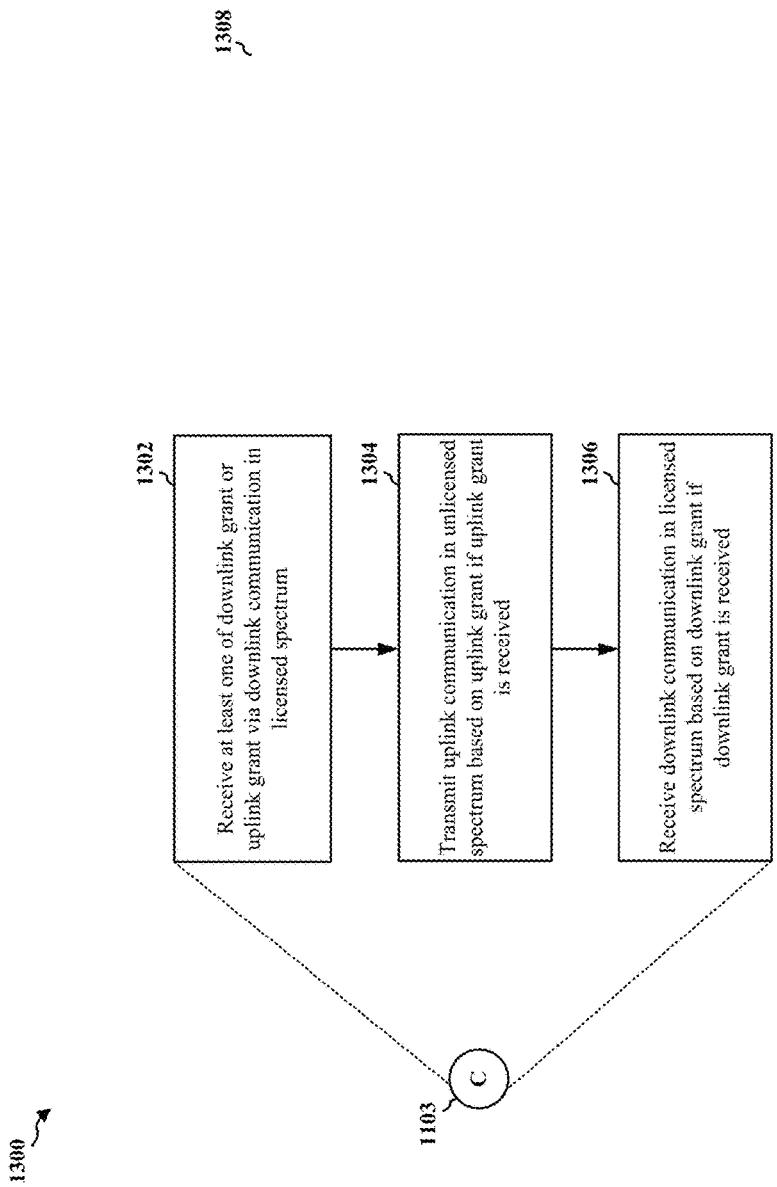
FIG. 13 is a flowchart of a method of wireless communication, expanding from the flowchart of FIG. 11.

FIG. 13 is a flowchart 1300 of a method of wireless communication, expanding from the flowchart 1100 of FIG. 11. The method may be performed by a UE using frequency hopping and digital modulation for wireless communication via NB IOT in an unlicensed spectrum (e.g., the NB IOT device 512, the apparatus 1802/1802'). At 1103, the UE may perform the features described in the flowchart 1200 of FIG. 12, and may continue to 1104 of the flowchart 1100 of FIG. 11. In an aspect, the UE may perform the synchronization (e.g., at 1102) by: utilizing a downlink channel to receive a downlink communication in a licensed spectrum, and utilizing an uplink channel to transmit an uplink communication in the unlicensed spectrum. For example, as discussed supra, according to a mode with a licensed DL frequency band and an unlicensed UL frequency band, an NB IOT device receives (e.g., from the eNB) DL communication in the licensed spectrum and transmits (e.g., to the eNB) the UL communication in the unlicensed spectrum. At 1302, the UE receives at least one of a downlink grant or a uplink grant via downlink communication in the licensed spectrum. At 1304, the UE transmits the uplink communication in the unlicensed spectrum if the uplink grant is received. At 1306, the UE receives the downlink communication in the licensed spectrum based on the downlink grant if the downlink grant is received. For example, as discussed supra, the NB IOT device may receive a UL grant in the licensed spectrum, and based on the UL grant, transmit UL communication in the unlicensed spectrum. For example, as discussed supra, the NB IOT device may receive a UL grant in the licensed spectrum and, based on the DL grant, may receive DL communication in the licensed spectrum.

Figure 14:
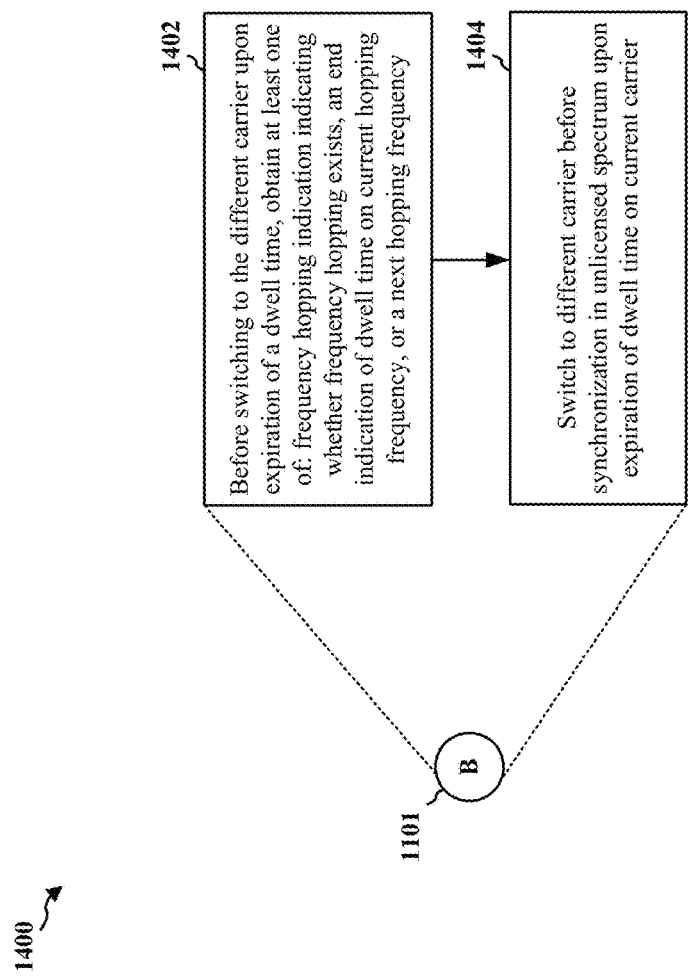
FIG. 14 is a flowchart of a method of wireless communication, expanding from the flowchart of FIG. 11.

FIG. 14 is a flowchart 1400 of a method of wireless communication, expanding from the flowchart 1100 of FIG. 11. The method may be performed by a UE using frequency hopping and digital modulation for wireless communication via NB IOT in an unlicensed spectrum (e.g., the NB IOT device 512, the apparatus 1802/1802'). At 1101, the UE may perform the features described in the flowchart 1400 of FIG. 14, and may continue to 1102 of the flowchart 1100 of FIG. 11. In an aspect, the UE may perform the synchronization (e.g., at 1102) by performing the synchronization in the unlicensed spectrum. For example, as discussed supra, according to a mode with synchronization in the unlicensed spectrum, the synchronization takes place in the unlicensed spectrum and may not take place in the licensed spectrum. At 1402, before switching the current carrier to a different carrier upon expiration of a dwell time, the UE may obtain at least one of: a frequency hopping indication indicating whether frequency hopping exits, an end indication of dwell time on a current hopping frequency, or a next hopping frequency. For example, as discussed supra, the NB IOT device should obtain (e.g., from the eNB) at least the following information before the eNB (and the NB IOT device) switches from the current carrier to a different carrier. The information may include a frequency hopping indication indicating whether frequency hopping exits, an end indication of dwell time on the current hopping frequency, or a next hopping frequency. At 1404, the UE may switch to a different carrier for the synchronization in the unlicensed spectrum upon expiration of a dwell time on the current carrier. For example, as discussed supra, the eNB switches to a different carrier after each expiration of a dwell time on the current carrier, and thus the NB IOT device may also switch to the different carrier after expiration of the dwell time on the current carrier. In an aspect, the different carrier may include one or more carriers corresponding to one or more hopping frequencies that are aligned with a channel raster in the unlicensed spectrum. For example, as discussed supra, the NB IOT device may perform synchronization (e.g., with the eNB) on a carrier/hopping frequency in the unlicensed spectrum. In an aspect, the UE may perform the synchronization by performing at least one of: utilizing the channel raster to be less than 100 KHz, or setting a hopping bandwidth based on a hopping bandwidth indication from the base station. For example, as discussed supra, the NB IOT device may be configured to perform synchronization (e.g., with the eNB) on carriers/hopping frequencies that are aligned with a channel raster. For example, as discussed supra, the channel raster may be changed to a smaller number (e.g., smaller than 100 KHz), and/or a hopping bandwidth for frequency hopping may be indicated by the eNB (e.g., via a hopping bandwidth indication) as a part of a system configuration process (e.g., via an MIB, a PBCH, and/or a SIB).

Figure 15:
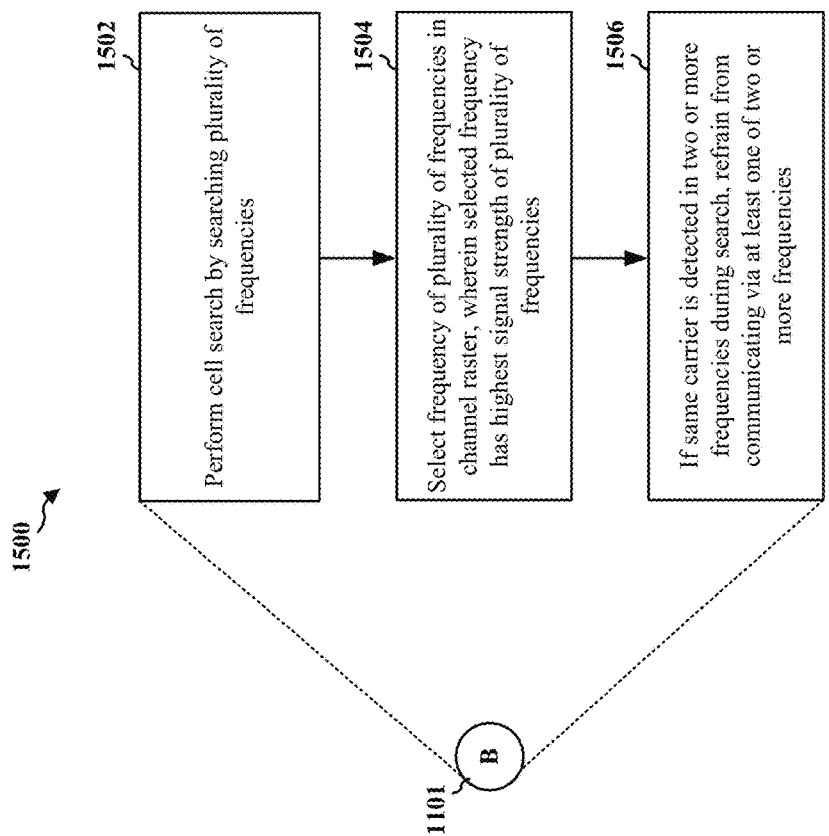
FIG. 15 is a flowchart of a method of wireless communication, expanding from the flowchart of FIG. 14.

FIG. 15 is a flowchart 1500 of a method of wireless communication, expanding from the flowchart 1400 of FIG. 14. The method may be performed by a UE using frequency hopping and digital modulation for wireless communication via NB IOT in an unlicensed spectrum (e.g., the NB IOT device 512, the apparatus 1802/1802'). At 1101, the UE may perform the features described in the flowchart 1400 of FIG. 14, and may continue to 1102 of the flowchart 1100 of FIG. 11. At 1502, the UE performs a cell search by searching a plurality of frequencies in the unlicensed spectrum. At 1504, the UE selects a frequency of the plurality of frequencies in a channel raster, wherein the selected frequency has a highest signal strength of the plurality of frequencies. In an aspect, the UE may perform the synchronization (e.g., at 1102) using a carrier corresponding to the selected frequency in the unlicensed spectrum. For example, as discussed supra, for initial acquisition/cell search, the NB IOT device may search through all the carriers by searching through frequencies associated with the carriers in the unlicensed spectrum based on the raster, to select the best carrier (e.g., a carrier with the highest signal strength), and may perform synchronization via the selected carrier in the unlicensed spectrum. At 1506, if a same carrier is detected in two or more frequencies of the plurality of frequencies during the cell search, the UE refrains from communicating via at least one of the two or more frequencies of the plurality of frequencies. For example, as discussed supra, if the NB IOT device detects the same carrier on multiple frequencies, the NB IOT device may not utilize at least one of the multiple frequencies for communication.

Figure 16:
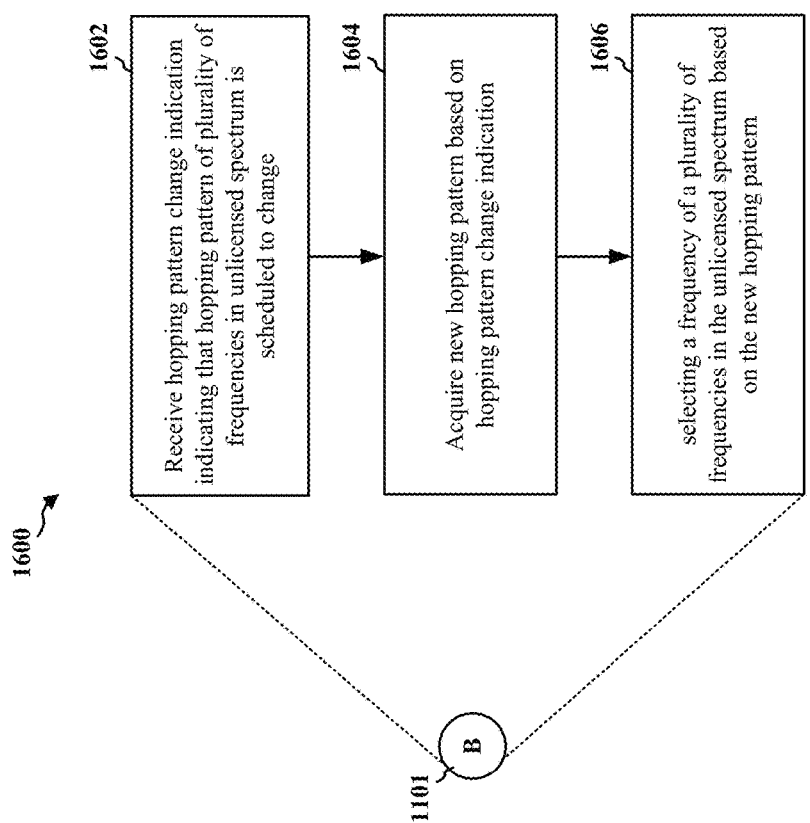
FIG. 16 is a flowchart of a method of wireless communication, expanding from the flowchart of FIG. 14.

FIG. 16 is a flowchart 1600 of a method of wireless communication, expanding from the flowchart 1400 of FIG. 14. The method may be performed by a UE using frequency hopping and digital modulation for wireless communication via NB IOT in an unlicensed spectrum (e.g., the NB IOT device 512, the apparatus 1802/1802'). At 1101, the UE may perform the features described in the flowchart 1400 of FIG. 14, and may continue to 1102 of the flowchart 1100 of FIG. 11. At 1602, the UE receives a hopping pattern change indication indicating that a hopping pattern of a plurality of frequencies in the unlicensed spectrum is scheduled to change. At 1604, the UE acquires hopping information including a new hopping pattern based on the hopping pattern change indication. At 1606, the UE selects a frequency of the plurality of frequencies in the unlicensed spectrum based on the new hopping pattern. In an aspect, the UE may perform the synchronization (e.g., at 1102) using a carrier corresponding to the selected frequency in the unlicensed spectrum. For example, as discussed supra, for a non-initial cell search, if the eNB determines that a hopping pattern is expected to change over time (e.g., every x msec), the eNB may convey the information about the expected change in the hopping pattern to the NB IOT device (e.g., via a SIB transmitted to the NB IOT device). Then, for example, as discussed supra, the NB IOT device may acquire (e.g., from the eNB) hopping information including a new hopping pattern.

In an aspect, the UE may acquire the hopping information by performing at least one of: if the hopping information is included in at least one of an NPSS, an NSSS, or an NPBCH, the UE acquires the at least one of the NPSS, the NSSS, and the NPBCH within a dwell time; if the hopping information is included in a SIB, the UE acquires the SIB within the dwell time; or if the hopping information is provided via RRC, the UE performs at least one of RRC connection setup or RRC connection re-establishment within the dwell time. For example, as discussed supra, if the hopping information is provided to the NB IOT device via an NPSS, an NSSS, and/or a NPBCH, then the NB IOT device needs to acquire the NPSS, the NSSS, and the NPBCH within a dwell time, which may require a short acquisition time. For example, as discussed supra, if the hopping information is provided to the NB IOT device via SIB1 and/or SIB2, then the NB IOT device needs to acquire SIB1 and/or SIB2 within a dwell time. For example, as discussed supra, if an RRC signaling provides the hopping information to the NB IOT device, then the NB IOT device should perform RRC connection setup/re-establishment within a dwell time.

Figure 17:
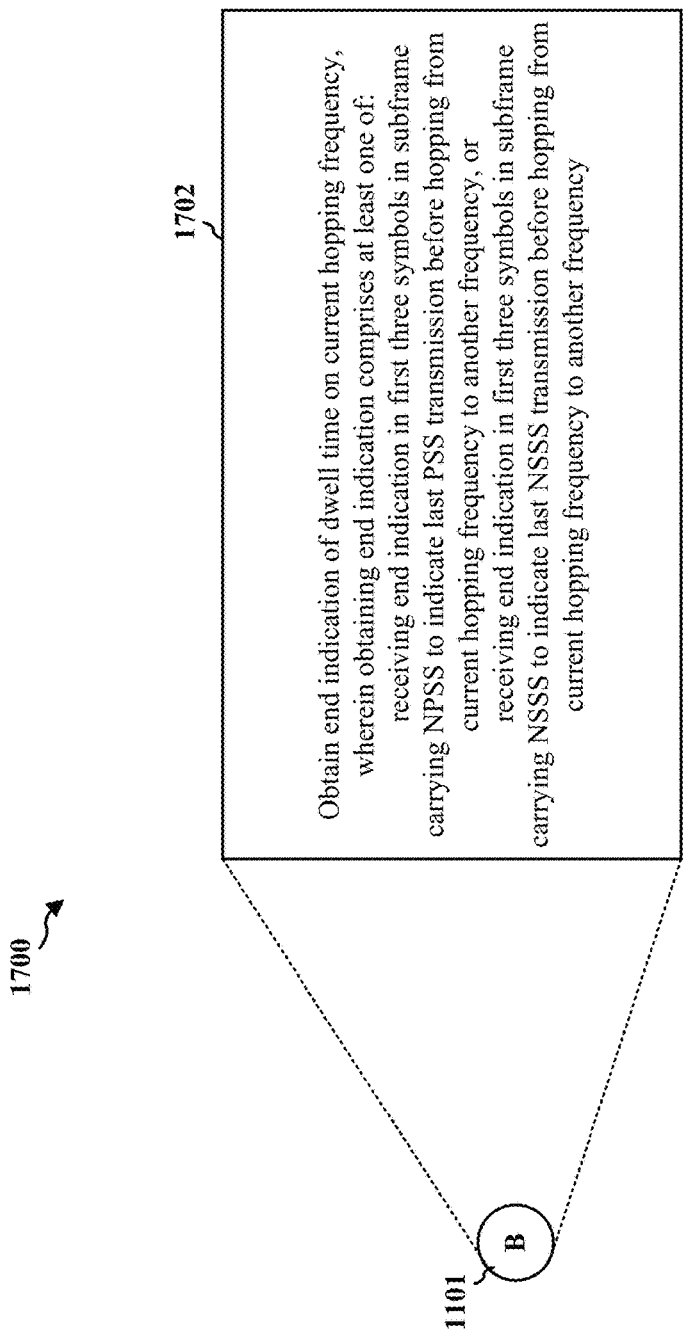
FIG. 17 is a flowchart of a method of wireless communication, expanding from the flowchart of FIG. 14.

FIG. 17 is a flowchart 1700 of a method of wireless communication, expanding from the flowchart 1400 of FIG. 14. The method may be performed by a UE using frequency hopping and digital modulation for wireless communication via NB IOT in an unlicensed spectrum (e.g., the NB IOT device 512, the apparatus 1802/1802'). At 1101, the UE may perform the features described in the flowchart 1400 of FIG. 14, and may continue to 1102 of the flowchart 1100 of FIG. 11. At 1702, the UE obtains an end indication of a dwell time on a current hopping frequency corresponding to the current carrier, wherein the obtaining the end indication comprises at least one of: receiving the end indication in a first three symbols in a subframe carrying an NPSS to indicate a last NPSS transmission before hopping from the current hopping frequency to another frequency, or receiving the end indication in a first three symbols in a subframe carrying an NSSS to indicate a last NSSS transmission before hopping from the current hopping frequency to the another frequency. For example, as discussed supra, the end of a dwell period on a frequency may be indicated to the NB IOT device (e.g., by the eNB) using at least one of the following options. According to the first option, the first 3 OFDM symbols in the subframe carrying a NPSS may be re-used to indicate that the NPSS transmission in the subframe is the last NPSS transmission before the eNB moves to a next frequency. According to a second option, the first 3 OFDM symbols in the subframe carrying an NSSS may be reused (e.g., by the eNB) to indicate that this is the last NSSS transmission before the eNB moves to a next frequency. In an aspect, the frequency hopping is non-uniform. In an aspect, the UE may hop to an anchor frequency more often than one or more non-anchor frequencies. In an aspect, the UE may hop to one frequency more often than another frequency based on signal interference. For example, as discussed supra, hopping may be performed non-uniformly on different frequencies. For example, as discussed supra, during hopping, anchor carriers/frequencies may be visited more frequently and other frequencies may be visited less. For example, as discussed supra, a hopping pattern could also be biased to remove and/or reduce use of some frequencies for better interference mitigation with other systems.

Figure 18:
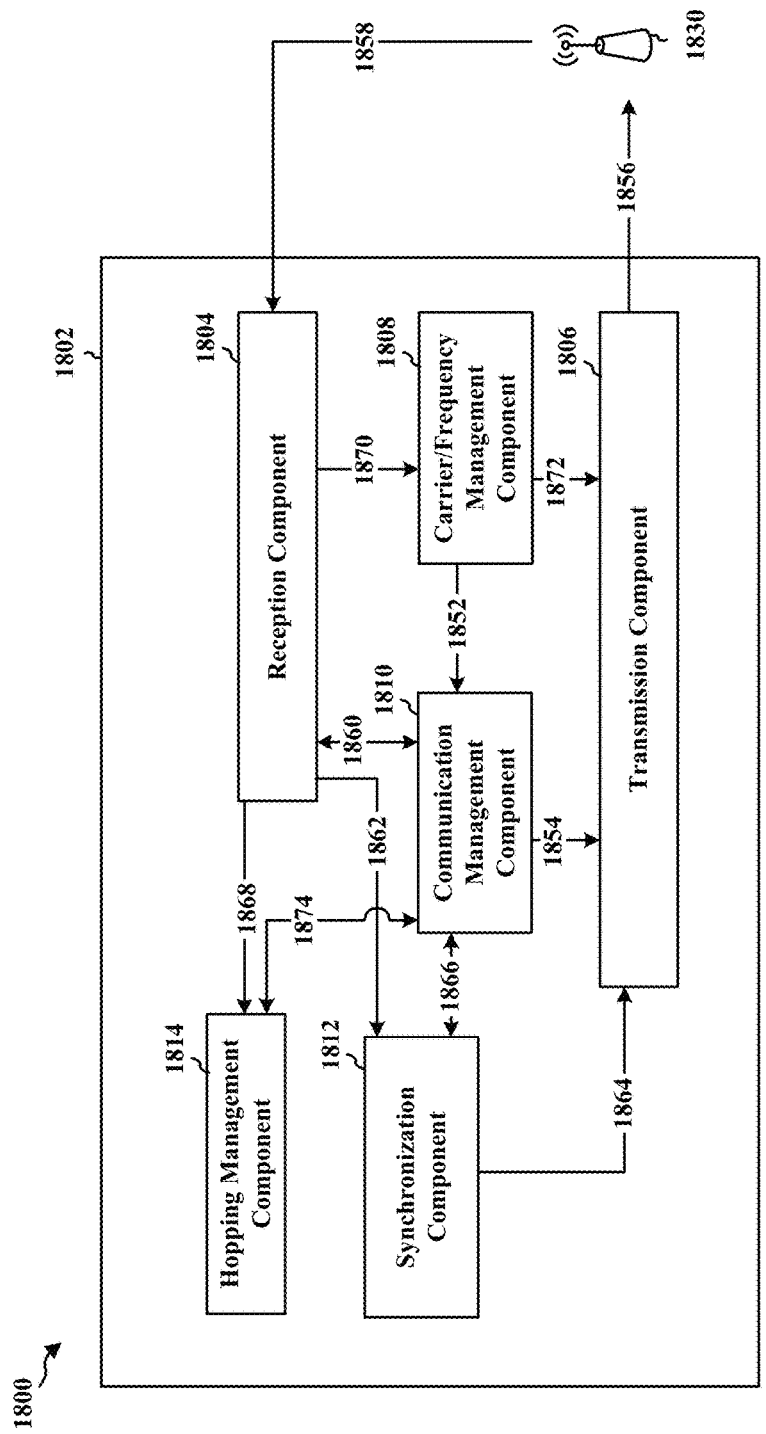
FIG. 18 is a conceptual data flow diagram illustrating the data flow between different means/components in an exemplary apparatus.

FIG. 18 is a conceptual data flow diagram 1800 illustrating the data flow between different means/components in an exemplary apparatus 1802. The apparatus may be a UE for wireless communication via NB IOT in an unlicensed spectrum. The apparatus includes a reception component 1804, a transmission component 1806, a carrier/frequency management component 1808, a communication management component 1810, a synchronization component 1812, and a hopping management component 1814.

According to one aspect of the disclosure, the UE may utilize digital modulation for wireless communication via NB IOT in an unlicensed spectrum. The carrier/frequency management component 1808 may receive, via the reception component 1804, carrier configuration information indicating the plurality of downlink carriers and the plurality of uplink carriers (e.g., from the base station 1830 at 1858 and 1870). The carrier/frequency management component 1808 utilizes a plurality of downlink carriers in the unlicensed spectrum occupying at least a first minimum bandwidth by the plurality of downlink carriers and a plurality of uplink carriers in the unlicensed spectrum occupying at least a second minimum bandwidth with the plurality of uplink carriers, and may communicate with the communication management component 1810 at 1852. In an aspect, The carrier/frequency management component 1808 may utilize the plurality of downlink carriers and the plurality of uplink carriers based on the carrier configuration information. The communication management component 1810 performs communication using one or more of the plurality of downlink carriers and the plurality of uplink carriers(e.g., via the reception component 1804 and the transmission component 1806, with a base station 1830, at 1854, 1856, 1858, and 1860). In an aspect, the plurality of downlink carriers may include at least three downlink carriers and the plurality of uplink carriers may include at least three uplink carriers.

In an aspect, the at least one of the plurality of downlink carriers may be aligned with a raster to receive one or more synchronization signals. In an aspect, the one or more synchronization signals may include at least one of an NPSS or an NSSS. In an aspect, the raster may be less than 100 KHz. In an aspect, a search frequency for one or more downlink synchronization signals may be based on the raster and offset information. In such an aspect, the offset information is specified in a removable card or in a storage device of the UE.

In an aspect, a total uplink power may be shared among the plurality of uplink carriers as a plurality of uplink powers allocated to the plurality of uplink carriers respectively, and the communication may be performed via at least one of the plurality of uplink carriers using a respective allocated uplink power of the plurality of uplink powers. In such an aspect, the total uplink power may be shared based on uplink power split information, the uplink power split information being static or dynamic.

In an aspect, the communication management component 1810 may increase a channel repetition level to transmit at least one of a PRACH or a PUSCH (e.g., via the transmission component 1806 at 1854 and 1856), where the channel repetition level is increased for the unlicensed spectrum. The communication management component 1810 may perform the communication by: performing multi-tone transmissions to transmit at least one of a PRACH or a PUSCH (e.g., via the transmission component 1806 at 1854 and 1856).

In an aspect, the communication management component 1810 receives a communication gap indication from the base station, the communication gap indication indicating one or more communication gaps, via the reception component 1804 at 1858 and 1860. The communication management component 1810 refrains from communication during the one or more communication gaps based on the communication gap indication. In an aspect, the communication gap indication includes at least one of DTX period information or DRX period information, and the UE may refrain from the communication by performing at least one of: refraining from the communication during one or more DTX periods indicated in the DTX period information, or refraining from the communication during one or more DRX periods indicated in the DRX period information.

According to another aspect of the disclosure, the UE may utilize frequency hopping and digital modulation for wireless communication via NB IOT in an unlicensed spectrum. The synchronization component 1812 performs a synchronization with a base station (e.g., base station 1830) via at least one of a licensed spectrum or the unlicensed spectrum, (e.g., via the reception component 1804 and the transmission component 1806, at 1858, 1862, 1864, and 1856) and conveys such information to the communication management component 1810, at 1866. The communication management component 1810 communicates with the base station based on the synchronization (e.g., via the reception component 1804 and the transmission component 1806, with the base station 1830, at 1854, 1856, 1858, and 1860).

In one aspect, the synchronization component 1812 and the communication management component 1810 causes the UE to camp on the licensed carrier in a licensed spectrum in an RRC connected mode (e.g., via the reception component 1804 and the transmission component 1806, with a base station 1830, at 1866, 1854, 1856, 1858, and 1860), and the synchronization component 1812 performs the synchronization on the licensed carrier in the licensed spectrum (e.g., via the reception component 1804 and the transmission component 1806, with a base station 1830, at 1854, 1856, 1858, and 1860). The communication management component 1810 tunes to an NB IOT carrier operating in the unlicensed spectrum to communicate data using the NB IOT carrier in the unlicensed spectrum (e.g., via the reception component 1804 and the transmission component 1806, with a base station 1830, at 1854, 1856, 1858, and 1860). In an aspect, the NB IOT carrier in the unlicensed spectrum is carrier-aggregation synchronized to a licensed carrier in the licensed spectrum.

The hopping management component 1814 receives hopping pattern information of information of a plurality of hopping carriers in the unlicensed spectrum, wherein the communication management component 1810 tunes to the NB IOT carrier based on the hopping patterns information via the reception component 1804 at 1858 and 1868. In an aspect, the hopping pattern information includes at least one of: a number of the plurality of hopping carriers, information for generating a hopping pattern, subframe number to start hopping, dwell time information per channel, or power restraints on the unlicensed carrier. The communication management component 1810 may retune to the licensed carrier after communicating the data via the NB IOT carrier in the unlicensed spectrum (e.g., via the reception component 1804 and the transmission component 1806, at 1858, 1862, 1864, and 1856). The synchronization component 1812 performs another synchronization on the licensed carrier in the licensed spectrum (e.g., via the reception component 1804 and the transmission component 1806, with a base station 1830, at 1858, 1862, 1864, and 1856).

In one aspect, the synchronization component 1812 and the communication management component 1810 may utilize a downlink channel to receive a downlink communication in a licensed spectrum (e.g., via the reception component 1804 and the transmission component 1806, with a base station 1830, at 1866, 1854, 1856, 1858, and 1860), and utilize an uplink channel to transmit an uplink communication in the unlicensed spectrum (e.g., via the reception component 1804 and the transmission component 1806, with a base station 1830, at 1866, 1854, 1856, 1858, and 1860). The communication management component 1810 may receive at least one of a downlink grant or a uplink grant via downlink communication in the licensed spectrum (e.g., via the reception component 1804, at 1858, 1860). The communication management component 1810 may transmit the uplink communication in the unlicensed spectrum based on the uplink grant (e.g., via the transmission component 1806, at 1854 and 1856) if the uplink grant is received. The communication management component 1810 may receive the downlink communication in the licensed spectrum based on the downlink grant (e.g., via the reception component 1804, at 1858 and 1860) if the downlink grant is received.

In one aspect, the synchronization component 1812 performs the synchronization in the unlicensed spectrum (e.g., via the reception component 1804 and the transmission component 1806, with a base station 1830, at 1858, 1862, 1864, and 1856). Before switching to the different carrier upon expiration of the dwell time, the hopping management component 1814 obtains at least one of: a frequency hopping indication indicating whether frequency hopping exits, an end indication of dwell time on a current hopping frequency, or a next hopping frequency (e.g., via the reception component 1804, at 1858, 1868.). The carrier/frequency management component 1808 switches to a different carrier for the synchronization in the unlicensed spectrum upon expiration of a dwell time on a current carrier. In an aspect, the different carrier may include one or more carriers corresponding to one or more hopping frequencies that are aligned with a channel raster in the unlicensed spectrum. In an aspect, the synchronization component 1812 may perform the synchronization by performing at least one of: utilizing the channel raster to be less than 100 KHz, or setting a hopping bandwidth based on a hopping bandwidth indication from the base station.

In an aspect, The carrier/frequency management component 1808 performs a cell search by searching a plurality of frequencies in the unlicensed spectrum (e.g., via the reception component 1804 and the transmission component 1806, with a base station 1830, at 1872, 1856, 1858, 1874). The carrier/frequency management component 1808 selects a frequency of a plurality of frequencies in a channel raster, wherein the selected frequency has a highest signal strength of each frequency of the plurality of frequencies. In such an aspect, the synchronization is performed using a carrier corresponding to the selected frequency in the unlicensed spectrum. If a same carrier is detected in two or more frequencies of the plurality of frequencies during the cell search, the carrier/frequency management component 1808 and the communication management component 1810 refrains from communicating via at least one of the two or more frequencies of the plurality of frequencies.

In an aspect, the hopping management component 1814 receives a hopping pattern change indication indicating that a hopping pattern of a plurality of frequencies in the unlicensed spectrum is scheduled to change (e.g., via the reception component 1804, at 1858, 1868). The hopping management component 1814 acquires hopping information including a new hopping pattern based on the hopping pattern change indication (e.g., via the reception component 1804, at 1858, 1868.). The hopping management component 1814 selects a frequency of the plurality of frequencies in the unlicensed spectrum based on the new hopping pattern. In such an aspect, the synchronization is performed using a carrier corresponding to the selected frequency in the unlicensed spectrum.

If the hopping information is included in at least one of an NPSS, an NSSS, or an NPBCH, the hopping management component 1814 acquires the at least one of the NPSS, the NSSS, and the NPBCH within a dwell time. If the hopping information is included in a SIB, the hopping management component 1814 acquires the SIB within the dwell time. If the hopping information is provided via RRC, the hopping management component 1814 performs at least one of RRC connection setup or RRC connection re-establishment within the dwell time. The hopping management component 1814 may communicate with the communication management component 1810, at 1874.

The communication management component 1810 obtains an end indication of a dwell time on a current hopping frequency corresponding to the current carrier (e.g., via the reception component 1804, at 1858 and 1860), where the obtaining the end indication comprises at least one of: receiving the end indication in a first three symbols in a subframe carrying an NPSS to indicate a last NPSS transmission before hopping from the current hopping frequency to another frequency, or receiving the end indication in a first three symbols in a subframe carrying an NSSS to indicate a last NSSS transmission before hopping from the current hopping frequency to the another frequency. In an aspect, the frequency hopping is non-uniform. In an aspect, the UE may hop to an anchor frequency more often than one or more non-anchor frequencies. In an aspect, the UE may hop to one frequency more often than another frequency based on signal interference.

The apparatus may include additional components that perform each of the blocks of the algorithm in the aforementioned flowcharts of FIGS. 8-17. As such, each block in the aforementioned flowcharts of FIGS. 8-17 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 19:
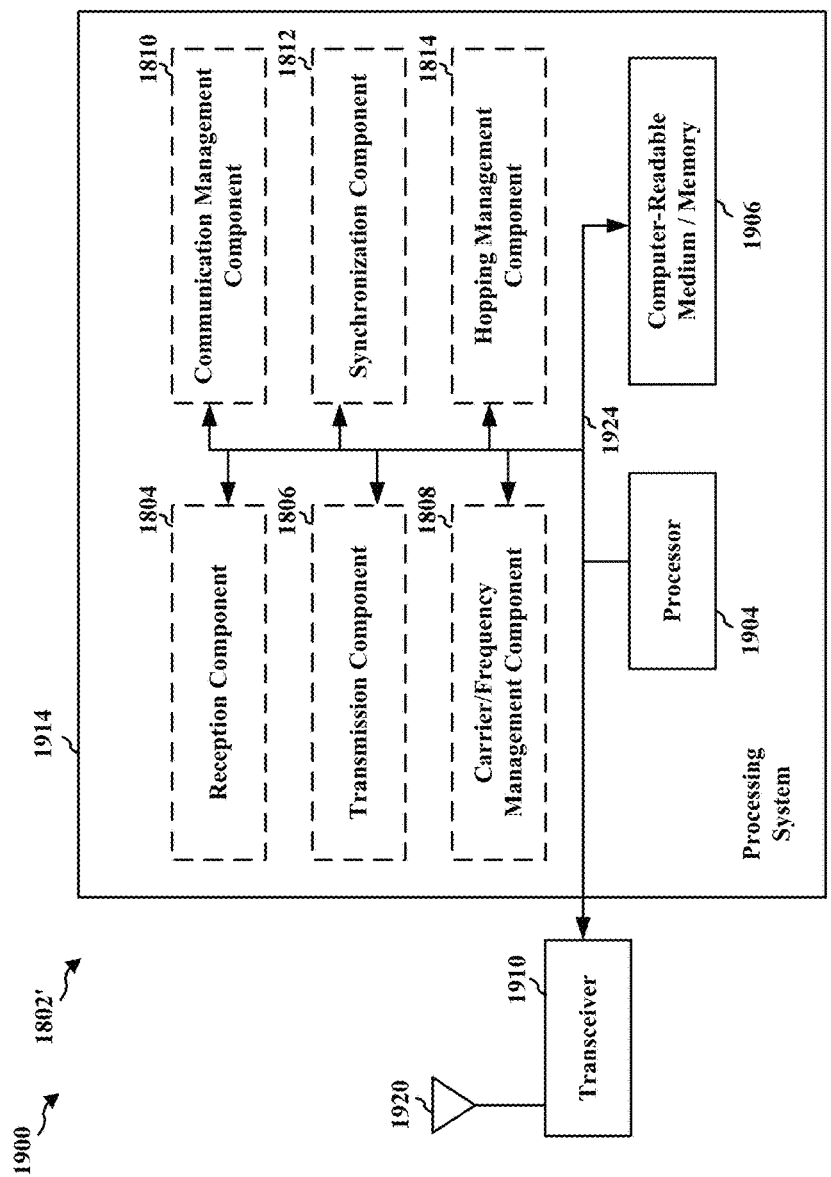
FIG. 19 is a diagram illustrating an example of a hardware implementation for an apparatus employing a processing system.

FIG. 19 is a diagram 1900 illustrating an example of a hardware implementation for an apparatus 1802' employing a processing system 1914. The processing system 1914 may be implemented with a bus architecture, represented generally by the bus 1924. The bus 1924 may include any number of interconnecting buses and bridges depending on the specific application of the processing system 1914 and the overall design constraints. The bus 1924 links together various circuits including one or more processors and/or hardware components, represented by the processor 1904, the components 1804, 1806, 1808, 1810, 1812, 1814, and the computer-readable medium/memory 1906. The bus 1924 may also link various other circuits such as timing sources, peripherals, voltage regulators, and power management circuits, which are well known in the art, and therefore, will not be described any further.

The processing system 1914 may be coupled to a transceiver 1910. The transceiver 1910 is coupled to one or more antennas 1920. The transceiver 1910 provides a means for communicating with various other apparatus over a transmission medium. The transceiver 1910 receives a signal from the one or more antennas 1920, extracts information from the received signal, and provides the extracted information to the processing system 1914, specifically the reception component 1804. In addition, the transceiver 1910 receives information from the processing system 1914, specifically the transmission component 1806, and based on the received information, generates a signal to be applied to the one or more antennas 1920. The processing system 1914 includes a processor 1904 coupled to a computer-readable medium/memory 1906. The processor 1904 is responsible for general processing, including the execution of software stored on the computer-readable medium/memory 1906. The software, when executed by the processor 1904, causes the processing system 1914 to perform the various functions described supra for any particular apparatus. The computer-readable medium/memory 1906 may also be used for storing data that is manipulated by the processor 1904 when executing software. The processing system 1914 further includes at least one of the components 1804, 1806, 1808, 1810, 1812, 1814. The components may be software components running in the processor 1904, resident/stored in the computer readable medium/memory 1906, one or more hardware components coupled to the processor 1904, or some combination thereof. The processing system 1914 may be a component of the UE 350 and may include the memory 360 and/or at least one of the TX processor 368, the RX processor 356, and the controller/processor 359.

In one configuration, the apparatus 1802/1802' for wireless communication includes means for utilizing a plurality of downlink carriers in the unlicensed spectrum occupying at least a first minimum bandwidth by the plurality of downlink carriers and a plurality of uplink carriers in the unlicensed spectrum occupying at least a second minimum bandwidth with the plurality of uplink carriers, and means for performing communication using one or more of the plurality of downlink carriers and the plurality of uplink carriers. In an aspect, the apparatus 1802/1802' may further include means for receiving carrier configuration information indicating the plurality of downlink carriers and the plurality of uplink carriers, where the means for utilizing the plurality of downlink carriers and the plurality of uplink carriers is configured to utilize the plurality of downlink carriers and the plurality of uplink carriers based on the carrier configuration information. In an aspect, the apparatus 1802/1802' may further include means for increasing a channel repetition level to transmit at least one of a PRACH or a PUSCH via at least one of the plurality of uplink carriers, wherein the channel repetition level is increased for the unlicensed spectrum. In an aspect, the means for performing the communication may be configured to perform multi-tone transmissions to transmit at least one of a PRACH or a PUSCH. In an aspect, the apparatus 1802/1802' may further include means for receiving a communication gap indication, the communication gap indication indicating one or more communication gaps, and means for refraining from communication during the one or more communication gaps based on the communication gap indication. In an aspect, the communication gap indication may include at least one of DTX period information. DRX period information, or a duty cycle, and the means for refraining from the communication may be configured to perform at least one of: refraining from the communication during one or more DTX periods indicated in the DTX period information, refraining from the communication during one or more DRX periods indicated in the DRX period information, or refraining from the communication based on the duty cycle.

In another configuration, the apparatus 1802/1802' for wireless communication includes means for performing a synchronization with a base station via at least one of a licensed spectrum or the unlicensed spectrum, and means for communicating with the base station based on the synchronization. In an aspect, the means for performing the synchronization may be configured to: camp on a licensed carrier in the licensed spectrum in an RRC connected mode, and perform the synchronization on the licensed carrier in the licensed spectrum, where the apparatus 1802/1802' may further include means for tuning to an NB IOT carrier operating in the unlicensed spectrum to communicate data using the NB IOT carrier in the unlicensed spectrum. In an aspect, the apparatus 1802/1802' may further include means for retuning to the licensed carrier after communicating the data via the NB IOT carrier in the unlicensed spectrum, and means for performing another synchronization on the licensed carrier in the licensed spectrum. In an aspect, the means for performing the synchronization may be configured to: utilize a downlink channel to receive downlink communication in a licensed spectrum, and utilize an uplink channel to transmit uplink communication in the unlicensed spectrum, where the apparatus 1802/1802' may further include means for receiving at least one of a downlink grant or a uplink grant via downlink communication in the licensed spectrum, means for transmitting the uplink communication in the unlicensed spectrum based on the uplink grant if the uplink grant is received, and means for transmitting the uplink communication in the unlicensed spectrum based on the uplink grant if the uplink grant is received. In an aspect, the means for performing the synchronization may be configured to perform the synchronization in the unlicensed spectrum, where the apparatus 1802/1802' may further include means for switching to a different carrier for the synchronization in the unlicensed spectrum upon expiration of a dwell time on a current carrier. In an aspect, the means performing the synchronization may be configured to perform at least one of: utilizing the channel raster to be less than 100 KHz, or setting a hopping bandwidth based on a hopping bandwidth indication from the base station. In an aspect, the apparatus 1802/1802' may further include means for obtaining, before switching to the different carrier upon expiration of the dwell time, at least one of: a frequency hopping indication indicating whether frequency hopping exits, an end indication of dwell time on a current hopping frequency, or a next hopping frequency. In an aspect, the apparatus 1802/1802' may further include means for performing a cell search by searching a plurality of frequencies in the unlicensed spectrum, means for selecting a frequency of the plurality of frequencies based on a channel raster, wherein the selected frequency has a highest signal strength of the plurality of frequencies, where the synchronization is performed using a carrier corresponding to the selected frequency in the unlicensed spectrum. In an aspect, the apparatus 1802/1802' may further include means for refraining from communicating via at least one of two or more frequencies of the plurality of frequencies if a same carrier is detected in the two or more frequencies of the plurality of frequencies during the cell search. In an aspect, the apparatus 1802/1802' may further include means for receiving a hopping pattern change indication indicating that a hopping pattern of a plurality of frequencies in the unlicensed spectrum is scheduled to change, means for acquiring hopping information including a new hopping pattern based on the hopping pattern change indication, means for selecting a frequency of the plurality of frequencies in the unlicensed spectrum based on the new hopping pattern, wherein the synchronization is performed using a carrier corresponding to the selected frequency in the unlicensed spectrum. In an aspect, the means for acquiring the hopping information may be configured to perform at least one of: if the hopping information is included in at least one of an NPSS, an NSSS, or an NPBCH, acquiring the at least one of the NPSS, the NSSS, and the NPBCH within the dwell time; if the hopping information is included in a SIB, acquiring the SIB within the dwell time; or the hopping information is provided via RRC, performing at least one of RRC connection setup or RRC connection re-establishment within a dwell time. In an aspect, the apparatus 1802/1802' may further include means for obtaining an end indication of a dwell time on a current hopping frequency corresponding to the current carrier, where the means for obtaining the end indication is configured to perform at least one of: receiving the end indication in a first three symbols in a subframe carrying an NPSS to indicate a last NPSS transmission before hopping from the current hopping frequency to another frequency, or receiving the end indication in a first three symbols in a subframe carrying an NSSS to indicate a last NSSS transmission before hopping from the current hopping frequency to the another frequency.

The aforementioned means may be one or more of the aforementioned components of the apparatus 1802 and/or the processing system 1914 of the apparatus 1802' configured to perform the functions recited by the aforementioned means. As described supra, the processing system 1914 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Figure 20:
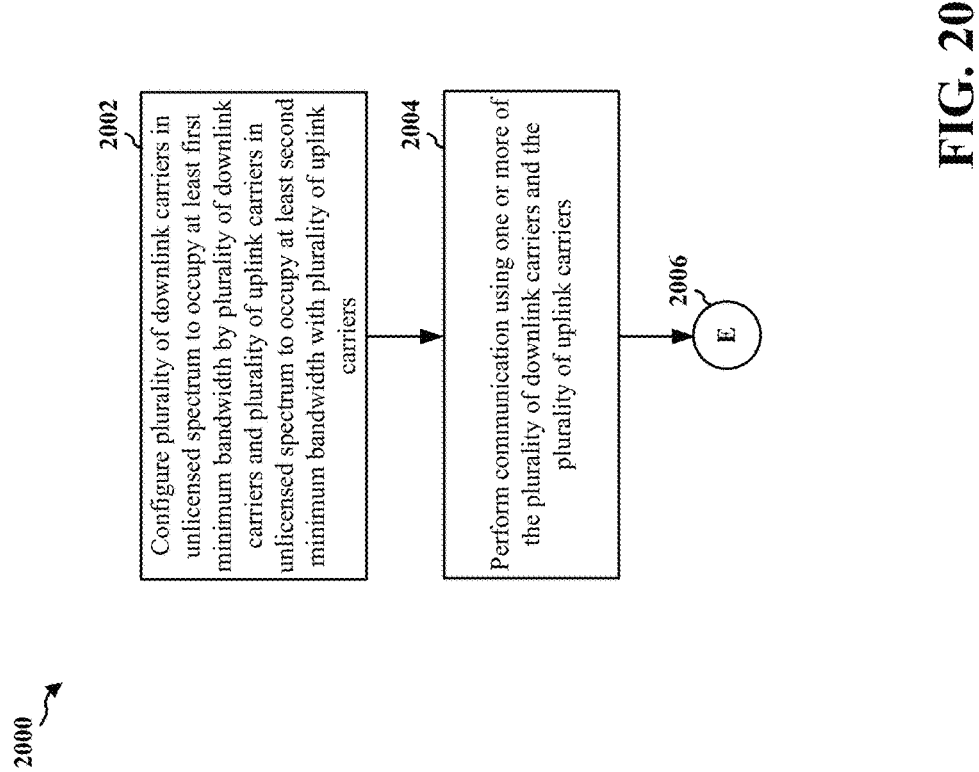
FIG. 20 is a flowchart of a method of wireless communication.

FIG. 20 is a flowchart 2000 of a method of wireless communication. The method may be performed by a base station using digital modulation for wireless communication via NB IOT in an unlicensed spectrum (e.g., the base station 520, apparatus 2802/2802'). At 2002, the base station configures a plurality of downlink carriers in the unlicensed spectrum to occupy at least a first minimum bandwidth by the plurality of downlink carriers and a plurality of uplink carriers in the unlicensed spectrum to occupy at least a second minimum bandwidth with the plurality of uplink carriers. For example, as discussed supra, an eNB may deploy NB IOT with multiple NB IOT UL carriers (e.g., UL carriers) and multiple NB IOT DL carriers (e.g., DL carriers), to provide a minimum bandwidth of the system on the UL and a minimum bandwidth of the system on the DL. For example, as discussed supra, a total bandwidth occupied by the multiple NB IOT UL carriers may be greater than or equal to a minimum bandwidth of the system, and a total bandwidth occupied by the multiple NB IOT DL carriers should be greater than or equal to the minimum bandwidth of the system. At 2004, the base station performs communication using one or more of the plurality of downlink carriers and the plurality of uplink carriers. For example, as discussed supra, the base station may communicate with the NB IOT device using the multiple NB IOT UL carriers and the multiple NB IOT DL carriers. In an aspect, the plurality of downlink carriers may include at least three downlink carriers and the plurality of uplink carriers may include at least three uplink carriers. For example, as discussed supra, the number of the multiple NB IOT UL carriers may be at least three, and the number of the multiple NB IOT DL carriers may be at least three. At 2006, the base station performs additional features, as discussed infra.

In an aspect, the at least one of the plurality of downlink carriers may be aligned with a raster to transmit one or more synchronization signals. In an aspect, the one or more synchronization signals include at least one of an NPSS or an NSSS. For example, as discussed supra, the NB IOT device may receive a synchronization signal such as an NPSS and an NSSS on a carrier aligned with a raster. In an aspect, the raster may be less than 100 KHz. For example, as discussed supra, the raster may be set to a frequency smaller than 100 KHz (e.g., 15 KHz or 30 KHz).

In an aspect, a total downlink power may be shared among the plurality of downlink carriers as a plurality of downlink powers allocated to the plurality of downlink carriers respectively, and the communication may be performed via at least one of the plurality of downlink carriers using a respective allocated downlink power of the plurality of downlink powers. For example, as discussed supra, a total DL power (e.g., 1 W) may be shared (e.g., by the eNB) among all DL carriers such that DL carriers are allocated with DL powers for DL communication, each DL carrier being allocated with a respective DL power. In an aspect, a power allocated to an NB-RS may change after a configured time period based on a total downlink power allocated to the plurality of downlink carriers. For example, as discussed supra, a power allocated to an NB-RS may change over time based on the total DL power allocated to the DL carriers. In an aspect, the downlink power may be shared based on downlink power split information, the downlink power split information being static or dynamic. For example, as discussed supra, a static power split between multiple carriers may be implemented for the NB IOT (e.g., by an eNB), where each of the carriers may be provided with different power levels, and a dynamic power split, where the way the total power is allocated to different carriers changes over time, may be implemented for the NB IOT (e.g., by an eNB).

In an aspect, the base station may perform the communication by: receiving, via multi-tone transmission, at least one of a PRACH or a PUSCH.

Figure 21:
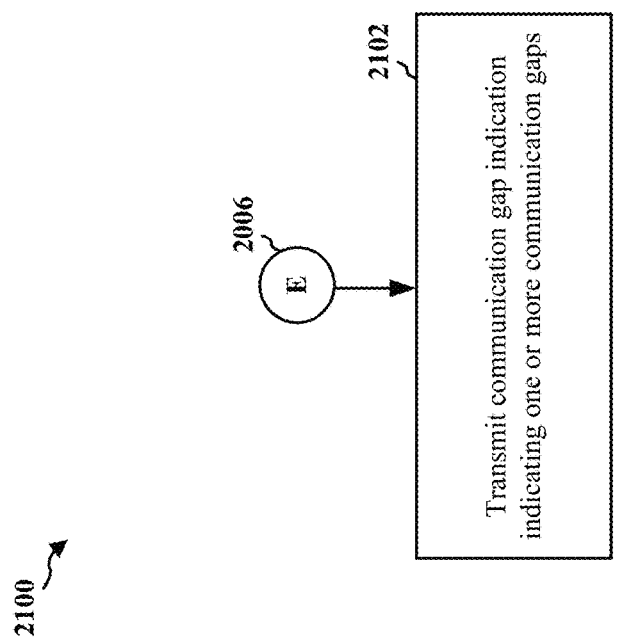
FIG. 21 is a flowchart of a method of wireless communication, expanding from the flowchart of FIG. 20.
Figure 22:
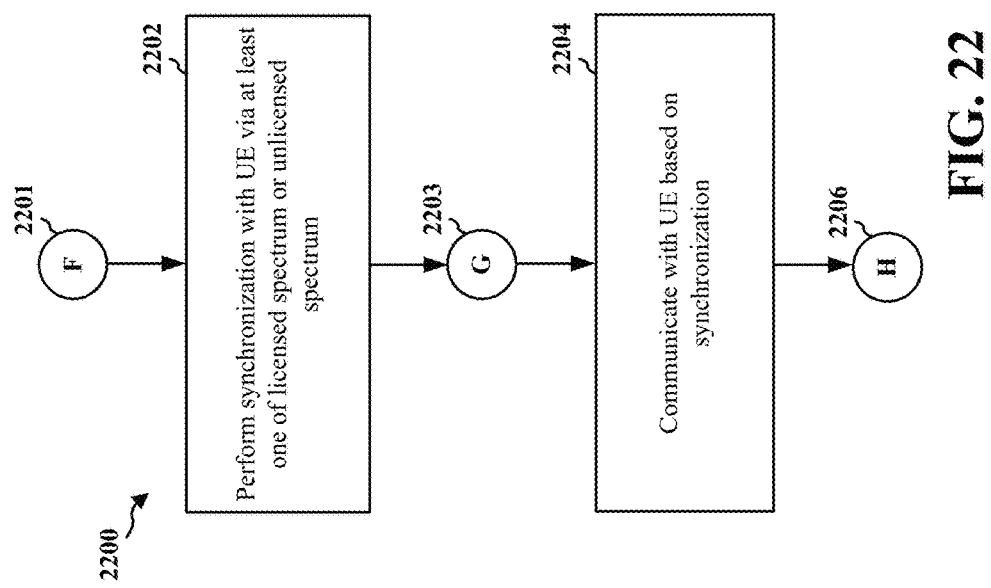
FIG. 22 is a flowchart of a method of wireless communication.

FIG. 21 is a flowchart 2100 of a method of wireless communication, expanding from the flowchart 2000 of FIG. 20. The method may be performed by a base station using digital modulation for wireless communication via NB IOT in an unlicensed spectrum (e.g., the base station 520, apparatus 2802/2802'). At 2006, the base station continues from the flowchart 2000 of FIG. 20. At 2102, the base station transmits a communication gap indication indicating one or more communication gaps. For example, as discussed supra, the eNB may configure the communication gaps and advertise the existence of the communication gaps to NB IOT devices (e.g., by transmitting a communication gap indication), to signal to NB IOT devices not to perform communication during the communication gaps. In an aspect, the communication gap indication may include at least one of: DTX period information to indicate one or more DTX periods, DRX period information to indicate one or more DRX periods, or a duty cycle. For example, as discussed supra, for long communication gaps during which an eNB may stop transmission, the eNB may configure DTX periods as the transmission gaps and advertise the DTX periods (e.g., as the communication gap indication) so that no NB IOT device transmits during the DTX periods. For example, as discussed supra, the eNB may configure DRX periods to create reception gaps, and advertise the DRX periods to NB IOT devices such that the NB IOT devices may not perform UL transmission and may not monitor DL channels (e.g., for updating time-frequency synchronization) during the DRX periods. For example, as discussed supra, transmission gaps may be signaled as DRX periods so that the NB IOT device may power down to a low power state and turn off a receiver of the NB IOT device, and thus may not receive communication during the DRX periods to conserve power FIG. 22 is a flowchart 2200 of a method of wireless communication. The method may be performed by a base station using frequency hopping and digital modulation for wireless communication via NB IOT in an unlicensed spectrum (e.g., the base station 520, apparatus 2802/2802'). For example, as discussed supra, an NB IOT device may perform communication in the unlicensed spectrum and/or in the licensed spectrum using a hybrid system with a combination of digital modulation and frequency hopping. At 2201, the base station may perform features discussed infra. At 2202, the base station performs a synchronization with a UE via at least one of a licensed spectrum or the unlicensed spectrum. At 2203, the base station may perform additional features discussed infra. At 2204, the base station communicates with the UE based on the synchronization. For example, as discussed supra, the base station may perform synchronization with the NB IOT device, and may communicate with the NB IOT device based on synchronization. At 2206, the base station performs additional features, as discussed infra.

Figures 23A, 23B:
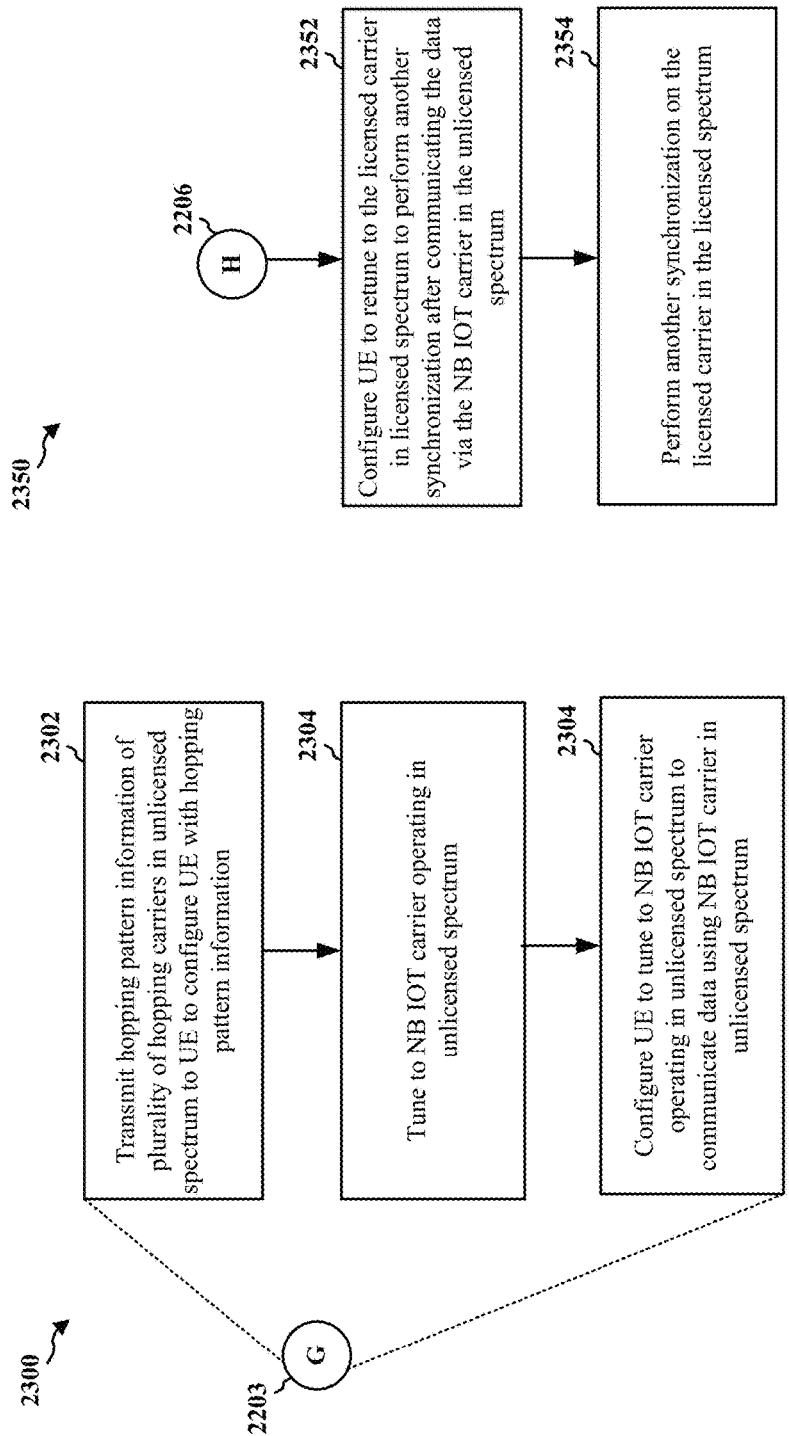
FIG. 23A is a flowchart of a method of wireless communication, expanding from the flowchart of FIG. 22.
FIG. 23B is a flowchart of a method of wireless communication, expanding from the flowchart of FIG. 22.

FIG. 23A is a flowchart 2300 of a method of wireless communication, expanding from the flowchart 2200 of FIG. 22. The method may be performed by a base station using frequency hopping and digital modulation for wireless communication via NB IOT in an unlicensed spectrum (e.g., the base station 520, apparatus 2802/2802'). At 2203, the base station may perform the features described in the flowchart 2300 of FIG. 23A, and may continue to 2204 of the flowchart 2200 of FIG. 22. In an aspect, the base station may perform the synchronization by performing the synchronization in the licensed spectrum. For example, as discussed supra, according to the licensed assisted synchronization mode, data is communicated in the unlicensed frequency spectrum and may not be communicated in the licensed frequency spectrum. For example, as discussed supra, the base station may utilize the licensed carrier for connection setup and synchronization, and may utilize the unlicensed carrier for other communication (e.g., data communication). In an aspect, the NB IOT carrier in the unlicensed spectrum is carrier-aggregation synchronized to a licensed carrier in the licensed spectrum. For example, as discussed supra, the unlicensed carrier may be carrier aggregation (CA) synchronized to the licensed carrier.

At 2302, the base station may transmit hopping pattern information of a plurality of hopping carriers in the unlicensed spectrum to the UE to configure the UE with the hopping pattern information. In an aspect, the hopping pattern information includes at least one of: a number of the plurality of hopping carriers, information for generating a hopping pattern, subframe number to start hopping, dwell time information per channel, or power restraints on the unlicensed carrier. For example, as discussed supra, the eNB may configure an NB IOT device with a hopping pattern of the unlicensed carrier to which the NB IOT device may tune. For example, as discussed supra, the eNB may provide the NB IOT device with the following hopping pattern information, such as a number of hopping carriers, information for generating a hopping pattern, subframe number to start hopping, dwell time information per channel, power restraints on the unlicensed carrier, etc. At 2304, the base station tunes to an NB IOT carrier operating in the unlicensed spectrum. For example, as discussed supra, the NB IOT device (and the base station) may tune to an unlicensed carrier in the unlicensed spectrum based on the hopping pattern information, to communicate data. At 2306, the base station may configure the UE to tune to the NB IOT carrier operating in the unlicensed spectrum to communicate data using the NB IOT carrier in the unlicensed spectrum. For example, as discussed supra, the base station may signal the NB IOT device to tune to an unlicensed carrier in the unlicensed spectrum, to communicate data.

FIG. 23B is a flowchart 2350 of a method of wireless communication, expanding from the flowchart 2200 of FIG. 22. The method may be performed by a base station using frequency hopping and digital modulation for wireless communication via NB IOT in an unlicensed spectrum (e.g., the base station 520, apparatus 2802/2802'). At 2206, the base station may continue from the flowchart 2200 of FIG. 22, after performing the features described in the flowchart 2300 of FIG. 23A. At 2352, the base station may configure the UE to retune to the licensed carrier to perform another synchronization after communicating the data via the NB IOT carrier in the unlicensed spectrum. At 2354, the base station performs another synchronization on the licensed carrier in the licensed spectrum. For example, as discussed supra, after communicating data in the unlicensed spectrum, the NB IOT device (and the base station) may retune to the licensed carrier to perform another synchronization (e.g. obtain synchronization, system information (SI), etc.) (e.g., in case the NB IOT device needs to receive updated information.

FIG. 24 is a flowchart 2400 of a method of wireless communication, expanding from the flowchart 2200 of FIG. 22. The method may be performed by a base station using frequency hopping and digital modulation for wireless communication via NB IOT in an unlicensed spectrum (e.g., the base station 520, apparatus 2802/2802'). At 2203, the base station may perform the features described in the flowchart 2400 of FIG. 24, and may continue to 2204 of the flowchart 2200 of FIG. 22. In an aspect, the base station may perform the synchronization by configuring a downlink channel to transmit a downlink communication in a licensed spectrum, and configuring an uplink channel to receive an uplink communication in the unlicensed spectrum. For example, as discussed supra, according to a mode with a licensed DL frequency band and an unlicensed UL frequency band, the eNB transmits, to an NB IOT device, DL communication in the licensed spectrum and receives the UL communication in the unlicensed spectrum. At 2402, the base station transmits at least one of a downlink grant or a uplink grant via the downlink communication in the licensed spectrum. At 2404, the base station receives the uplink communication in the unlicensed spectrum if the uplink grant is transmitted. At 2406, the base station transmits the downlink communication in the licensed spectrum if the downlink grant is transmitted. For example, the eNB may transmit a UL grant in the licensed spectrum (e.g., to the NB IOT device), and based on the UL grant, may receive UL communication in the unlicensed spectrum (e.g., from the NB IOT device). For example, the eNB may transmit a UL grant in the licensed spectrum and, may transmit DL communication in the licensed spectrum that the NB IOT device may receive based on the DL grant.

FIG. 25 is a flowchart 2500 of a method of wireless communication, expanding from the flowchart 2200 of FIG. 22. The method may be performed by a base station using frequency hopping and digital modulation for wireless communication via NB IOT in an unlicensed spectrum (e.g., the base station 520, apparatus 2802/2802'). At 2201, the base station may perform the features described in the flowchart 2500 of FIG. 25, and may continue to 2202 of the flowchart 2200 of FIG. 22. In an aspect, the base station may perform the synchronization by performing the synchronization in the unlicensed spectrum. For example, as discussed supra, according to a mode with synchronization in the unlicensed spectrum, the synchronization takes place in the unlicensed spectrum and may not take place in the licensed spectrum. At 2502, before switching the current carrier to a different carrier upon expiration of the dwell time, the base station transmits at least one of: a frequency hopping indication indicating whether frequency hopping exits, an end indication of dwell time on a current hopping frequency, or a next hopping frequency. For example, as discussed supra, the eNB may provide the NB IOT device with at least the following information before the eNB switches to a different carrier, such as a frequency hopping indication indicating whether frequency hopping exits, an end indication of dwell time on a current hopping frequency, or a next hopping frequency. At 2504, the base station switches to a different carrier for the synchronization in the unlicensed spectrum upon expiration of a dwell time on the current carrier. For example, as discussed supra, the eNB switches to a different carrier after expiration of a dwell time on the current carrier. In an aspect, the different carrier may include one or more carriers corresponding to one or more hopping frequencies that are aligned with a channel raster in the unlicensed spectrum. For example, as discussed supra, the eNB and the NB IOT device may perform synchronization on a carrier/hopping frequency in the unlicensed spectrum. In an aspect, the base station performs the synchronization by: utilizing the channel raster that is less than 100 KHz, or setting a hopping bandwidth based on a hopping bandwidth indication. For example, as discussed supra, the NB IOT device may be configured to perform synchronization (e.g., with the eNB) on carriers/hopping frequencies that are aligned with a channel raster. For example, as discussed supra, the channel raster may be changed to a smaller number (e.g., smaller than 100 KHz), and/or a hopping bandwidth for frequency hopping may be indicated by the eNB (e.g., via a hopping bandwidth indication) as a part of a system configuration process (e.g., via an MIB, a PBCH, and/or a SIB).

Figure 26:
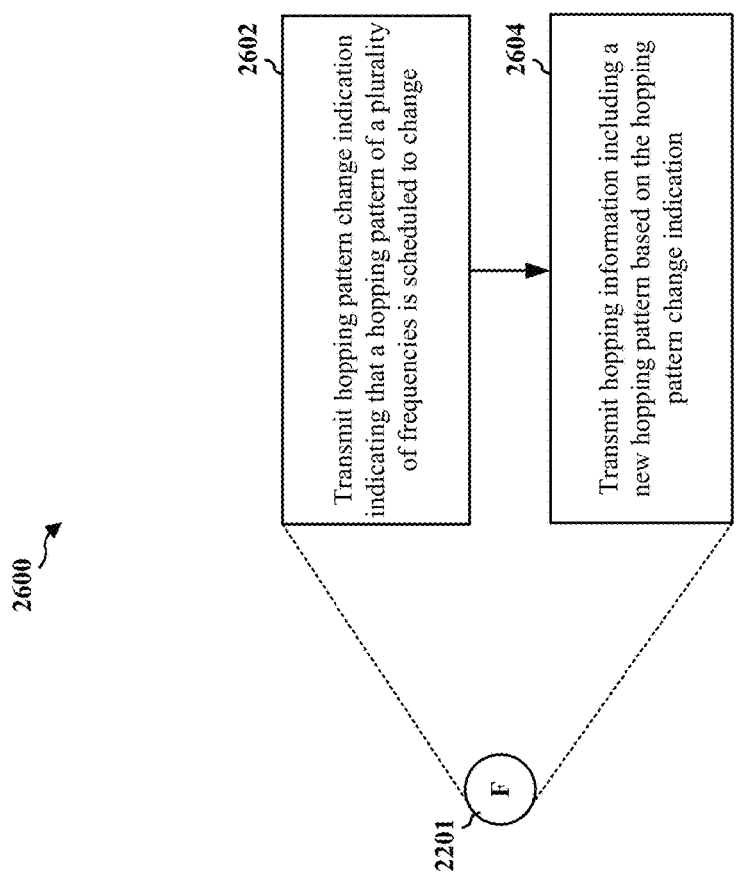
FIG. 26 is a flowchart of a method of wireless communication, expanding from the flowchart of FIG. 25.

FIG. 26 is a flowchart 2600 of a method of wireless communication, expanding from the flowchart 2500 of FIG. 25. The method may be performed by a base station using frequency hopping and digital modulation for wireless communication via NB IOT in an unlicensed spectrum (e.g., the base station 520, apparatus 2802/2802'). At 2201, the base station may perform the features described in the flowchart 2500 of FIG. 25, and may continue to 2202 of the flowchart 2200 of FIG. 22. At 2602, the base station transmits a hopping pattern change indication indicating that a hopping pattern of a plurality of frequencies is scheduled to change. At 2604, the base station transmits hopping information including a new hopping pattern based on the hopping pattern change indication. For example, as discussed supra, if the eNB determines that a hopping pattern is expected to change over time (e.g., every x msec), the eNB may convey the information about the expected change in the hopping pattern to the NB IOT device (e.g., via a SIB transmitted to the NB IOT device). In an aspect, the base station may transmit the hopping information by performing at least one of: transmitting the hopping information via at least one of an NPSS, an NSSS, or an NPBCH within a dwell time; transmitting the hopping information via a SIB within a dwell time; or if hopping information is provided via RRC, performing at least one of RRC connection setup or RRC connection re-establishment within a dwell time. For example, as discussed supra, if the hopping information is provided to the NB IOT device via an NPSS, an NSSS, and/or a NPBCH, then the NB IOT device needs to acquire the NPSS, the NSSS, and the NPBCH within a dwell time, which may require a short acquisition time. For example, as discussed supra, if the hopping information is provided to the NB IOT device via SIB1 and/or SIB2, then the NB IOT device needs to acquire SIB1 and/or SIB2 within a dwell time. For example, as discussed supra, if an RRC signaling provides the hopping information to the NB IOT device, then the NB IOT device should perform RRC connection setup/re-establishment within a dwell time.

Figure 27:
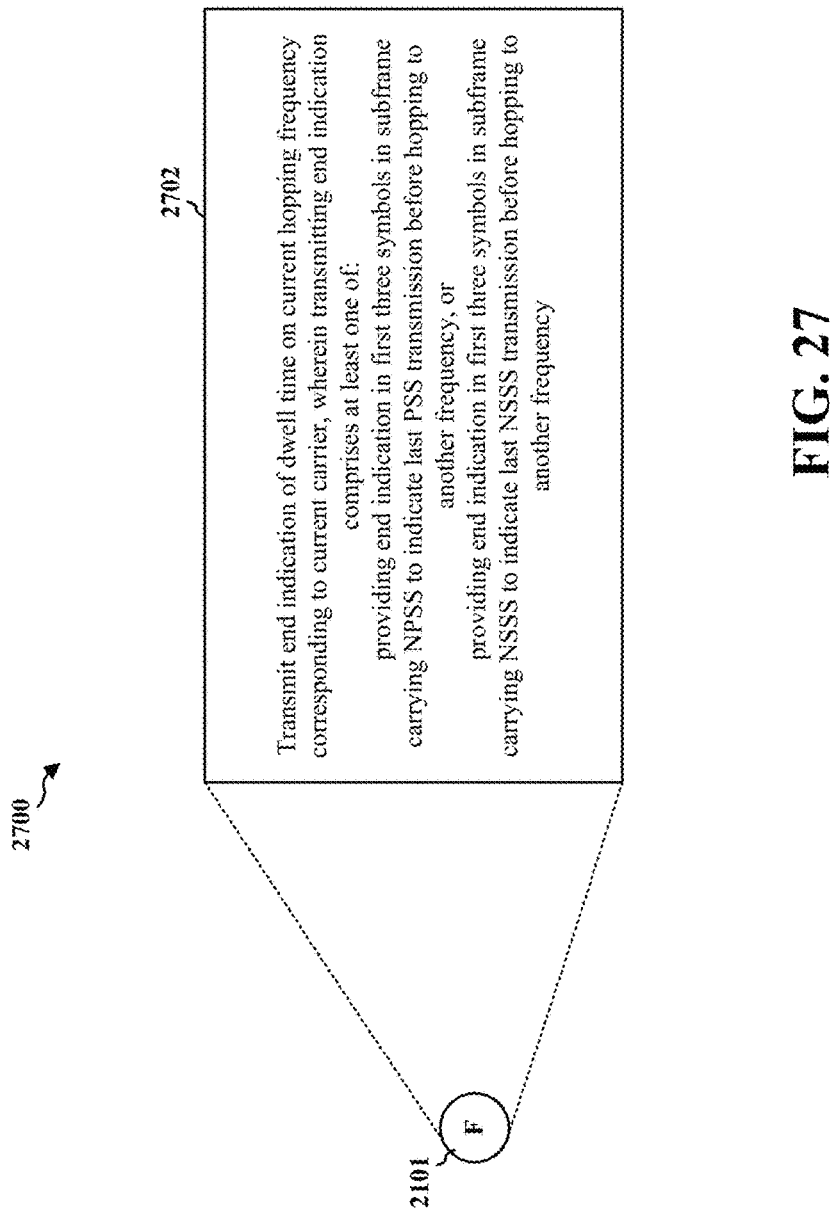
FIG. 27 is a flowchart of a method of wireless communication, expanding from the flowchart of FIG. 25.

FIG. 27 is a flowchart 2700 of a method of wireless communication, expanding from the flowchart 2500 of FIG. 25. The method may be performed by a base station using frequency hopping and digital modulation for wireless communication via NB IOT in an unlicensed spectrum (e.g., the base station 520, apparatus 2802/2802'). At 2102, the base station may perform the features described in the flowchart 2500 of FIG. 25, and may continue to 2202 of the flowchart 2200 of FIG. 22. At 2702, the base station transmits an end indication of a dwell time on the current hopping frequency, wherein the transmitting the end indication comprises at least one of: providing the end indication in a first three symbols in a subframe carrying an NPSS to indicate a last NPSS transmission before hopping from the current hopping frequency to another frequency, or providing the end indication in a first three symbols in a subframe carrying an NSSS to indicate a last NSSS transmission before hopping from the current hopping frequency to the another frequency. For example, as discussed supra, the end of a dwell period on a frequency may be indicated to the NB IOT device (e.g., by the eNB) using at least one of the following options. According to the first option, the first 3 OFDM symbols in the subframe carrying a NPSS may be re-used to indicate that the NPSS transmission in the subframe is the last NPSS transmission before the eNB moves to a next frequency. According to a second option, the first 3 OFDM symbols in the subframe carrying an NSSS may be reused (e.g., by the eNB) to indicate that this is the last NSSS transmission before the eNB moves to a next frequency. In an aspect, the frequency hopping may be non-uniform. In an aspect, to the base station may hop to an anchor frequency more often than one or more non-anchor frequencies. In an aspect, to the base station may hop to one frequency more often than another frequency based on signal interference. For example, as discussed supra, hopping may be performed non-uniformly on different frequencies. For example, as discussed supra, during hopping, anchor carriers/frequencies may be visited more frequently and other frequencies may be visited less. For example, as discussed supra, a hopping pattern could also be biased to remove and/or reduce use of some frequencies for better interference mitigation with other systems.

Figure 28:
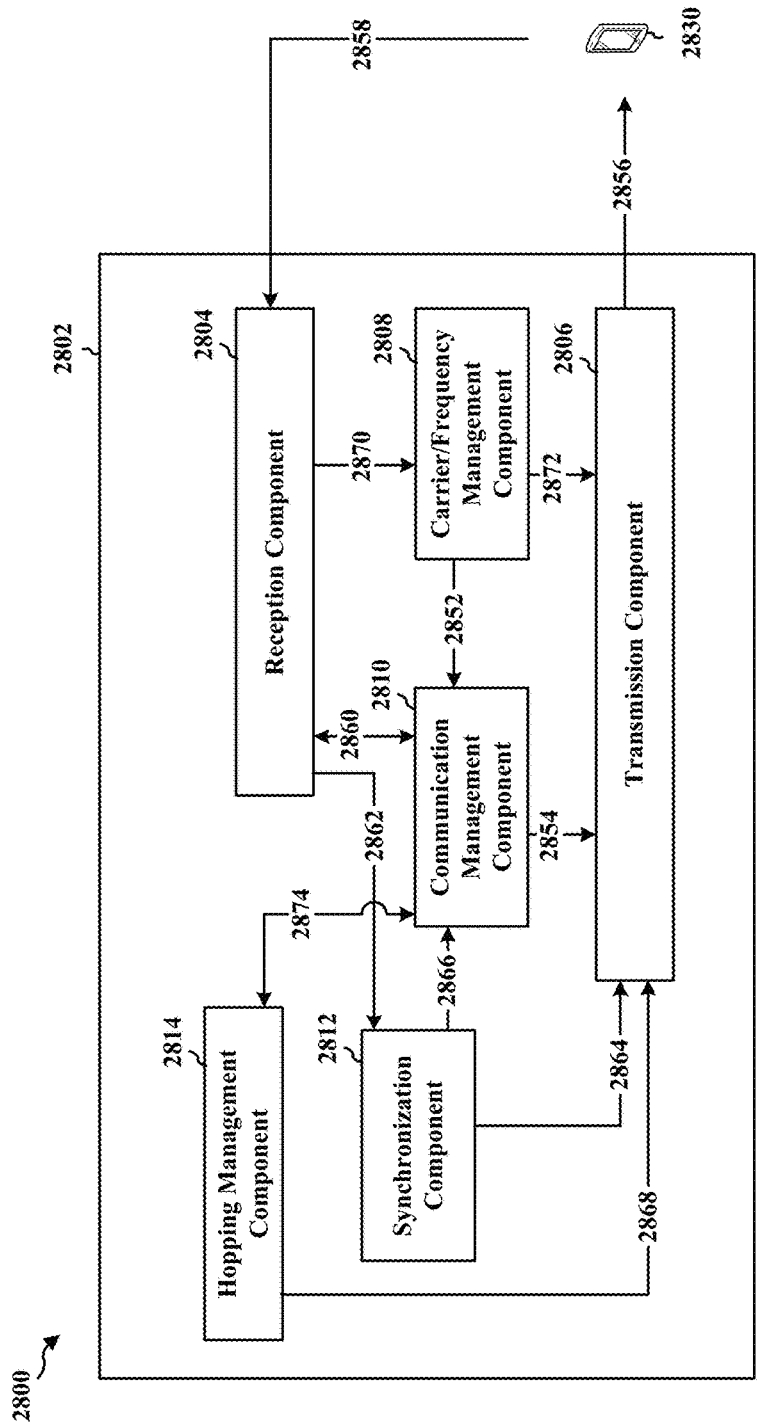
FIG. 28 is a conceptual data flow diagram illustrating the data flow between different means/components in an exemplary apparatus.

FIG. 28 is a conceptual data flow diagram 2800 illustrating the data flow between different means/components in an exemplary apparatus 2802. The apparatus may be a base station. The apparatus includes a reception component 2804, a transmission component 2806, a carrier/frequency management component 2808, a communication management component 2810, a synchronization component 2812, and a hopping management component 2814.

According to an aspect of the disclosure, the base station may utilize digital modulation for wireless communication via NB IOT in an unlicensed spectrum. The carrier/frequency management component 2808 configures a plurality of downlink carriers in the unlicensed spectrum to occupy at least a first minimum bandwidth by the plurality of downlink carriers and a plurality of uplink carriers in the unlicensed spectrum to occupy at least a second minimum bandwidth with the plurality of uplink carriers, and may communicate with the communication management component 2810 at 2852. The communication management component 2810 performs communication using one or more of the plurality of downlink carriers and the plurality of uplink carriers (e.g., via the reception component 2804 and the transmission component 2806, with a UE 2830, at 2854, 2856, 2858, and 2860). In an aspect, the plurality of downlink carriers may include at least three downlink carriers and the plurality of uplink carriers may include at least three uplink carriers.

In an aspect, the at least one of the plurality of downlink carriers may be aligned with a raster to transmit one or more synchronization signals. In an aspect, the one or more synchronization signals include at least one of an NPSS or an NSSS. In an aspect, the raster may be less than 100 KHz.

In an aspect, a total downlink power may be shared among the plurality of downlink carriers as a plurality of downlink powers allocated to the plurality of downlink carriers respectively, and the communication may be performed via at least one of the plurality of downlink carriers using a respective allocated downlink power of the plurality of downlink powers. In an aspect, a power allocated to an NB-RS may change after a configured time period based on a total downlink power allocated to the plurality of downlink carriers. In an aspect, the total downlink power may be shared based on downlink power split information, the downlink power split information being static or dynamic.

In an aspect, the communication management component 2810 may perform the communication by: receiving, via multi-tone transmission, at least one of a PRACH or a PUSCH (e.g., via the reception component 2804 at 2858 and 2860).

In an aspect, the communication management component 2810 transmits a communication gap indication indicating one or more communication gaps, via the transmission component 2806 at 2854 and 2856. In an aspect, the communication gap indication may include at least one of: DTX period information to indicate one or more DTX periods, DRX period information to indicate one or more DRX periods, or a duty cycle.

According to another aspect of the disclosure, the base station may utilize frequency hopping and digital modulation for wireless communication via NB IOT in an unlicensed spectrum. The synchronization component 2812 performs a synchronization with a UE (e.g., UE 2830) via at least one of a licensed spectrum or the unlicensed spectrum (e.g., via the reception component 2804 and the transmission component 2806, with a UE 2830, at 2858, 2862, 2864, and 2856) and conveys such information to the communication management component 2810, at 2866. The communication management component 2810 communicates with the UE based on the synchronization (e.g., via the reception component 2804 and the transmission component 2806, with the UE 2830, at 2854, 2856, 2858, and 2860).

In an aspect, the synchronization component 2812 may perform the synchronization by performing the synchronization in the licensed spectrum (e.g., via the reception component 2804 and the transmission component 2806, with a UE 2830, at 2858, 2862, 2864, and 2856). In an aspect, the NB IOT carrier in the unlicensed spectrum is carrier-aggregation synchronized to a licensed carrier in the licensed spectrum (e.g., via the reception component 2804 and the transmission component 2806, with a UE 2830, at 2858, 2862, 2864, and 2856). The hopping management component 1814 may transmit hopping pattern information of a plurality of hopping carriers in the unlicensed spectrum to the UE to configure the UE with the hopping pattern information (e.g., via the transmission component 2806, at 2868 and 2856). In an aspect, the hopping pattern information may include at least one of: a number of the plurality of hopping carriers, information for generating a hopping pattern, subframe number to start hopping, dwell time information per channel, or power restraints on the unlicensed carrier. The communication management component 2810 tunes to an NB IOT carrier operating in the unlicensed spectrum. The communication management component 2810 configures the UE to tune to the NB IOT carrier operating in the unlicensed spectrum to communicate data using the NB IOT carrier in the unlicensed spectrum (e.g., via the transmission component 2806, at 2854 and 2856).

In an aspect, the communication management component 2810 configures the UE to retune to the licensed carrier to perform another synchronization after communicating the data via the NB IOT carrier in the unlicensed spectrum e.g., via the transmission component 2806, at 2854 and 2856).

The synchronization component 2812 may perform another synchronization on the licensed carrier in the licensed spectrum (e.g., via the reception component 2804 and the transmission component 2806, with a UE 2830, at 2858, 2862, 2864, and 2856).

In an aspect, the synchronization component 2812 and the communication management component 2810 may perform the synchronization by configuring a downlink channel to transmit downlink communication in a licensed spectrum (e.g., via the reception component 2804 and the transmission component 2806, with the UE 2830, at 2866, 2854, 2856, 2858, and 2860), and configuring an uplink channel to receive uplink communication in the unlicensed spectrum (e.g., via the reception component 1804 and the transmission component 2806, with the UE 2830, at 1866, 2854, 2856, 2858, and 2860). The communication management component 2810 may transmit at least one of a downlink grant or a uplink grant via downlink communication in the licensed spectrum (e.g., via the transmission component 2806, at 2854 and 2856). The communication management component 2810 may configure to receive communication via the uplink channel in the unlicensed spectrum (e.g., via the reception component 2804, at 2858 and 2860). The communication management component 2810 may configure to transmit communication via the downlink channel in the licensed spectrum (e.g., via the transmission component 2806, at 2854 and 2856).

In an aspect, the synchronization component 2812 performs the synchronization by performing the synchronization in the unlicensed spectrum (e.g., via the reception component 2804 and the transmission component 2806, with a UE 2830, at 2858, 2862, 2864, and 2856). Before switching the current carrier to a different carrier upon expiration of the dwell time, the hopping management component 2814 transmits at least one of: a frequency hopping indication indicating whether frequency hopping exits, an end indication of dwell time on a current hopping frequency, or a next hopping frequency (e.g., via the transmission component 2806, at 2868 and 2856). The carrier/frequency management component 1808 switches to a different carrier for the synchronization in the unlicensed spectrum upon expiration of a dwell time on a current carrier. In an aspect, the different carrier may include one or more carriers corresponding to one or more hopping frequencies that are aligned with a channel raster in the unlicensed spectrum. In an aspect, the synchronization component 2812 may configure to perform the synchronization by performing at least one of: utilizing the channel raster that is less than 100 KHz, or setting a hopping bandwidth based on a hopping bandwidth indication.

In an aspect, the hopping management component 2814 transmits a hopping pattern change indication indicating that a hopping pattern of a plurality of frequencies is scheduled to change (e.g., via the transmission component 2806, at 2868 and 2856). The hopping management component 2814 transmits hopping information including a new hopping pattern based on the hopping pattern change indication (e.g., via the transmission component 2806, at 2868 and 2856). In an aspect, the hopping management component 2814 may transmit the hopping information by performing at least one of: transmitting the hopping information via at least one of an NPSS, an NSSS, or an NPBCH within a dwell time; transmitting the hopping information via a SIB within a dwell time; or if hopping information is provided via RRC, performing at least one of RRC connection setup or RRC connection re-establishment within a dwell time.

In an aspect, the communication management component 1810 transmits an end indication of a dwell time on a current hopping frequency (e.g., via the transmission component 2806, at 2854 and 2856), where the transmitting the end indication comprises at least one of: providing the end indication in a first three symbols in a subframe carrying an NPSS to indicate a last PSS transmission before hopping from the current hopping frequency to another frequency, or providing the end indication in a first three symbols in a subframe carrying an NSSS to indicate a last SSS transmission before hopping from the current hopping frequency to the another frequency. In an aspect, the frequency hopping is non-uniform. In an aspect, to the base station may hop to an anchor frequency more often than one or more non-anchor frequencies. In an aspect, to the base station may hop to one frequency more often than another frequency based on signal interference.

The apparatus may include additional components that perform each of the blocks of the algorithm in the aforementioned flowcharts of FIGS. 22-27. As such, each block in the aforementioned flowcharts of FIGS. 22-27 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 29:
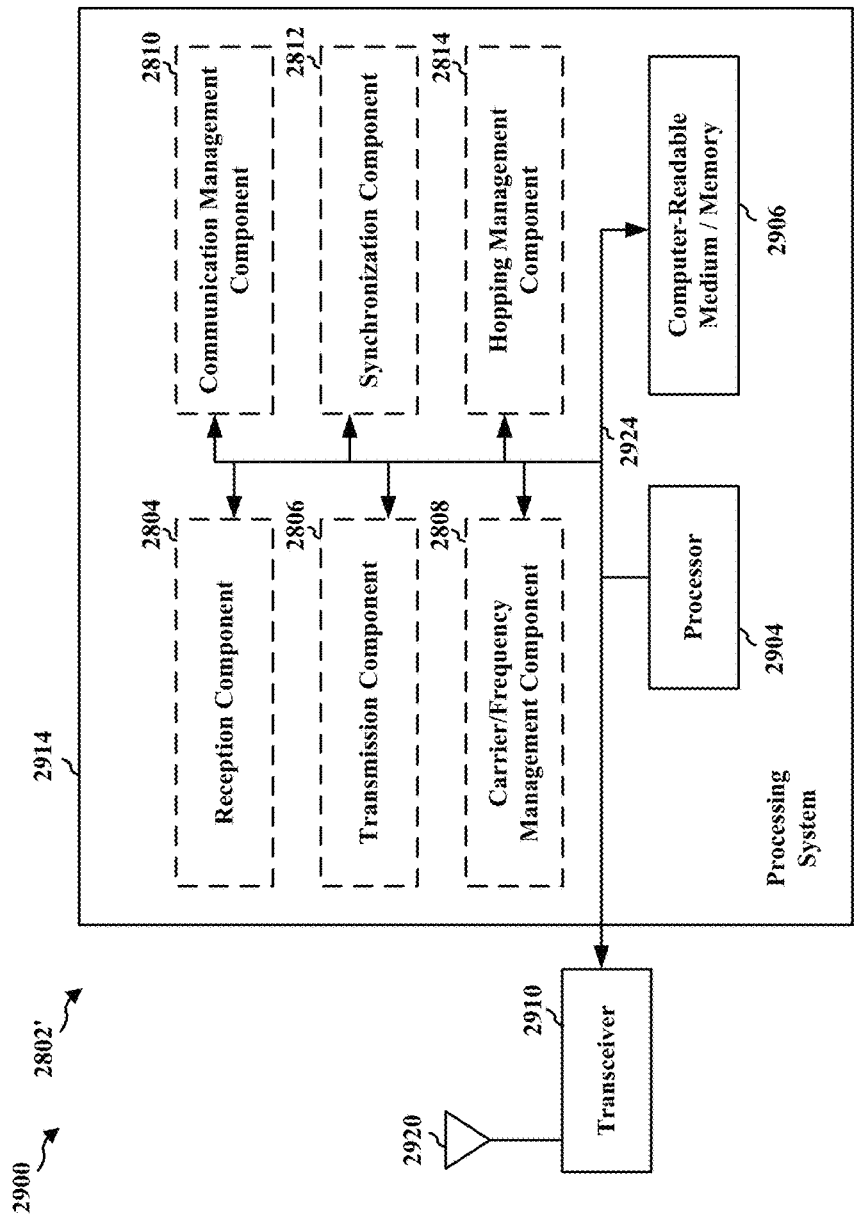
FIG. 29 is a diagram illustrating an example of a hardware implementation for an apparatus employing a processing system.

FIG. 29 is a diagram 2900 illustrating an example of a hardware implementation for an apparatus 2802' employing a processing system 2914. The processing system 2914 may be implemented with a bus architecture, represented generally by the bus 2924. The bus 2924 may include any number of interconnecting buses and bridges depending on the specific application of the processing system 2914 and the overall design constraints. The bus 2924 links together various circuits including one or more processors and/or hardware components, represented by the processor 2904, the components 2804, 2806, 2808, 2810, 2812, 2814, and the computer-readable medium/memory 2906. The bus 2924 may also link various other circuits such as timing sources, peripherals, voltage regulators, and power management circuits, which are well known in the art, and therefore, will not be described any further.

The processing system 2914 may be coupled to a transceiver 2910. The transceiver 2910 is coupled to one or more antennas 2920. The transceiver 2910 provides a means for communicating with various other apparatus over a transmission medium. The transceiver 2910 receives a signal from the one or more antennas 2920, extracts information from the received signal, and provides the extracted information to the processing system 2914, specifically the reception component 2804. In addition, the transceiver 2910 receives information from the processing system 2914, specifically the transmission component 2806, and based on the received information, generates a signal to be applied to the one or more antennas 2920. The processing system 2914 includes a processor 2904 coupled to a computer-readable medium/memory 2906. The processor 2904 is responsible for general processing, including the execution of software stored on the computer-readable medium/memory 2906. The software, when executed by the processor 2904, causes the processing system 2914 to perform the various functions described supra for any particular apparatus. The computer-readable medium/memory 2906 may also be used for storing data that is manipulated by the processor 2904 when executing software. The processing system 2914 further includes at least one of the components 2804, 2806, 2808, 2810, 2812, 2814. The components may be software components running in the processor 2904, resident/stored in the computer readable medium/memory 2906, one or more hardware components coupled to the processor 2904, or some combination thereof. The processing system 2914 may be a component of the base station 310 and may include the memory 376 and/or at least one of the TX processor 316, the RX processor 370, and the controller/processor 375.

In one configuration, the apparatus 2802/2802' for wireless communication includes means for configuring a plurality of downlink carriers in the unlicensed spectrum to occupy at least a first minimum bandwidth by the plurality of downlink carriers and a plurality of uplink carriers in the unlicensed spectrum to occupy at least a second minimum bandwidth with the plurality of uplink carriers, and means for performing communication using one or more of the plurality of downlink carriers and the plurality of uplink carriers. In an aspect, the means for performing the communication may be configured to receive, via multi-tone transmission, at least one of a PRACH or a PUSCH. In an aspect, the apparatus 2802/2802' may further include means for transmitting a communication gap indication indicating one or more communication gaps.

In another configuration, the apparatus 2802/2802' for wireless communication includes means for performing a synchronization with a UE via at least one of a licensed spectrum or the unlicensed spectrum, and means for communicating with the UE based on the synchronization. In an aspect, the means for performing the synchronization may be configured to perform the synchronization in the licensed spectrum, where the apparatus 2802/2802' may further include: means for tuning to an NB IOT carrier operating in the unlicensed spectrum, and means for configuring the UE to tune to the NB IOT carrier operating in the unlicensed spectrum to communicate data using the NB IOT carrier in the unlicensed spectrum. In an aspect, the apparatus 2802/2802' may further include means for transmitting hopping pattern information of a plurality of hopping carriers in the unlicensed spectrum to the UE to configure the UE with the hopping pattern information, where the hopping pattern information includes at least one of: a number of the plurality of hopping carriers, information for generating a hopping pattern, subframe number to start hopping, dwell time information per channel, or power restraints on the unlicensed carrier. In an aspect, the apparatus 2802/2802' may further include means for configuring the UE to retune to the licensed carrier to perform another synchronization after communicating the data via the NB IOT carrier in the unlicensed spectrum, and means for performing another synchronization on the licensed carrier in the licensed spectrum. In an aspect, the means for performing the synchronization may be configured to: configure a downlink channel to transmit downlink communication in a licensed spectrum, and configure an uplink channel to receive uplink communication in the unlicensed spectrum, where the apparatus 2802/2802' may further include means for transmitting at least one of a downlink grant or a uplink grant via downlink communication in the licensed spectrum, means for configuring to receive communication via the uplink channel in the unlicensed spectrum, and means for configuring to transmit communication via the downlink channel in the licensed spectrum. In an aspect, the means for performing the synchronization may be configured to: perform the synchronization in the unlicensed spectrum, where the apparatus 2802/2802' may further include means for switching to a different carrier for the synchronization in the unlicensed spectrum upon expiration of a dwell time on a current carrier. In an aspect, the means for configuring the synchronization may be configured to perform at least one of: utilizing the channel raster that is less than 100 KHz, or setting a hopping bandwidth based on a hopping bandwidth indication. In an aspect, the apparatus 2802/2802' may further include means for transmitting, before switching to the different carrier upon expiration of the dwell time, at least one of: a frequency hopping indication indicating whether frequency hopping exits, an end indication of dwell time on a current hopping frequency, or a next hopping frequency. In an aspect, the apparatus 2802/2802' may further include means for transmitting a hopping pattern change indication indicating that a hopping pattern of a plurality of frequencies is scheduled to change, and means for transmitting hopping information including a new hopping pattern based on the hopping pattern change indication. In an aspect, the means for transmitting the hopping information is configured to perform at least one of: transmitting the hopping information via at least one of an NPSS, an NSSS, or an NPBCH within a dwell time, transmitting the hopping information via a SIB within a dwell time, or if the hopping information is provided via RRC, performing at least one of RRC connection setup or RRC connection re-establishment within a dwell time. In an aspect, the apparatus 2802/2802' may further include means for transmitting an end indication of a dwell time on a current hopping frequency corresponding to the current carrier, wherein the means for transmitting the end indication is configured to perform at least one of: providing the end indication in a first three symbols in a subframe carrying an NPSS to indicate a last NPSS transmission before hopping from the current hopping frequency to another frequency, or providing the end indication in a first three symbols in a subframe carrying an NSSS to indicate a last NSSS transmission before hopping from the current hopping frequency to the another frequency.

The aforementioned means may be one or more of the aforementioned components of the apparatus 2802 and/or the processing system 2914 of the apparatus 2802' configured to perform the functions recited by the aforementioned means. As described supra, the processing system 2914 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication via narrowband internet of things (NB IOT) communication in an unlicensed spectrum by a user equipment (UE) using digital modulation, comprising:
   utilizing, in a non-frequency hopping system, a plurality of downlink carriers in the unlicensed spectrum occupying at least a first minimum bandwidth by the plurality of downlink carriers and a plurality of uplink carriers in the unlicensed spectrum occupying at least a second minimum bandwidth with the plurality of uplink carriers, wherein the plurality of downlink carriers includes at least three downlink carriers in the unlicensed spectrum and the plurality of uplink carriers includes at least three uplink carriers in the unlicensed spectrum; and
   performing communication using one or more of the plurality of downlink carriers and the plurality of uplink carriers.

2. The method of claim 1, further comprising:
   receiving carrier configuration information indicating the plurality of downlink carriers and the plurality of uplink carriers,
   wherein the utilizing the plurality of downlink carriers and the plurality of uplink carriers is based on the carrier configuration information.

3. The method of claim 1, wherein the at least one of the plurality of downlink carriers is aligned with a raster to receive one or more synchronization signals.

4. The method of claim 3, wherein the one or more synchronization signals include at least one of a narrowband primary synchronization signal (NPSS) or a narrowband secondary synchronization signal (NSSS).

5. The method of claim 3, wherein the raster is less than 100 KHz.

6. The method of claim 3, wherein a search frequency for one or more downlink synchronization signals is based on the raster and offset information.

7. The method of claim 6, wherein the offset information is specified in a removable card or in a storage device of the UE.

8. The method of claim 1, wherein a total uplink power is shared among the plurality of uplink carriers as a plurality of uplink powers allocated to the plurality of uplink carriers respectively, and wherein the communication is performed via at least one of the plurality of uplink carriers using a respective allocated uplink power of the plurality of uplink powers.

9. The method of claim 8, wherein the total uplink power is shared based on uplink power split information, the uplink power split information being static or dynamic.

10. The method of claim 1, further comprising:
increasing a channel repetition level to transmit at least one of a physical random access channel (PRACH) or a physical uplink shared channel (PUSCH) via at least one of the plurality of uplink carriers, wherein the channel repetition level is increased for the unlicensed spectrum.

11. The method of claim 1, wherein the performing the communication further comprises:
performing multi-tone transmissions to transmit at least one of a physical random access channel (PRACH) or a physical uplink shared channel (PUSCH).

12. The method of claim 1, further comprising:
receiving a communication gap indication, the communication gap indication indicating one or more communication gaps; and
refraining from communication during the one or more communication gaps based on the communication gap indication.

13. The method of claim 12, wherein the communication gap indication includes at least one of discontinuous transmission (DTX) period information, discontinuous reception (DRX) period information, or a duty cycle, and
wherein the refraining from the communication includes at least one of:
refraining from the communication during one or more DTX periods indicated in the DTX period information,
refraining from the communication during one or more DRX periods indicated in the DRX period information, or
refraining from the communication based on the duty cycle.

14. A method of wireless communication via narrowband internet of things (NB IOT) in an unlicensed spectrum by a base station using digital modulation, comprising:
configuring, in a non-frequency hopping system, a plurality of downlink carriers in the unlicensed spectrum to occupy at least a first minimum bandwidth by the plurality of downlink carriers and a plurality of uplink carriers in the unlicensed spectrum to occupy at least a second minimum bandwidth with the plurality of uplink carriers, wherein the plurality of downlink carriers includes at least three downlink carriers in the unlicensed spectrum and the plurality of uplink carriers includes at least three uplink carriers in the unlicensed spectrum; and
performing communication using one or more of the plurality of downlink carriers and the plurality of uplink carriers.

15. The method of claim 14, wherein the at least one of the plurality of downlink carriers are aligned with a raster to transmit one or more synchronization signals.

16. The method of claim 15, wherein the one or more synchronization signals include at least one of a narrowband primary synchronization signal (NPSS) or a narrowband secondary synchronization signal (NSSS).

17. The method of claim 15, wherein the raster is less than 100 KHz.

18. The method of claim 14, wherein a total downlink power is shared among the plurality of downlink carriers as a plurality of downlink powers allocated to the plurality of downlink carriers respectively, and wherein the communication is performed via at least one of the plurality of downlink carriers using a respective allocated downlink power of the plurality of downlink powers.

19. The method of claim 18, wherein a power allocated to a narrowband reference signal (NB-RS) changes after a configured time period based on the total downlink power allocated to the plurality of downlink carriers.

20. The method of claim 18, wherein the total downlink power is shared based on downlink power split information, the downlink power split information being static or dynamic.

21. The method of claim 14, wherein the performing the communication further comprises:
receiving, via multi-tone transmission, at least one of a physical random access channel (PRACH) or a physical uplink shared channel (PUSCH).

22. The method of claim 14, further comprising:
transmitting a communication gap indication indicating one or more communication gaps.

23. The method of claim 22, wherein the communication gap indication comprises at least one of:
discontinuous transmission (DTX) period information to indicate one or more DTX periods,
discontinuous reception (DRX) period information to indicate one or more DRX periods, or
a duty cycle.

24. A user equipment (UE) for wireless communication via narrowband internet of things (NB IOT) in an unlicensed spectrum using digital modulation, comprising:
means for utilizing, in a non-frequency hopping system, a plurality of downlink carriers in the unlicensed spectrum occupying at least a first minimum bandwidth by the plurality of downlink carriers and a plurality of uplink carriers in the unlicensed spectrum occupying at least a second minimum bandwidth with the plurality of uplink carriers, wherein the plurality of downlink carriers includes at least three downlink carriers in the unlicensed spectrum and the plurality of uplink carriers includes at least three uplink carriers in the unlicensed spectrum; and
means for performing communication using one or more of the plurality of downlink carriers and the plurality of uplink carriers.

25. The UE of claim 24, further comprising:
means for receiving carrier configuration information indicating the plurality of downlink carriers and the plurality of uplink carriers,
wherein the means for utilizing the plurality of downlink carriers and the plurality of uplink carriers is based on the carrier configuration information.

26. The UE of claim 24, wherein the at least one of the plurality of downlink carriers is aligned with a raster to receive one or more synchronization signals.

27. The UE of claim 26, wherein the one or more synchronization signals include at least one of a narrowband primary synchronization signal (NPSS) or a narrowband secondary synchronization signal (NSSS).

28. The UE of claim 26, wherein the raster is less than 100 KHz.

29. The UE of claim 26, wherein a search frequency for one or more downlink synchronization signals is based on the raster and offset information.

30. The UE of claim 29, wherein the offset information is specified in a removable card or in a storage device of the UE.

31. The UE of claim 24, wherein a total uplink power is shared among the plurality of uplink carriers as a plurality of uplink powers allocated to the plurality of uplink carriers respectively, and wherein the communication is performed via at least one of the plurality of uplink carriers using a respective allocated uplink power of the plurality of uplink powers.

32. The UE of claim 31, wherein the total uplink power is shared based on uplink power split information, the uplink power split information being static or dynamic.

33. The UE of claim 24, further comprising:
means for increasing a channel repetition level to transmit at least one of a physical random access channel (PRACH) or a physical uplink shared channel (PUSCH) via at least one of the plurality of uplink carriers, wherein the channel repetition level is increased for the unlicensed spectrum.

34. The UE of claim 24, wherein the means for performing the communication is configured to:
perform multi-tone transmissions to transmit at least one of a physical random access channel (PRACH) or a physical uplink shared channel (PUSCH).

35. The UE of claim 19, further comprising:
means for receiving a communication gap indication, the communication gap indication indicating one or more communication gaps; and
means for refraining from communication during the one or more communication gaps based on the communication gap indication.

36. The UE of claim 35, wherein the communication gap indication includes at least one of discontinuous transmission (DTX) period information, discontinuous reception (DRX) period information, or a duty cycle, and
wherein the means for refraining from the communication is configured to perform at least one of:
refraining from the communication during one or more DTX periods indicated in the DTX period information,
refraining from the communication during one or more DRX periods indicated in the DRX period information, or
refraining from the communication based on the duty cycle.

37. A base station for wireless communication via narrowband internet of things (NB IOT) in an unlicensed spectrum using digital modulation, comprising:
means for configuring, in a non-frequency hopping system, a plurality of downlink carriers in the unlicensed spectrum to occupy at least a first minimum bandwidth by the plurality of downlink carriers and a plurality of uplink carriers in the unlicensed spectrum to occupy at least a second minimum bandwidth with the plurality of uplink carriers, wherein the plurality of downlink carriers includes at least three downlink carriers in the unlicensed spectrum and the plurality of uplink carriers includes at least three uplink carriers in the unlicensed spectrum; and
means for performing communication using one or more of the plurality of downlink carriers and the plurality of uplink carriers.

38. The base station of claim 37, wherein the at least one of the plurality of downlink carriers are aligned with a raster to transmit one or more synchronization signals.

39. The base station of claim 38, wherein the one or more synchronization signals include at least one of a narrowband primary synchronization signal (NPSS) or a narrowband secondary synchronization signal (NSSS).

40. The base station of claim 38, wherein the raster is less than 100 KHz.

41. The base station of claim 37, wherein a total downlink power is shared among the plurality of downlink carriers as a plurality of downlink powers allocated to the plurality of downlink carriers respectively, and wherein the communication is performed via at least one of the plurality of downlink carriers using a respective allocated downlink power of the plurality of downlink powers.

42. The base station of claim 41, wherein a power allocated to a narrowband reference signal (NB-RS) changes after a configured time period based on the total downlink power allocated to the plurality of downlink carriers.

43. The base station of claim 41, wherein the total downlink power is shared based on downlink power split information, the downlink power split information being static or dynamic.

44. The base station of claim 37, wherein the means for performing the communication is configured to:
receive, via multi-tone transmission, at least one of a physical random access channel (PRACH) or a physical uplink shared channel (PUSCH).

45. The base station of claim 37, further comprising:
means for transmitting a communication gap indication indicating one or more communication gaps.

46. The base station of claim 45, wherein the communication gap indication comprises at least one of:
discontinuous transmission (DTX) period information to indicate one or more DTX periods,
discontinuous reception (DRX) period information to indicate one or more DRX periods, or
a duty cycle.

47. A user equipment (UE) for wireless communication via narrowband internet of things (NB IOT) in an unlicensed spectrum using digital modulation, comprising:
a memory; and
at least one processor coupled to the memory and configured to:
utilize, in a non-frequency hopping system, a plurality of downlink carriers in the unlicensed spectrum occupying at least a first minimum bandwidth by the plurality of downlink carriers and a plurality of uplink carriers in the unlicensed spectrum occupying at least a second minimum bandwidth with the plurality of uplink carriers, wherein the plurality of downlink carriers includes at least three downlink carriers in the unlicensed spectrum and the plurality of uplink carriers includes at least three uplink carriers in the unlicensed spectrum; and
perform communication using one or more of the plurality of downlink carriers and the plurality of uplink carriers.

48. The UE of claim 47, wherein the at least one processor is further configured to:
receive carrier configuration information indicating the plurality of downlink carriers and the plurality of uplink carriers, wherein the at least one processor is configured to utilize the plurality of downlink carriers and the plurality of uplink carriers based on the carrier configuration information.

49. The UE of claim 47, wherein the at least one of the plurality of downlink carriers is aligned with a raster to receive one or more synchronization signals.

50. The UE of claim 49, wherein the one or more synchronization signals include at least one of a narrowband primary synchronization signal (NPSS) or a narrowband secondary synchronization signal (NSSS).

51. The UE of claim 49, wherein the raster is less than 100 KHz.

52. The UE of claim 49, wherein a search frequency for one or more downlink synchronization signals is based on the raster and offset information.

53. The UE of claim 52, wherein the offset information is specified in a removable card or in a storage device of the UE.

54. The UE of claim 47, wherein a total uplink power is shared among the plurality of uplink carriers as a plurality of uplink powers allocated to the plurality of uplink carriers respectively, and wherein the communication is performed via at least one of the plurality of uplink carriers using a respective allocated uplink power of the plurality of uplink powers.

55. The UE of claim 54, wherein the total uplink power is shared based on uplink power split information, the uplink power split information being static or dynamic.

56. The UE of claim 47, wherein the at least one processor is further configured to:
increase a channel repetition level to transmit at least one of a physical random access channel (PRACH) or a physical uplink shared channel (PUSCH) via at least one of the plurality of uplink carriers, wherein the channel repetition level is increased for the unlicensed spectrum.

57. The UE of claim 47, wherein the at least one processor configured to perform the communication is configured to:
perform multi-tone transmissions to transmit at least one of a physical random access channel (PRACH) or a physical uplink shared channel (PUSCH).

58. The UE of claim 47, wherein the at least one processor is further configured to:
receiving a communication gap indication, the communication gap indication indicating one or more communication gaps; and
refraining from communication during the one or more communication gaps based on the communication gap indication.

59. The UE of claim 58, wherein the communication gap indication includes at least one of discontinuous transmission (DTX) period information, discontinuous reception (DRX) period information, or a duty cycle, and
wherein the at least one processor configured to refrain from the communication is configured to perform at least one of:
refraining from the communication during one or more DTX periods indicated in the DTX period information,
refraining from the communication during one or more DRX periods indicated in the DRX period information, or
refraining from the communication based on the duty cycle.

60. A base station for wireless communication via narrowband internet of things (NB IOT) in an unlicensed spectrum using digital modulation, comprising:

a memory; and
at least one processor coupled to the memory and configured to:
configure, in a non-frequency hopping system, a plurality of downlink carriers in the unlicensed spectrum to occupy at least a first minimum bandwidth by the plurality of downlink carriers and a plurality of uplink carriers in the unlicensed spectrum to occupy at least a second minimum bandwidth with the plurality of uplink carriers, wherein the plurality of downlink carriers includes at least three downlink carriers in the unlicensed spectrum and the plurality of uplink carriers includes at least three uplink carriers in the unlicensed spectrum; and
perform communication using one or more of the plurality of downlink carriers and the plurality of uplink carriers.

61. The base station of claim 60, wherein the at least one of the plurality of downlink carriers are aligned with a raster to transmit one or more synchronization signals.

62. The base station of claim 61, wherein the one or more synchronization signals include at least one of a narrowband primary synchronization signal (NPSS) or a narrowband secondary synchronization signal (NSSS).

63. The base station of claim 61, wherein the raster is less than 100 KHz.

64. The base station of claim 60, wherein a total downlink power is shared among the plurality of downlink carriers as a plurality of downlink powers allocated to the plurality of downlink carriers respectively, and wherein the communication is performed via at least one of the plurality of downlink carriers using a respective allocated downlink power of the plurality of downlink powers.

65. The base station of claim 64, wherein a power allocated to a narrowband reference signal (NB-RS) changes after a configured time period based on the total downlink power allocated to the plurality of downlink carriers.

66. The base station of claim 64, wherein the total downlink power is shared based on downlink power split information, the downlink power split information being static or dynamic.

67. The base station of claim 60, wherein the at least one processor configured to perform the communication is configured to:
receive, via multi-tone transmission, at least one of a physical random access channel (PRACH) or a physical uplink shared channel (PUSCH).

68. The base station of claim 60, wherein the at least one processor is further configured to:
transmitting a communication gap indication indicating one or more communication gaps.

69. The base station of claim 68, wherein the communication gap indication comprises at least one of:
discontinuous transmission (DTX) period information to indicate one or more DTX periods,
discontinuous reception (DRX) period information to indicate one or more DRX periods, or
a duty cycle.

70. A non-transitory computer-readable medium storing computer executable code, for a user equipment (UE) for wireless communication via narrowband internet of things (NB IOT) in an unlicensed spectrum using digital modulation, when executed by a processor causes the processor to:
utilize, in a non-frequency hopping system, a plurality of downlink carriers in the unlicensed spectrum occupying at least a first minimum bandwidth by the plurality of downlink carriers and a plurality of uplink carriers in the unlicensed spectrum occupying at least a second minimum bandwidth with the plurality of uplink carriers, wherein the plurality of downlink carriers includes at least three downlink carriers in the unlicensed spectrum and the plurality of uplink carriers includes at least three uplink carriers in the unlicensed spectrum; and perform communication using one or more of the plurality of downlink carriers and the plurality of uplink carriers.

71. A non-transitory computer-readable medium storing computer executable code, for a base station for wireless communication via narrowband internet of things (NB IOT) in an unlicensed spectrum using digital modulation, when executed by a processor causes the processor to:

configure, in a non-frequency hopping system, a plurality of downlink carriers in the unlicensed spectrum to occupy at least a first minimum bandwidth by the plurality of downlink carriers and a plurality of uplink carriers in the unlicensed spectrum to occupy at least a second minimum bandwidth with the plurality of uplink carriers, wherein the plurality of downlink carriers includes at least three downlink carriers in the unlicensed spectrum and the plurality of uplink carriers includes at least three uplink carriers in the unlicensed spectrum; and perform communication using one or more of the plurality of downlink carriers and the plurality of uplink carriers.

* * * * *